United States Patent
Saito et al.

(10) Patent No.: US 10,284,094 B2
(45) Date of Patent: May 7, 2019

(54) CURRENT BALANCE ADJUSTMENT CIRCUIT AND POWER CONVERSION SYSTEM

(71) Applicants: Kabushiki Kaisha Toshiba, Tokyo (JP); Toshiba Infrastructure Systems & Solutions Corporation, Kanagawa (JP)

(72) Inventors: Suzuo Saito, Saitama (JP); Akihisa Matsushita, Kanagawa (JP); Yoichi Morishima, Tokyo (JP)

(73) Assignees: Kabushiki Kaisha Toshiba, Tokyo (JP); Toshiba Infrastructure Systems & Solutions Corporation, Tokyo (JP)

( * ) Notice: Subject to any disclaimer, the term of this patent is extended or adjusted under 35 U.S.C. 154(b) by 0 days.

(21) Appl. No.: 15/914,630

(22) Filed: Mar. 7, 2018

(65) Prior Publication Data

US 2018/0262112 A1 Sep. 13, 2018

(30) Foreign Application Priority Data

Mar. 10, 2017 (JP) .................................. 2017-046554

(51) Int. Cl.
*H02M 3/158* (2006.01)
*H02M 7/487* (2007.01)
*H02M 7/493* (2007.01)

(52) U.S. Cl.
CPC ......... *H02M 3/1584* (2013.01); *H02M 7/487* (2013.01); *H02M 7/493* (2013.01)

(58) Field of Classification Search
None
See application file for complete search history.

(56) References Cited

U.S. PATENT DOCUMENTS

2013/0308357 A1* 11/2013 Amano .................. H02M 7/48
363/71

FOREIGN PATENT DOCUMENTS

| JP | 06-153518 A | 5/1994 |
| JP | 11-285259 A | 10/1999 |
| JP | 2013240252 A | 11/2013 |

OTHER PUBLICATIONS

Liu et al., A Novel Distributed Control Scheme for Parallel Operation of UPS, Yuasa-Jiho, No. 95 pp. 17-21. Oct. 2003 (with translation).

* cited by examiner

*Primary Examiner* — Henry E Lee, III
(74) *Attorney, Agent, or Firm* — Baker Botts L.L.P.

(57) ABSTRACT

A circuit configured to, for each of values of output currents output from power conversion devices connected in parallel to one another and driven based on common ON signals applied to the power conversion devices, output a difference between the output current value and a reference value when a polarity of the output current value is positive, and output a difference between an absolute value of the output current value and an absolute value of the reference value when the polarity of the output current value is negative; and a circuit configured to output adjustment time signals each of which indicates an amount of a delay time of a rising timing or a falling timing of the ON signal, according to an output value of the output current difference calculation circuit.

19 Claims, 19 Drawing Sheets

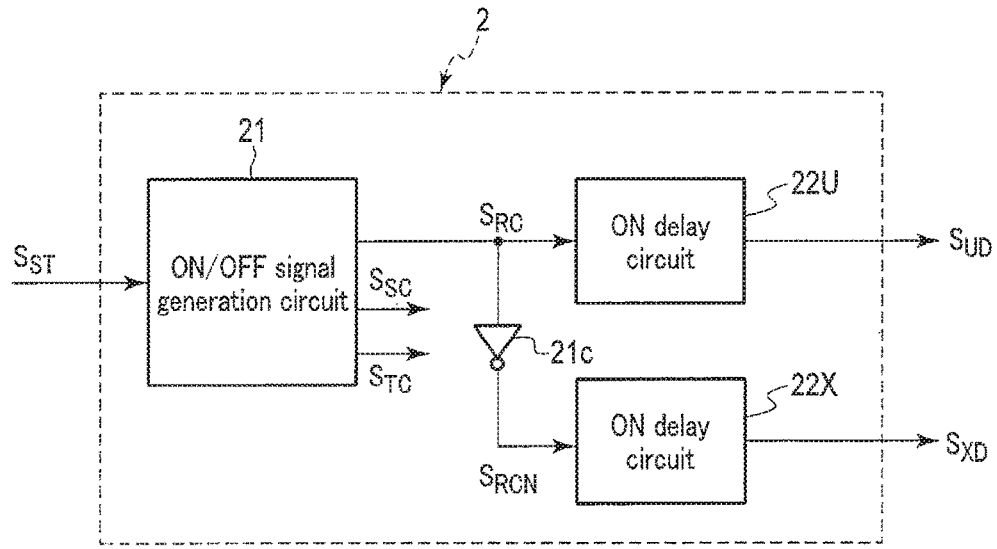
F I G. 2
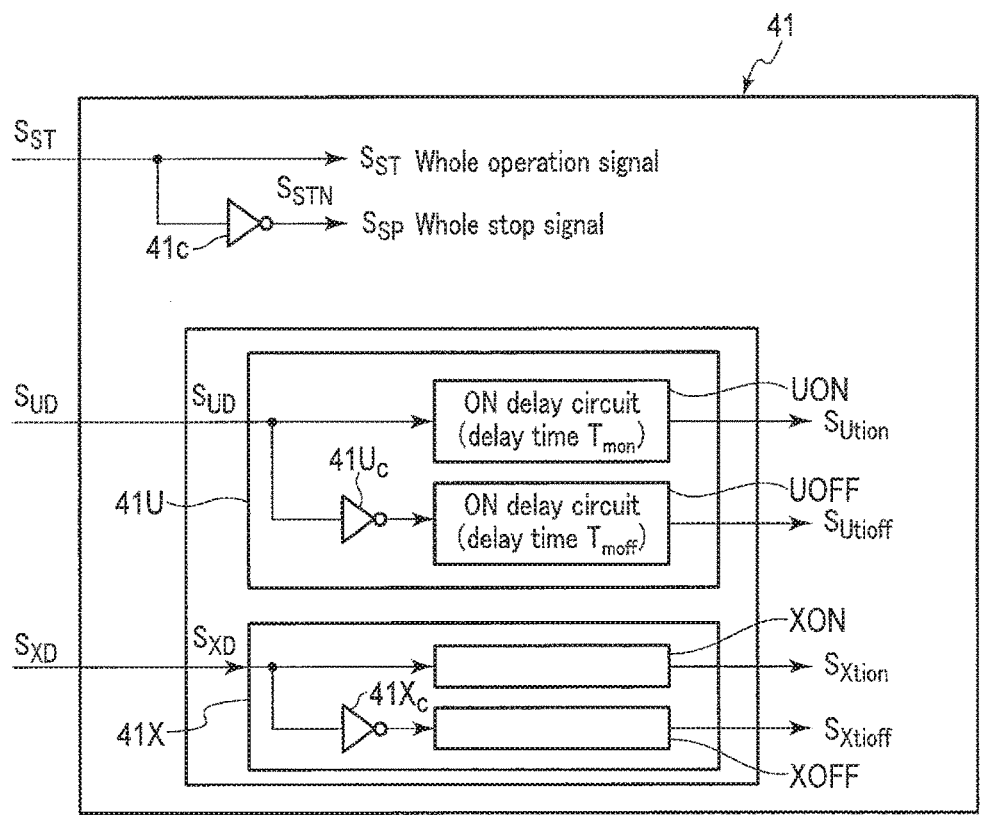
F I G. 3

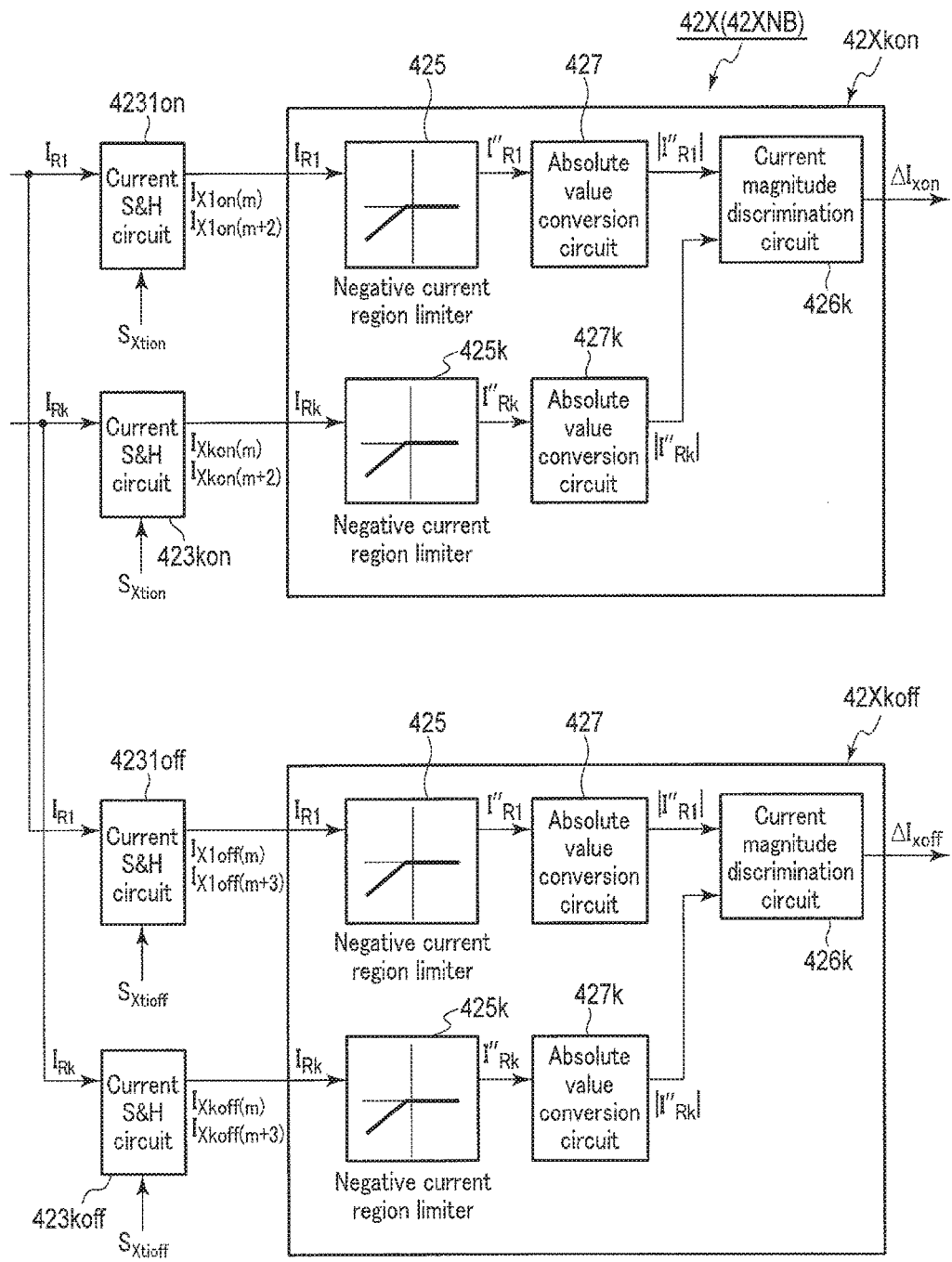
F I G. 5

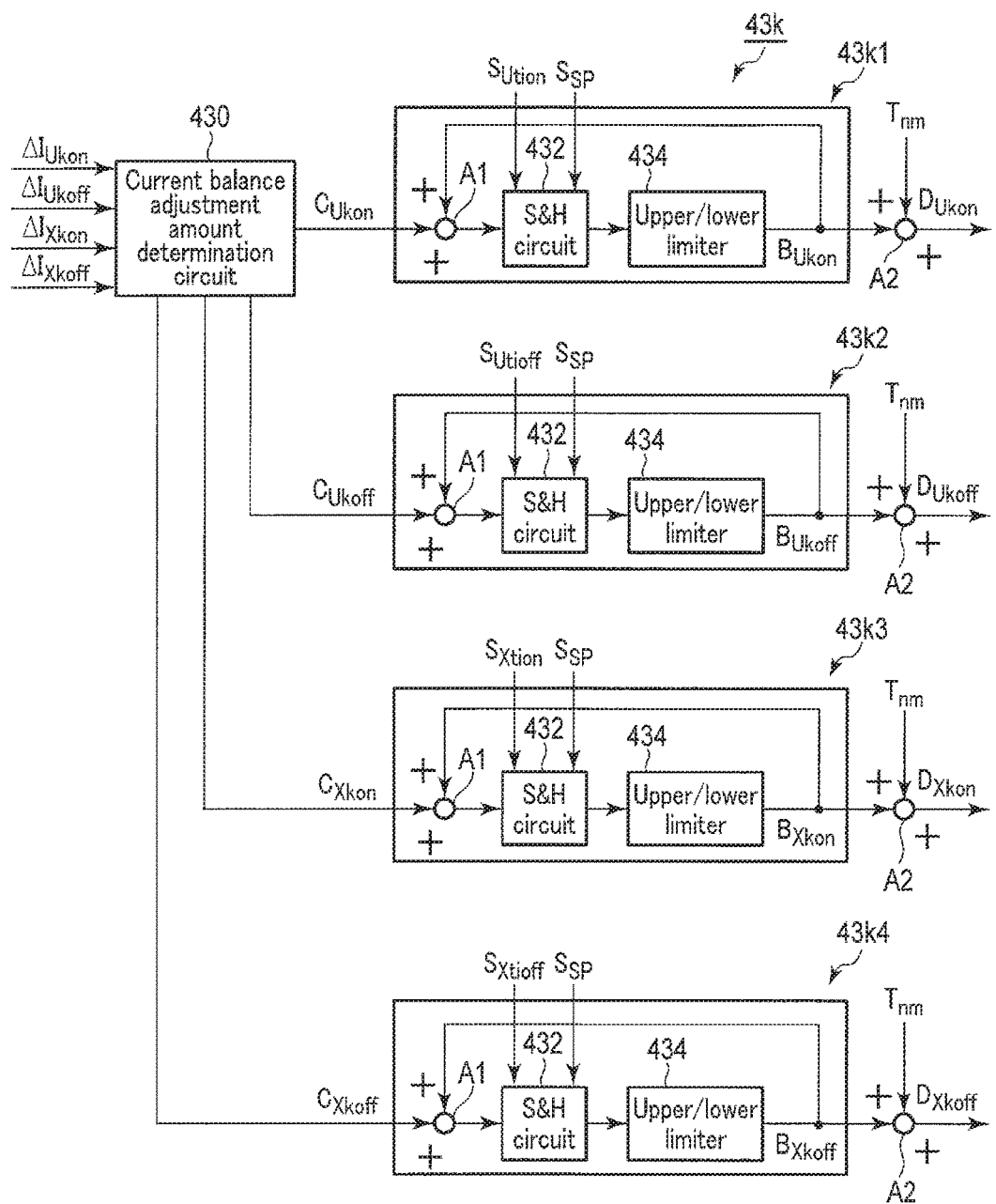
F I G. 6A

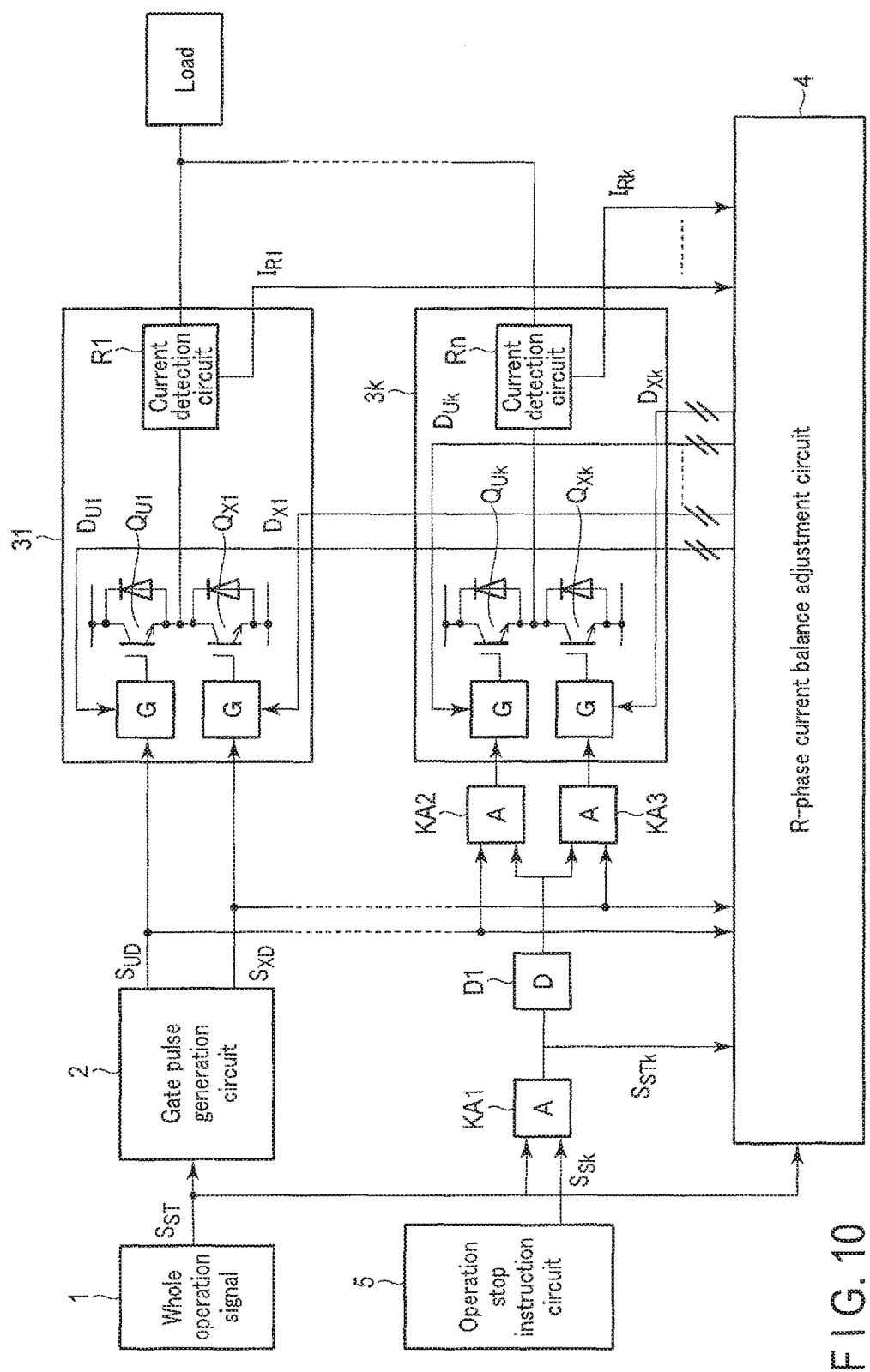
F I G. 10

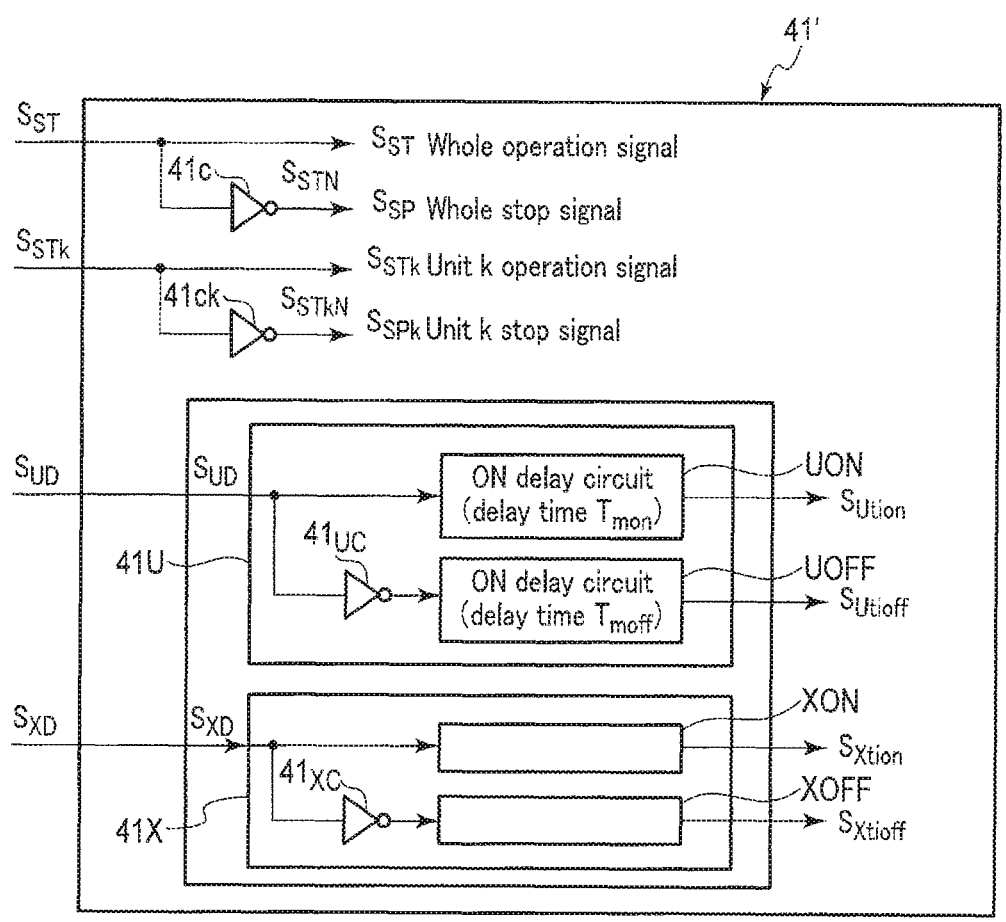
F I G. 11

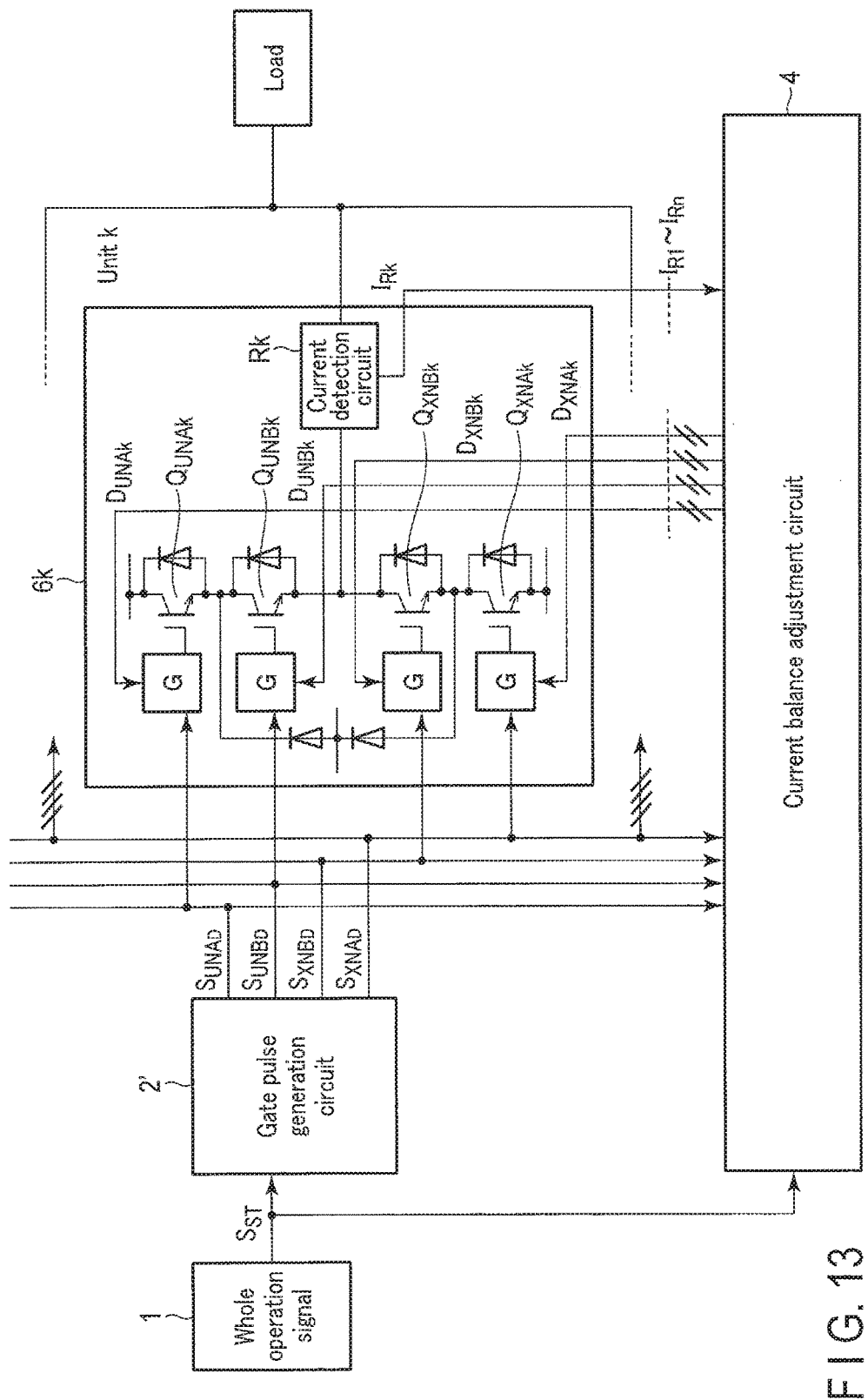
F I G. 13

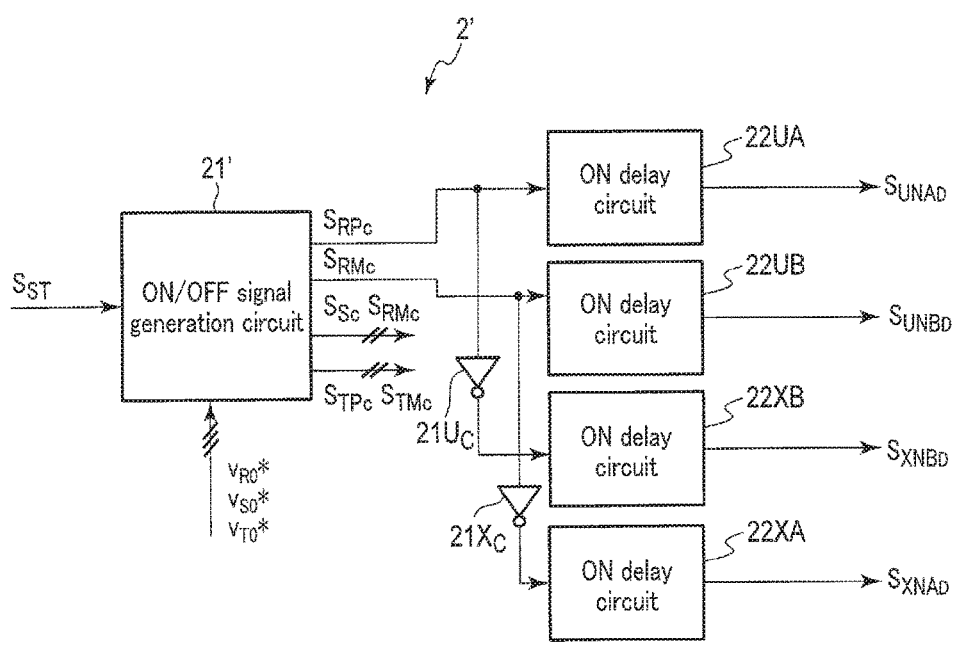
F I G. 14

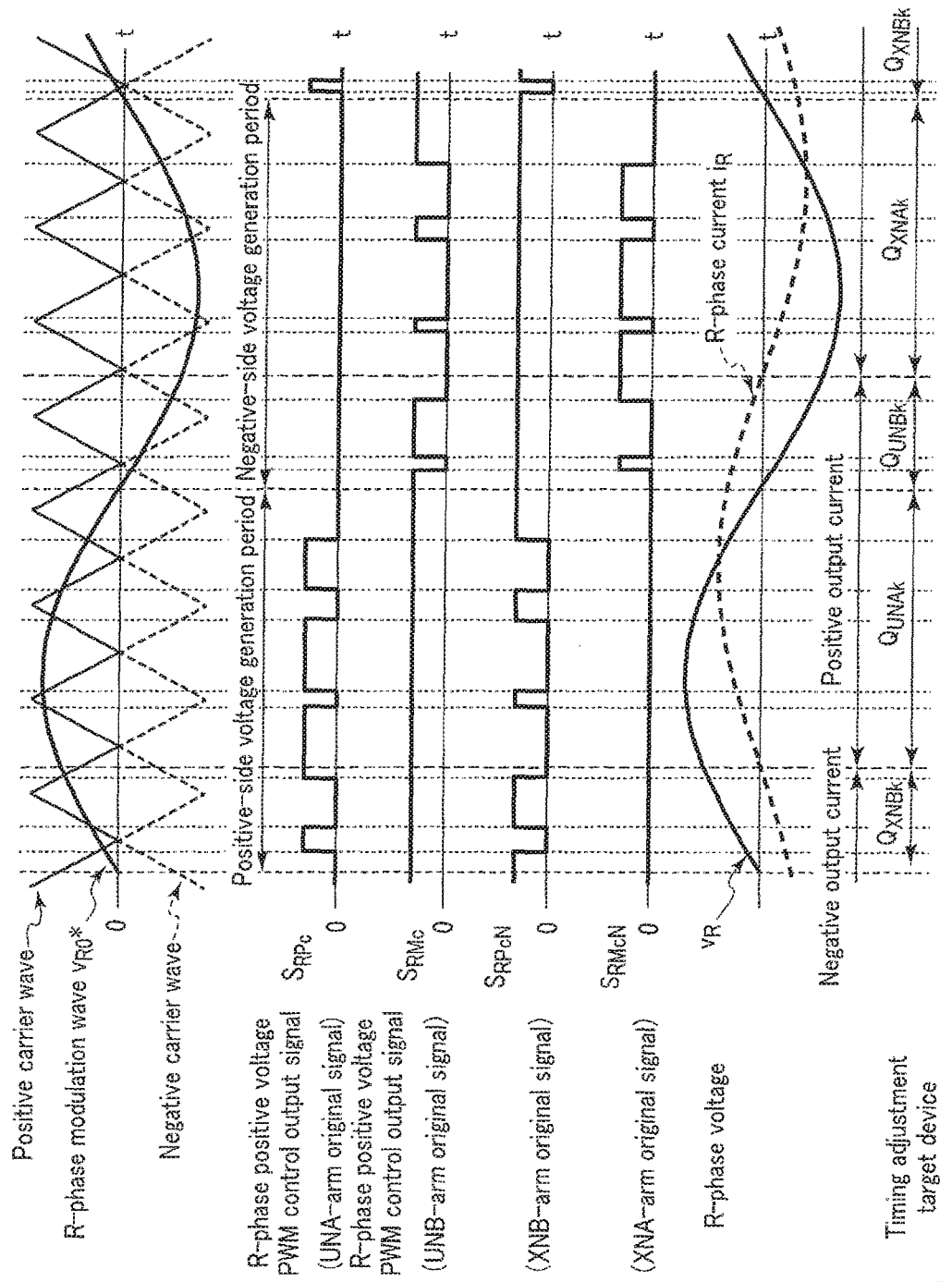
F I G. 15

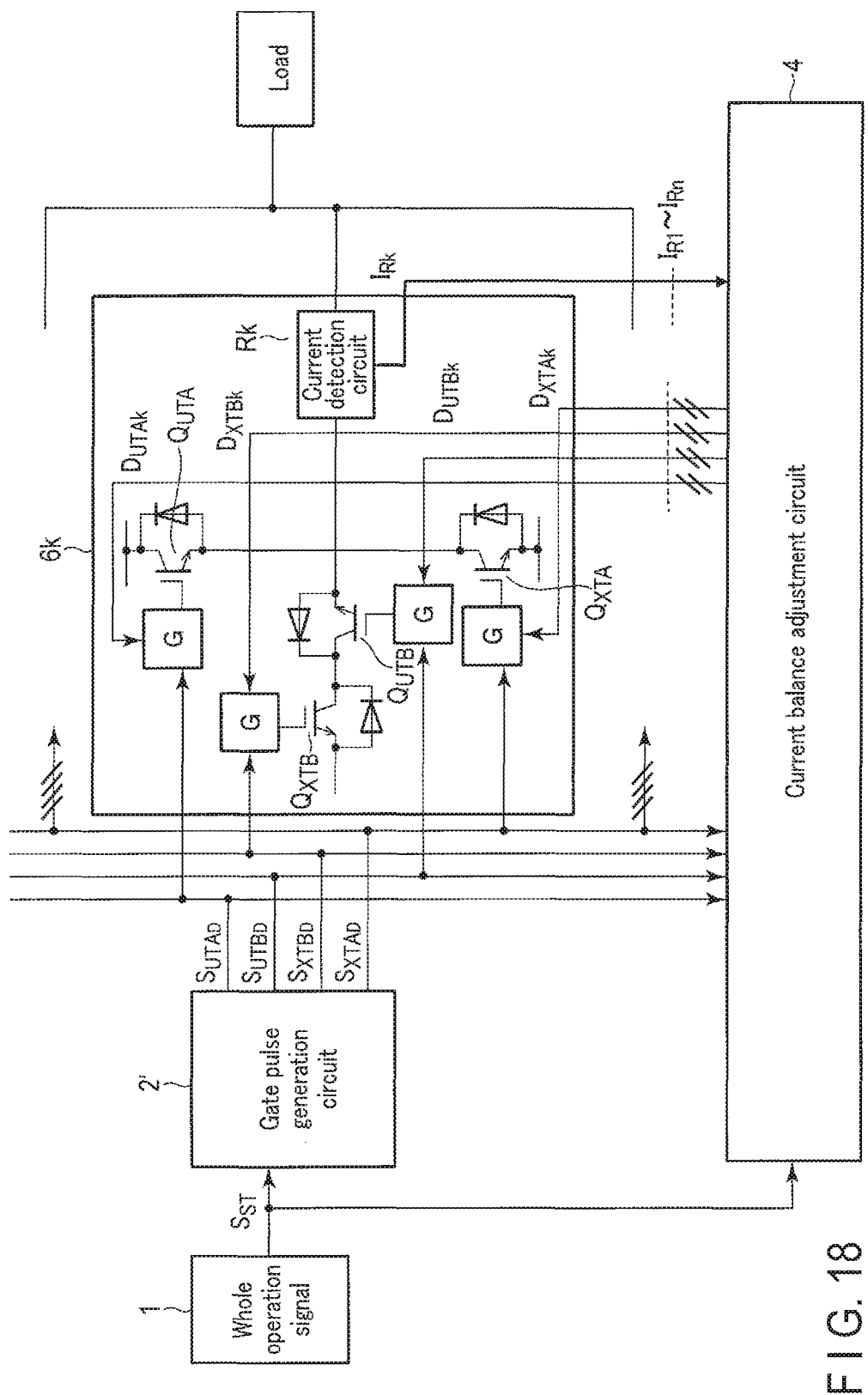
F I G. 18

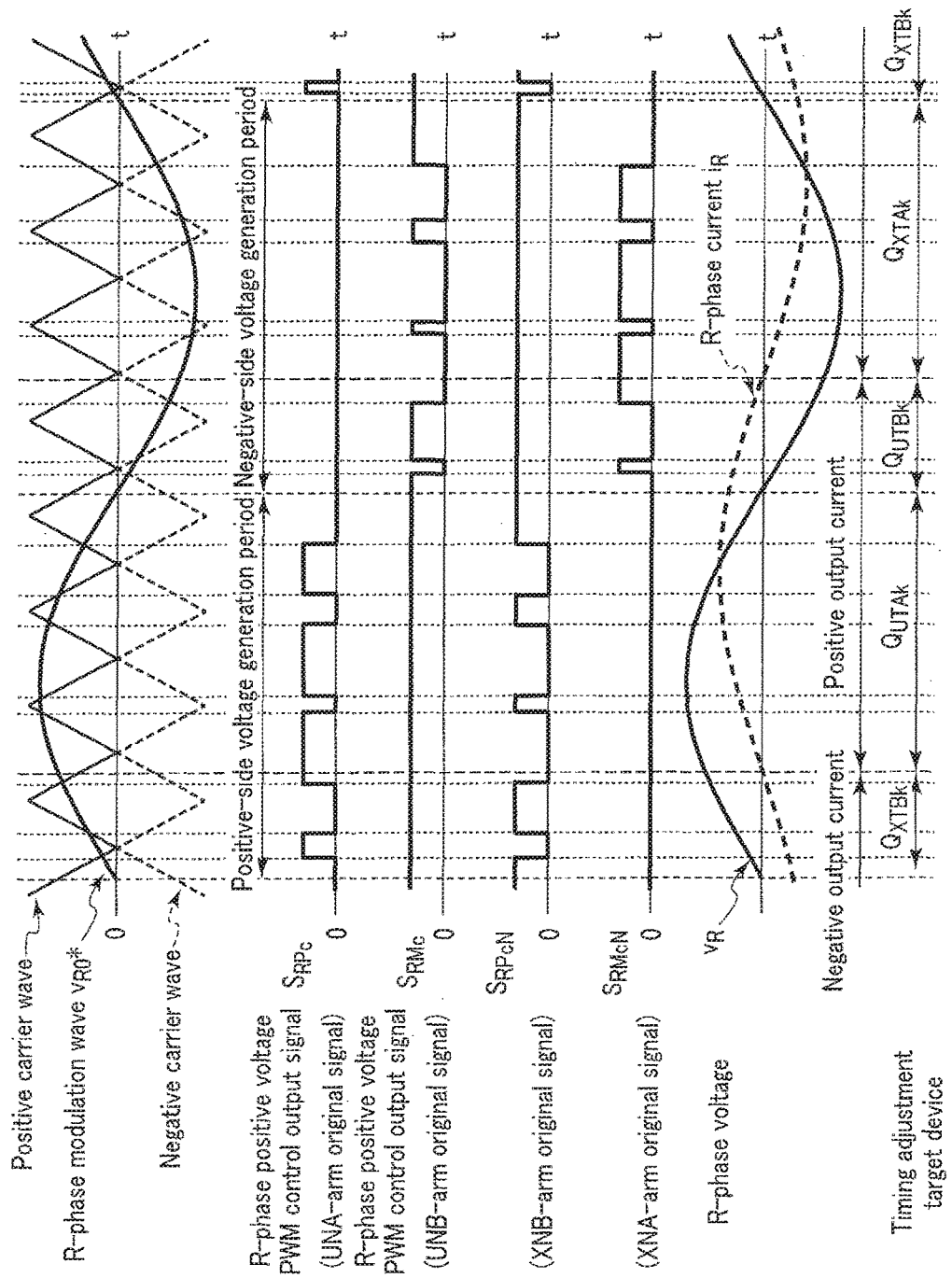
F I G. 19

US 10,284,094 B2

CURRENT BALANCE ADJUSTMENT CIRCUIT AND POWER CONVERSION SYSTEM

CROSS-REFERENCE TO RELATED APPLICATION

This application is based upon and claims the benefit of priority from prior Japanese Patent Application No. 2017-046554, filed Mar. 10, 2017, the entire contents of which are incorporated herein by reference.

FIELD

Embodiments described herein relate generally to a current balance adjustment circuit and a power conversion system.

BACKGROUND

It has been proposed to use a power conversion system capable of outputting a large current by connecting a plurality of power conversion devices in parallel.

In such a power conversion system, for example, a common drive signal is supplied to a plurality of power conversion devices connected in parallel, and the plurality of power conversion devices are driven to output the same currents.

However, a variation in the output current of the power conversion device may occur due to a variation in components such as wires or elements constituting the power conversion device.

When the variation in the output current of the power conversion device increases and the current concentrates on a specific power conversion device, the power conversion system may be stopped so as to avoid destruction of the power conversion device and may not continue to operate.

In the past, there has been proposed a power conversion system that is configured by combining a plurality of power conversion devices having relatively small variations and suppresses the imbalance of the output current by connecting a reactor to output terminals of the power conversion devices.

It has also been proposed to suppress the imbalance in output currents of a plurality of power conversion devices by delaying a rise timing of a drive signal of a power conversion device having a large output current.

BRIEF DESCRIPTION OF THE DRAWINGS

FIG. 2 is a block diagram schematically illustrating a configuration example of a gate pulse generation circuit illustrated in FIG. 1;

FIG. 3 is a block diagram schematically illustrating a configuration example of a current detection timing generation circuit of a current balance adjustment circuit illustrated in FIG. 1;

FIG. 5 is a block diagram schematically illustrating a configuration example of an X-arm output current difference calculation circuit for an R phase of a $k^{th}$ power conversion device of the current balance adjustment circuit illustrated in FIG. 1;

FIG. 6A is a block diagram schematically illustrating a configuration example of an adjustment time calculation circuit for an R phase of a $k^{th}$ power conversion device in the current balance adjustment circuit illustrated in FIG. 1;

FIG. 10 is a block diagram schematically illustrating a configuration example of a power conversion system according to a fourth embodiment;

FIG. 11 is a block diagram schematically illustrating a configuration example of a current detection timing generation circuit of the current balance adjustment circuit illustrated in FIG. 10;

FIG. 13 is a block diagram schematically illustrating a configuration example of a power conversion system according to a fifth embodiment;

FIG. 14 is a block diagram schematically illustrating a configuration example of a gate pulse generation circuit illustrated in FIG. 13;

FIG. 15 is a timing chart for describing an example of the operation of the gate pulse generation circuit and a current balance adjustment circuit illustrated in FIG. 13;

FIG. 18 is a block diagram schematically illustrating a configuration example of a power conversion system according to a sixth embodiment; and FIG. 19 is a timing chart for describing an example of the operation of a gate pulse generation circuit and a current balance adjustment circuit illustrated in FIG. 18.

DETAILED DESCRIPTION

Figure 1:
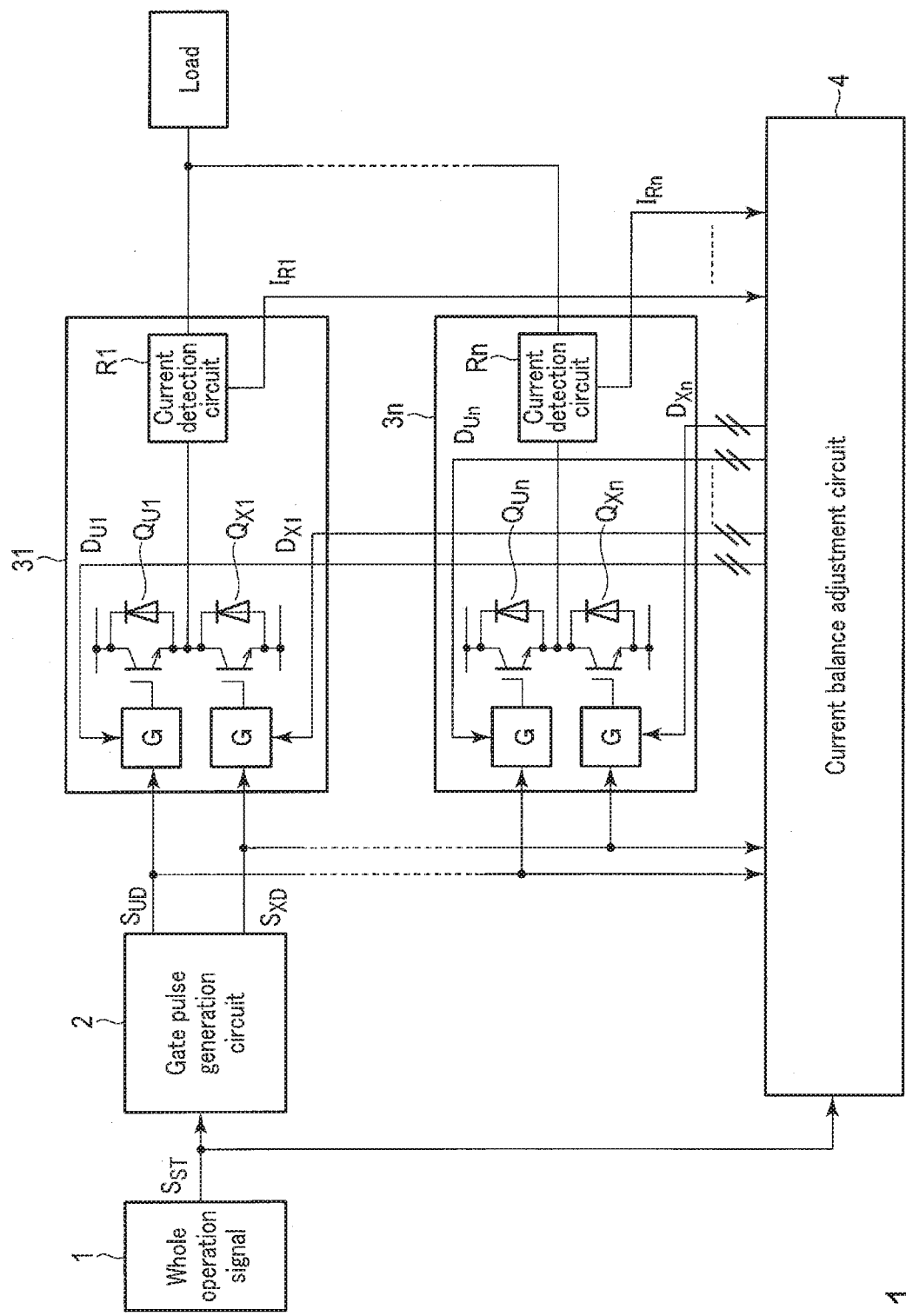
FIG. 1 is a block diagram schematically illustrating a configuration example of a power conversion system according to a first embodiment.

In general, according to one embodiment, a current balance adjustment circuit comprising: an output current difference calculation circuit configured to, for each of a plurality of values of output currents which are output from a plurality of power conversion devices connected in parallel to one another and driven based on a plurality of common ON signals applied to the power conversion devices, output a difference between the output current value and a reference value when a polarity of the output current value is positive, and output a difference between an absolute value of the output current value and an absolute value of the reference value when the polarity of the output current value is negative; and an adjustment time calculation circuit configured to output adjustment time signals each of which indicates an amount of a delay time of a rising timing or a falling timing of the ON signal, according to an output value of the output current difference calculation circuit.

Hereinafter, a current balance adjustment circuit and a power conversion system according to embodiments will be described with reference to the drawings.
In the embodiments described below, the same reference numerals are assigned to the overlapping configurations and the description thereof will be omitted.

The power conversion system includes a control device including a current balance adjustment circuit, and a plurality of power conversion devices, and AC output terminals of the plurality of power conversion devices are connected in parallel to each other.

In the following embodiments, the power conversion system is a power conversion system in which n power conversion devices are connected in parallel to output an AC current.

The power conversion device outputs three-phase AC current of an R phase, an S phase, a T phase, and includes an upper arm (for example, a U arm in the case of the R phase) and a lower arm (for example, an X arm in the case of the R phase) for each phase.

In the following description, a configuration and a method for balancing an R-phase output current of an arbitrary $k^{th}$ power conversion device with an R-phase output current of another power conversion device will be described in detail, but the same effects can be obtained by employing the same configuration and method with respect to other phases of other power conversion devices.

FIG. 1 is a block diagram schematically illustrating a configuration example of a power conversion system according to a first embodiment.

In the power conversion system of the present embodiment, an output current value of a specific power conversion device is set as a reference current value, an output current value of a $k^{th}$ power conversion device 3$k$ other than the specific power conversion device is compared with the reference current value, and gate pulses to all power conversion devices 31 to 3$n$ may be adjusted so that output currents of the entire power conversion devices 31 to 3$n$ are equal to the reference current.

In the present embodiment, an output current value $I_{R1}$ of the power conversion device 31 selected from among the plurality of power conversion devices 31 to 3$n$ is set as a reference value.

The power conversion system of the present embodiment includes a control device and a plurality of power conversion devices 31 to 3$n$ (n is a positive integer).
The control device includes, for example, a whole operation signal generation unit 1, a gate pulse generation circuit 2, and a current balance adjustment circuit 4.

The whole operation signal generation unit 1 generates a whole operation signal $S_{ST}$ for switching between an operation and a stop of the power conversion system and outputs the whole operation signal $S_{ST}$ to the gate pulse generation circuit 2 and the current balance adjustment circuit 4.

The gate pulse generation circuit 2 receives the whole operation signal $S_{ST}$ from the whole operation signal generation unit 1, generates gate pulses common to R phases of the plurality of power conversion devices 31 to 3$n$ (U-arm common ON signal $S_{UD}$, X-arm common ON signal $S_{XD}$) based on the whole operation signal $S_{ST}$, and outputs the gate pulses (U-arm common ON signal $S_{UD}$, X-arm common ON signal $S_{XD}$) to the R phases of the plurality of power conversion devices 31 to 3$n$.

In this specification, a plurality of signals output form the gate pulse generation circuit 2, 2' may be referred to as the ON signals or the common ON signals, and a plurality of signals applied to a plurality of gates of a plurality of switching devices may be referred to as the gate signals.

Each of the plurality of power conversion devices 31 to 3$n$ is a three-phase two-level power conversion device which outputs a three-phase AC current of an R phase, an S phase, and a T phase.

Each of the plurality of power conversion devices 31 to 3$n$ includes, for example, a DC power supply (not illustrated) common to the plurality of power conversion devices 31 to 3$n$, a DC link connected to connected to each of a positive electrode terminal and a negative electrode terminal of the DC power source, and an upper arm (for example, a U arm in the case of the R phase) and a lower arm (for example, an X arm in the case of the R phase) connected in series between the a positive side DC link and a negative side DC link.

Each of the plurality of power conversion devices 31 to 3$n$ is electrically connected to a load between the U arm and the X arm.

Each of the power conversion devices 31 to 3$n$ includes each of a plurality of current detection circuits R1 to Rn provided in a current output line from each phase to the load. Each of the plurality of current detection circuits R1 to Rn detects an output current of each of the power conversion devices 31 to 3$n$ and provides each of the output current values $I_{R1}$ to $I_{Rn}$ corresponding to the detected output current to the current balance adjustment circuit 4.

It is noted that each of the plurality of power conversion devices 31 to 3$n$ output each of the output current values $I_{R1}$ to $I_{Rn}$ to the current balance adjustment circuit 4 in this embodiment, but each of the plurality of power conversion devices 31 to 3$n$ may output an equivalent output current value (an equivalent value of output current value $I_{R1}$ to $I_{Rn}$) to the current balance adjustment circuit 4. In this case, each of the plurality of power conversion devices 31 to 3$n$ may include a current detector instead of each of the current detection circuits R1 to Rn, detect an output current by the current detector and output an equivalent output current value corresponding to the detected value to the current balance adjustment circuit 4. The current balance adjustment circuit 4 may include a function to receive the equivalent output current values from the plurality of power conversion devices 31 to 3$n$ and calculates the output current values $I_{R1}$ to $I_{Rn}$ corresponding to the equivalent output current values.

It is noted that only the R phases of the plurality of power conversion devices 31 to 3$n$ are described in FIG. 1, and the description of the S phases and the T phases is omitted. The same configurations as those of the R phases are applied to the S phases and the T phases of the plurality of power conversion devices 31 to 3$n$.

In the following description, regarding current values $I_{R1}$ to $I_{Rn}$ output from the R phases of the plurality of power conversion devices 31 to 3$n$, a current flowing in a direction from the power conversion devices 31 to 3$n$ toward the load is set as positive.

The upper arm (U arm) and the lower arm (X arm) of the R phase include switching devices $Q_{U1}$ to $Q_{Un}$ and $Q_{X1}$ to $Q_{Xn}$ and gate pulse adjustment circuits G, respectively.

The switching devices $Q_{U1}$ to $Q_{Un}$ and $Q_{X1}$ to $Q_{Xn}$ are, for example, power switching elements such as insulated gate bipolar transistors (IGBT) or metal-oxide-semiconductor field-effect transistors (MOSFET).

Diodes are connected in anti-parallel to the switching devices $Q_{U1}$ to $Q_{Un}$ and $Q_{X1}$ to $Q_{Xn}$, respectively.

The gate pulse adjustment circuits G receive the common ON signals $S_{UD}$ and $S_{XD}$ of the corresponding switching devices $Q_{U1}$ to $Q_{Un}$ and $Q_{X1}$ to $Q_{Xn}$ from the gate pulse generation circuit 2, output gate pulses, of which a rising timing and a falling timing of the common ON signal are adjusted, based on adjustment time signals (delay time adjustment elements) $D_{U1}$ to $D_{Un}$ and $D_{X1}$ to $D_{Xn}$ from the current balance adjustment circuit 4, and apply the gate pulses to gates of the switching devices $Q_{U1}$ to $Q_{Un}$ and $Q_{X1}$ to $Q_{Xn}$.

The current balance adjustment circuit 4 outputs the adjustment time signals (delay time adjustment elements) $D_{U1}$ to $D_{Un}$ and $D_{X1}$ to $D_{Xn}$ of the gate pulses of the respective phase arms of each of the plurality of power conversion devices 31 to 3n, based on the whole operation signal $S_{ST}$ from the whole operation signal generation unit 1, the common ON signals $S_{UD}$ and $S_{XD}$ from the gate pulse generation circuit 2, and the output current values $I_{R1}$ to $I_{Rn}$ of the respective phases of each of the plurality of power conversion devices 31 to 3n.

The whole operation signal generation unit 1, the gate pulse generation circuit 2, the plurality of power conversion devices 31 to 3n, and the current balance adjustment circuit 4 may be configured by hardware, may be configured by software, or may be configured by a combination of hardware and software. In a case where each configuration is constituted by software or a combination of software and hardware, the power conversion system includes at least one processor such as, for example, a central processing unit (CPU) or micro processing unit (MPU), and a memory.

Hereinafter, the respective configurations of the gate pulse generation circuit 2 and the current balance adjustment circuit 4 will be described in detail.

FIG. 2 is a block diagram schematically illustrating a configuration example of the gate pulse generation circuit illustrated in FIG. 1.

Figure 6B:
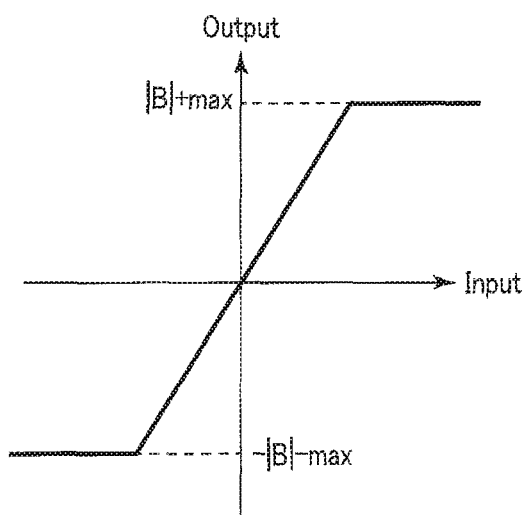
FIG. 6B is a diagram for describing a configuration example of a limiter circuit of an integration circuit illustrated in FIG. 6A.
Figure 7:
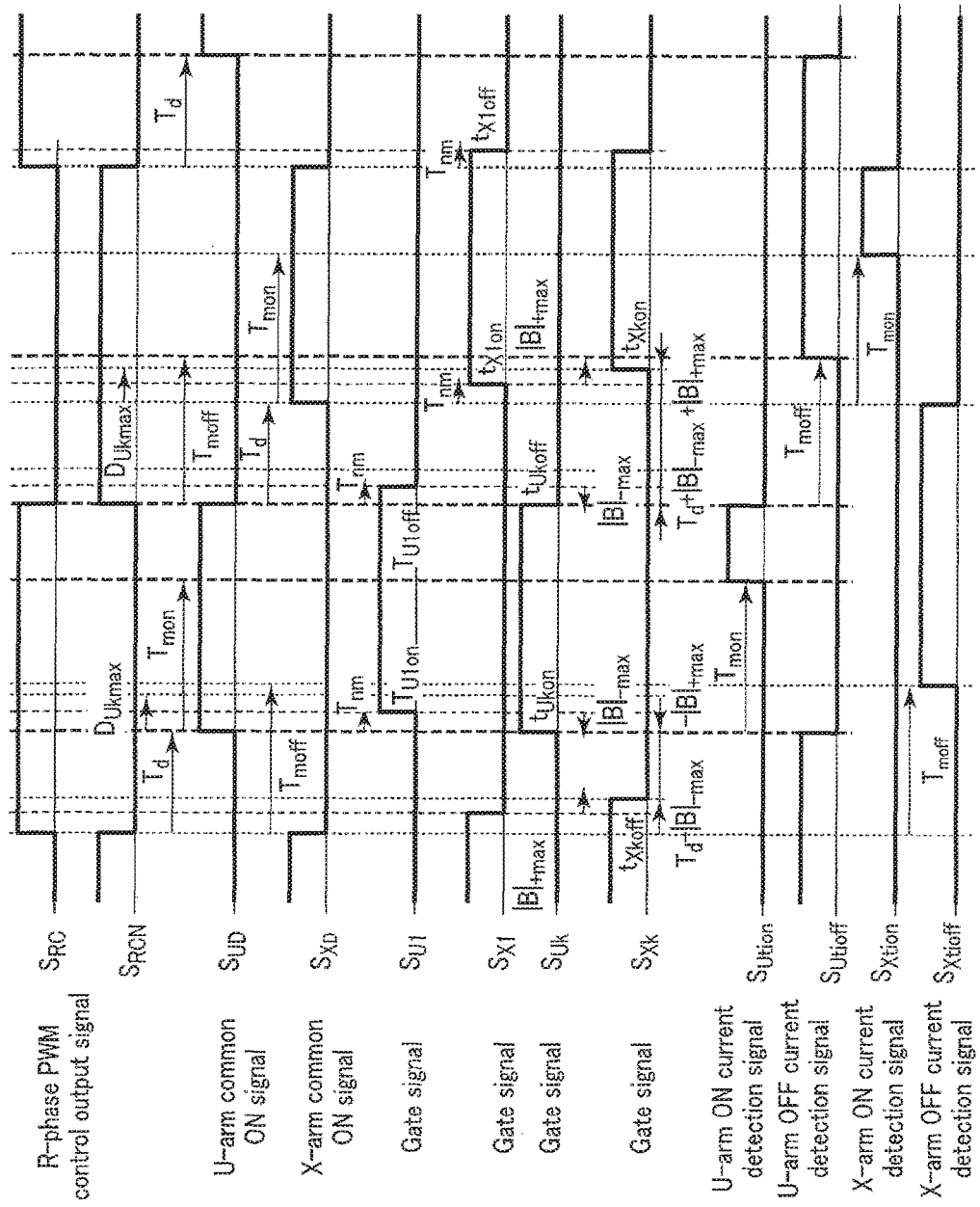
FIG. 7 is a timing chart for describing an example of the operation of the power conversion system illustrated in FIGS. 1 to 6B.

FIG. 7 is a timing chart for describing an example of the operation of the power conversion system illustrated in FIGS. 1 to 6B.

FIG. 7 illustrates the operable ranges of ON/OFF timings of the U arm and the X arm in one entire cycle.

As illustrated in FIG. 7, in the present embodiment, a dead time is sufficiently secured even when an adjustment amount of an ON timing and an OFF timing of the U arm and the X arm becomes maximum.

The gate pulse generation circuit 2 includes an ON/OFF signal generation circuit 21, a NOT circuit 21c, and ON delay circuits 22U and 22X.

The ON/OFF signal generation circuit 21 receives the whole operation signal $S_{ST}$, and outputs an R-phase ON/OFF signal $S_{RC}$, an S-phase ON/OFF signal $S_{SC}$, and a T-phase ON/OFF signal $S_{TC}$ based on the whole operation signal $S_{ST}$. The ON/OFF signal generation circuit 21 compares modulation waves corresponding to the output voltages of R-phase, the S-phase, and the T-phase with a carrier wave common to the three phases, and outputs a PWM control output signal, to which ON and OFF timings are set for each phase, as the R-phase On/OFF signal $S_{RC}$, the S-phase ON/OFF signal $S_{SC}$, and the T-phase ON/OFF signal $S_{TC}$.

The ON delay circuit 22U receives the R-phase ON/OFF signal $S_{RC}$ output from the ON/OFF signal generation circuit 21, outputs a U-arm common ON signal $S_{UD}$, which is obtained by delaying the rise timing of the ON/OFF signal $S_{RC}$ by a predetermined period (standard delay time) Td, to the plurality of power conversion devices 31 to 3n.

In consideration of the dead time necessary for avoiding occurrence of a period during which a U-arm switching device and an X-arm switching device are simultaneously turned on, it is determined how long the predetermined period Td should be.

The NOT circuit 21c receives the R-phase ON/OFF signal $S_{RC}$ output from the ON/OFF signal generation circuit 21, and outputs an inverted ON/OFF signal $S_{RCN}$, which is obtained by inverting the ON/OFF signal, to the ON delay circuit 22X.

The ON delay circuit 22X receives the R-phase inverted ON/OFF signal $S_{RCN}$ output from the NOT circuit 21c, and outputs the X-arm common ON signal $S_{XD}$, which is obtained by delaying the rising timing of the inverted ON/OFF signal $S_{RCN}$ by the predetermined period Td, to the plurality of power conversion devices 31 to 3n.

FIG. 3 is a block diagram schematically illustrating a configuration example of the current detection timing generation circuit of the current balance adjustment circuit illustrated in FIG. 1.

The current balance adjustment circuit 4 includes a current detection timing generation circuit 41, output current difference calculation circuits 42U and 42X, and a adjustment time calculation circuit 43.

The current detection timing generation circuit 41 includes a NOT circuit 41c, a U-arm delay circuit 41U, and an X-arm delay circuit 41X.

The NOT circuit 41c receives the whole operation signal $S_{ST}$, and outputs a whole stop signal $S_{SP}$ which is obtained by inverting the whole operation signal $S_{ST}$.

The U-arm delay circuit 41U includes ON delay circuits UON and UOFF and a NOT circuit 41Uc.

The ON delay circuit UON receives the U-arm common ON signal $S_{UD}$, and outputs a U-arm ON current detection signal SUtion which is obtained by delaying the rise timing of the U-arm common ON signal $S_{UD}$ by a predetermined period Tmon.

The NOT circuit 41Uc receives the U-arm common ON signal $S_{UD}$, inverts the U-arm common ON signal $S_{UD}$, and outputs the inverted signal of the U-arm common ON signal $S_{UD}$ to the ON delay circuit UOFF.

The ON delay circuit UOFF receives the inverted signal of the U-arm common ON signal $S_{UD}$, and outputs a U-arm OFF current detection signal SUtioff which is obtained by delaying the rising timing of the received inverted signal by a predetermined period Tmoff.

The X-arm delay circuit 41X includes ON delay circuits XON and XOFF and a NOT circuit 41Xc.

The ON delay circuit XON receives the X-arm common ON signal $S_{XD}$, and outputs an X-arm ON current detection signal SXtion which is obtained by delaying the rise timing of the X-arm common ON signal $S_{XD}$ by the predetermined period Tmon.

The NOT circuit 41Xc receives the X-arm common ON signal $S_{XD}$, inverts the X-arm common ON signal $S_{XD}$, and outputs the inverted signal of the X-arm common ON signal $S_{XD}$ to the ON delay circuit XOFF.

The ON delay circuit XOFF receives the inverted signal of the X-arm common ON signal $S_{XD}$, and outputs an X-arm OFF current detection signal SXtioff which is obtained by delaying the rising timing of the received inverted signal by the predetermined period Tmoff.

Figure 4:
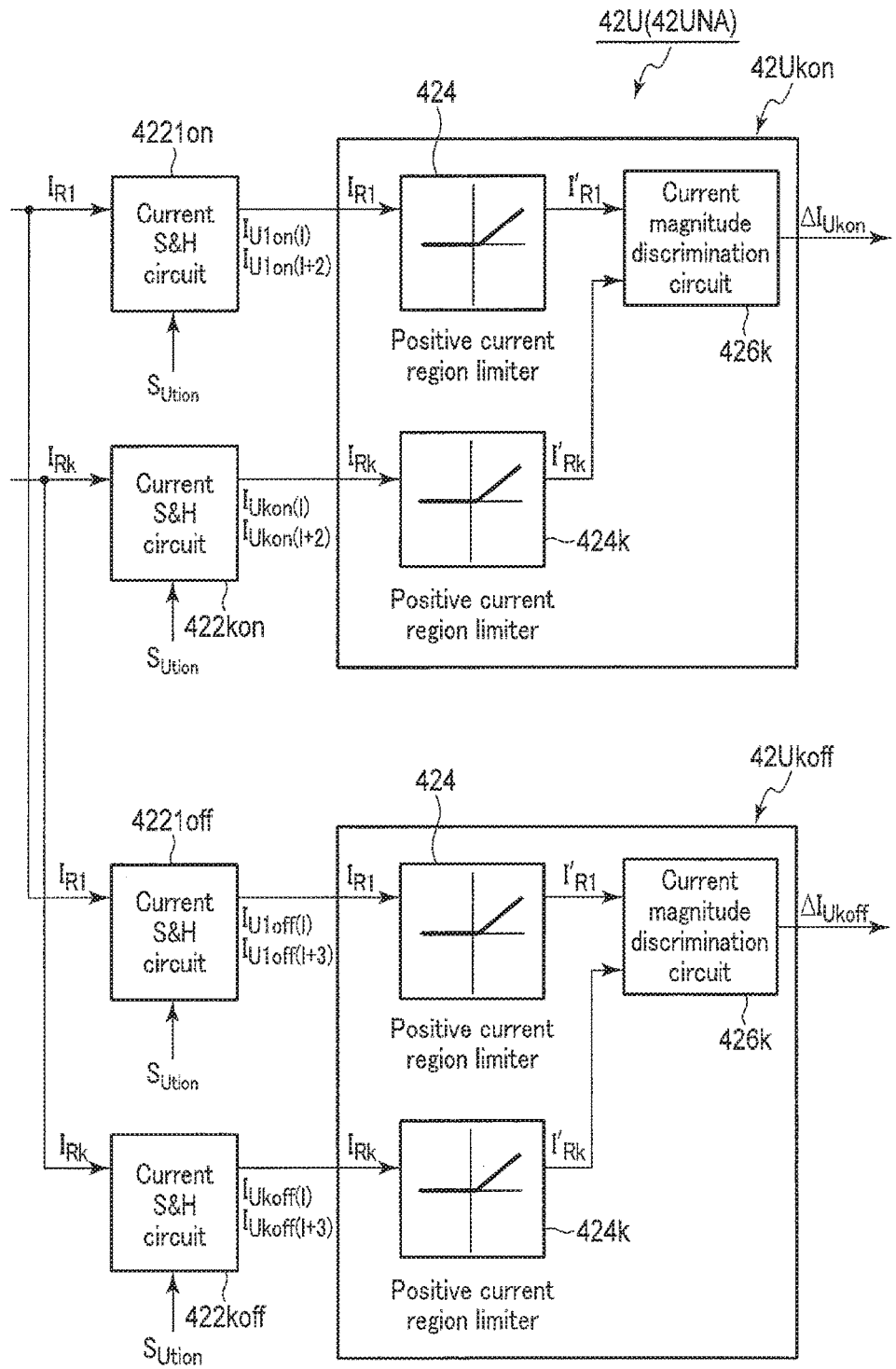
FIG. 4 is a block diagram schematically illustrating a configuration example of a U-arm output current difference calculation circuit for an R phase of a $k^{th}$ power conversion device of the current balance adjustment circuit illustrated in FIG. 1.

FIG. 4 is a block diagram schematically illustrating a configuration example of a U-arm output current difference calculation circuit for an R phase of a $k^{th}$ power conversion device of the current balance adjustment circuit illustrated in FIG. 1.

The output current difference calculation circuit 42U includes current sample and hold (S&H) circuits 4221on and 422kon, an output current difference calculation circuit 42Ukon, current sample and hold (S&H) circuits 4221off and 422koff, and an output current difference calculation circuit 42Ukoff. Here, k is an integer being greater than or equal to 2 and being less than or equal to n.

The current sample and hold (S&H) circuits 4221on, 4221off are circuits each of which receives the R-phase output current value of the power conversion device serving as a reference.

In the present embodiment, since the R-phase output current value $I_{R1}$ of the power conversion device 31 is used as a reference, Each of the current sample and hold circuit 4221on, 4221off receives the R-phase output current value $I_{R1}$ of the power conversion device 31 from the current detection circuit R1.

Each of the current sample and hold circuit 422kon, 422koff receives the R-phase output current value $I_{Rk}$ of the power conversion device 3k from the current detection circuit Rk.

The current sample and hold circuit 4221on receives the U-arm ON current detection signal SUtion and the output current value $I_{R1}$, samples a value of the R-phase output current value $I_{R1}$ of the power conversion device 31 at a timing when the U-arm ON current detection signal SUtion rises, and outputs the sampled value as ON current values $I_{U1on(l)}$, $I_{U1on(l+2)}$, . . . .

The current sample and hold circuit 422kon receives the U-arm ON current detection signal SUtion and the output current value $I_{Rk}$, samples a value of the R-phase output current value $I_{Rk}$ of the power conversion device 3k at a timing when the U-arm ON current detection signal SUtion rises, and outputs the sampled value as ON current values $I_{Ukon(l)}$, $I_{Ukon(l+2)}$, . . . .

The output current difference calculation circuit 42Ukon includes positive current region limiters 424 and 424k and a current magnitude discrimination circuit 426k.

The positive current region limiter 424 outputs $I'_{R1}$ which is a received value (a value obtained by multiplying the received value by 1) when the ON current values $I_{U1on(l)}$, $I_{U1on(l+2)}$, . . . are greater than zero, and outputs $I'_{R1}$ which is zero (a value obtained by multiplying the received value by zero) when the ON current values $I_{U1on(l)}$, $I_{U1on(l+2)}$, . . . are less than or equal to zero.

The positive current region limiter 424k outputs $I'_{Rk}$ which is a received value (a value obtained by multiplying the received value by 1) when the ON current values $I_{Ukon(l)}$, $I_{Ukon(l+2)}$, . . . are greater than zero, and outputs $I'_{Rk}$ which is zero (a value obtained by multiplying the received value by zero) when the ON current values $I_{Ukon(l)}$, $I_{Ukon(l+2)}$, . . . are less than or equal to zero.

The current magnitude discrimination circuit 426k calculates an absolute value of a difference ($I'_{Rk}-I'_{R1}$) between the value $I'_{R1}$ output from the positive current region limiter 424 and the value $I'_{Rk}$ output from the positive current region limiter 424k, and outputs a current deviation $\Delta I_{UkON}$ at the time of ON.

Here, the current magnitude discrimination circuit 426k compares $|I'_{Rk}-I'_{R1}|$ with a predetermined threshold value $I_{\Delta min}$, sets the current deviation ($\Delta I_{UkON}$) to a value equal to $I'_{Rk}-I'_{R1}$ when $|I'_{Rk}-I'_{R1}|$ is greater than or equal to the threshold value $I_{\Delta min}$, and sets the current deviation ($\Delta I_{UkON}$) to zero when $|I'_{Rk}-I'_{R1}|$ is less than the threshold value $I_{\Delta min}$.

That is, in the present embodiment, when the absolute value of the difference between the reference output current value and the R-phase output current value of the $k^{th}$ power conversion device 3k is less than the predetermined threshold value, the switching timing of the switching device of the R-phase U arm of the $k^{th}$ power conversion device 3k is not adjusted.

The current sample and hold circuit 4221off receives the U-arm OFF current detection signal SUtioff and the output current value $I_{R1}$, samples a value of the R-phase output current value $I_{R1}$ of the power conversion device 31 at a timing when the U-arm OFF current detection signal SUtioff rises, and outputs the sampled value as OFF current values $I_{U1off(l+1)}$, $I_{U1off(l+3)}$, . . .

The current sample and hold circuit 422koff receives the U-arm OFF current detection signal SUtioff and the output current value $I_{Rk}$, samples a value of the R-phase output current value $I_{Rk}$ of the power conversion device 3k at a timing when the U-arm OFF current detection signal SUtioff rises, and outputs the sampled value as OFF current values $I_{Ukoff(l+1)}$, $I_{Ukoff(l+3)}$, . . .

The output current difference calculation circuit 42Ukoff includes positive current region limiters 424 and 424k and a current magnitude discrimination circuit 426k.

The positive current region limiter 424 outputs $I'_{R1}$ which is a received value (a value obtained by multiplying the received value by 1) when the OFF current values $I_{U1off(l+1)}$, $I_{U1off(l+3)}$, . . . are greater than zero, and outputs $I'_{R1}$ which is zero (a value obtained by multiplying the received value by zero) when the OFF current values $I_{U1off(l+1)}$, $I_{U1off(l+3)}$, . . . are less than or equal to zero.

The positive current region limiter 424K outputs $I'_{Rk}$ which is a received value (a value obtained by multiplying the received value by 1) when the OFF current values $I_{Ukoff(l+1)}$, $I_{Ukoff(l+3)}$, . . . are greater than zero, and outputs $I'_{Rk}$ which is zero (a value obtained by multiplying the received value by zero) when the OFF current values $I_{Ukoff(l+1)}$, $I_{Ukoff(l+3)}$, . . . are less than or equal to zero.

The current magnitude discrimination circuit 426k calculates an absolute value of a difference ($I'_{Rk}-I'_{R1}$) between the value $I'_{R1}$ output from the positive current region limiter 424 and the value $I'_{Rk}$ output from the positive current region limiter 424k, and outputs a current deviation $\Delta I_{UkOFF}$ at the time of OFF.

Here, the current magnitude discrimination circuit 426k compares $|I'_{Rk}-I'_{R1}|$ with a predetermined threshold value $I_{\Delta min}$, sets the current deviation ($\Delta I_{UkOFF}$) to a value equal to $I'_{Rk}-I'_{R1}$ when $|I'_{Rk}-I'_{R1}|$ is greater than or equal to the threshold value $I_{\Delta min}$, and sets the current deviation ($\Delta I_{UkOFF}$) to zero when $|I'_{Rk}-I'_{R1}|$ is less than the threshold value $I_{\Delta min}$.

That is, in the present embodiment, when the absolute value of the difference between the reference output current value and the R-phase output current value of the $k^{th}$ power conversion device 3k is less than the predetermined threshold value, the switching timing of the switching device of the R-phase U arm of the $k^{th}$ power conversion device 3k is not adjusted.

FIG. 5 is a block diagram schematically illustrating a configuration example of the X-arm output current difference calculation circuit for the R phase of the $k^{th}$ power conversion device of the current balance adjustment circuit illustrated in FIG. 1.

The output current difference calculation circuit 42X includes output current detection circuits 4201 and 420k (illustrated in FIG. 4), current sample and hold (S&H) circuits 4231on and 423kon, an output current difference calculation circuit 42Xkon, current sample and hold (S&H) circuits 4231off and 423koff, and an output current difference calculation circuit 42Xkoff.

Since the output current detection circuit 4201 and the output current detection circuit 420k have the same configuration as illustrated in FIG. 4, the description thereof is omitted herein.

The current sample and hold circuit 4231on receives the X-arm ON current detection signal SXtion and the output current value $I_{R1}$, samples a value of the R-phase output current value $I_{R1}$ of the power conversion device 31 at a timing when the X-arm ON current detection signal SXtion rises, and outputs the sampled value as ON current values $I_{X1on(l)}$, $I_{X1on(l+2)}$, ...

The current sample and hold circuit 423kon receives the X-arm ON current detection signal SXtion and the output current value $I_{Rk}$, samples a value of the R-phase output current value $I_{Rk}$ of the power conversion device 3k at a timing when the X-arm ON current detection signal SXtion rises, and outputs the sampled value as ON current values $I_{Xkon(l)}$, $I_{Xkon(l+2)}$, ...

The output current difference calculation circuit 42Xkon includes negative current region limiters 425 and 425k, absolute value conversion circuits 427 and 427k, and a current magnitude discrimination circuit 426k.

The negative current region limiter 425 outputs $I''_{R1}$ which is zero (a value obtained by multiplying the received value by zero) when the ON current values $I_{X1on(l)}$, $I_{X1on(l+2)}$, ... are greater than zero, and outputs $I''_{R1}$ which is a received value (a value obtained by multiplying the received value by 1) when the ON current values $I_{X1on(l)}$, $I_{X1on(l+2)}$, ... are less than or equal to zero.

The negative current region limiter 425k outputs $I''_{Rk}$ which is zero (a value obtained by multiplying the received value by zero) when the ON current values $I_{Xkon(l)}$, $I_{Xkon(l+2)}$, ... are greater than zero, and outputs $I''_{Rk}$ which is a received value (a value obtained by multiplying the received value by 1) when the ON current values $I_{Xkon(l)}$, $I_{Xkon(l+2)}$, ... are less than or equal to zero.

The absolute value conversion circuit 427 receives the output value $I''_{R1}$ of the negative current region limiter 425 and outputs the absolute value $|I''_{R1}|$ of the received value.

The absolute value conversion circuit 427k receives the output value $I''_{Rk}$ of the negative current region limiter 425k and outputs the absolute value $|I''_{Rk}|$ of the received value.

The current magnitude discrimination circuit 426k calculates an absolute value of a difference ($|I''_{Rk}|-|I''_{R1}|$) between the value $|I''_{R1}|$ output from the absolute value conversion circuit 427 and the value $|I''_{Rk}|$ output from the absolute value conversion circuit 427k, and outputs a current deviation $\Delta I_{XkON}$ at the time of ON.

Here, the current magnitude discrimination circuit 426k compares $\||I''_{Rk}|-|I''_{R1}|\|$ with a predetermined threshold value $I_{\Delta min}$, sets the current deviation ($\Delta I_{XkON}$) to a value equal to $|I''_{Rk}|-|I''_{R1}|$ when $\||I''_{Rk}|-|I''_{R1}|\|$ is greater than or equal to the threshold value $I_{\Delta min}$, and sets the current deviation ($\Delta I_{XkON}$) to zero when $\||I''_{Rk}|-|I''_{R1}|\|$ is less than the threshold value $I_{\Delta min}$.

That is, in the present embodiment, when the absolute value of the difference between the reference output current value and the R-phase output current value of the $k^{th}$ power conversion device 3k is less than the predetermined threshold value, the switching timing of the switching device of the R-phase X arm of the $k^{th}$ power conversion device 3k is not adjusted.

The current sample and hold circuit 4231off receives the X-arm OFF current detection signal SXtioff and the output current value $I_{R1}$, samples a value of the R-phase output current value $I_{R1}$ of the power conversion device 31 at a timing when the X-arm OFF current detection signal SXtioff rises, and outputs the sampled value as OFF current values $I_{X1off(l+1)}$, $I_{X1off(l+3)}$, ...

The current sample and hold circuit 423koff receives the X-arm OFF current detection signal SXtioff and the output current value $I_{Rk}$, samples a value of the R-phase output current value $I_{Rk}$ of the power conversion device 3k at a timing when the X-arm OFF current detection signal SXtioff rises, and outputs the sampled value as OFF current values $I_{Xkoff(l+1)}$, $I_{Xkoff(l+3)}$, ...

The output current difference calculation circuit 42Xkoff includes negative current region limiters 425 and 425k, absolute value conversion circuits 427 and 427k, and a current magnitude discrimination circuit 426k.

The negative current region limiter 425 outputs $I''_{R1}$ which is zero (a value obtained by multiplying the received value by zero) when the OFF current values $I_{X1off(l+1)}$, $I_{X1off(l+3)}$, ... are greater than zero, and outputs $I''_{R1}$ which is a received value (a value obtained by multiplying the received value by 1) when the OFF current values $I_{X1off(l+1)}$, $I_{X1off(l+3)}$, ... are less than or equal to zero.

The negative current region limiter 425k outputs $I''_{Rk}$ which is zero (a value obtained by multiplying the received value by zero) when the OFF current values $I_{Xkoff(l+1)}$, $I_{Xkoff(l+3)}$, ... are greater than zero, and outputs $I''_{Rk}$ which is a received value (a value obtained by multiplying the received value by 1) when the OFF current values $I_{Xkoff(l+1)}$, $I_{Xkoff(l+3)}$, ... are less than or equal to zero.

The absolute value conversion circuit 427 receives the output value $I''_{R1}$ of the negative current region limiter 425 and outputs the absolute value $|I''_{R1}|$ of the received value.

The absolute value conversion circuit 427k receives the output value $I''_{Rk}$ of the negative current region limiter 425k and outputs the absolute value $|I''_{Rk}|$ of the received value.

The current magnitude discrimination circuit 426k calculates an absolute value of a difference ($|I''_{Rk}|-|I''_{R1}|$) between the value $|I''_{R1}|$ output from the absolute value conversion circuit 427 and the value $|I''_{Rk}|$ output from the absolute value conversion circuit 427k, and outputs a current deviation $\Delta I_{XkOFF}$ at the time of OFF.

Here, the current magnitude discrimination circuit 426k compares $\||I''_{Rk}|-|I''_{R1}|\|$ with a predetermined threshold value $I_{\Delta min}$, sets the current deviation ($\Delta I_{XkOFF}$) to a value equal to $|I''_{Rk}|-|I''_{R1}|$ when $\||I''_{Rk}|-|I''_{R}|\|$ is greater than or equal to the threshold value $I_{\Delta min}$, and sets the current deviation ($\Delta I_{XkOFF}$) to zero when $\||I''_{Rk}|-|I''_{R1}|\|$ is less than the threshold value $I_{\Delta min}$.

That is, in the present embodiment, when the absolute value of the difference between the reference output current value and the R-phase output current value of the $k^{th}$ power conversion device 3k is less than the predetermined threshold value, the switching timing of the switching device of the R-phase X arm of the $k^{th}$ power conversion device 3k is not adjusted.

FIG. 6A is a block diagram schematically illustrating a configuration example of the adjustment time calculation circuit for the R phase of the $k^{th}$ power conversion device in the current balance adjustment circuit illustrated in FIG. 1.

The adjustment time calculation circuit 43k includes a current balance adjustment amount determination circuit 430, integration circuits 43k1, 43k2, 43k3, and 43k4, an adder A2, and a standard delay time setting unit 436.

Each of the integration circuits 43k1, 43k2, 43k3, and 43k4 includes a sample and hold (S&H) circuit 432, a limiter circuit 434, and an adder A1.

The current balance adjustment amount determination circuit 430 receives the current deviations $\Delta I_{UkON}$, $\Delta I_{UkOFF}$, $\Delta I_{XkON}$, and $\Delta I_{XkOFF}$ from the output current difference calculation circuits 42U and 42X, and outputs current balance adjustment amounts CUkon, CUkoff, CXkon, and CXkoff corresponding to the values of the current deviations $\Delta I_{UkON}$, $\Delta I_{UkOFF}$, $\Delta I_{XkON}$, and $\Delta I_{XkOFF}$.

The current balance adjustment amount determination circuit 430 compares the value of the current deviation $\Delta I_{UkON}$ with zero (or determines whether the value of the current deviation $\Delta I_{UkON}$ is within a predetermined range including zero) upon reception of the current deviation $\Delta I_{UkON}$ when the U arm is ON, sets the current balance adjustment amount CUkon to a negative value (=$\Delta$CUkl) when the value of the current deviation $\Delta I_{UkON}$ is less than zero (or when less than the lower limit value of the predetermined range including zero), sets the current balance adjustment amount CUkon to a positive value (=$\Delta$CUkd) when the value of the current deviation $\Delta I_{UkON}$ is greater than zero (or when greater than the upper limit value of the predetermined range including zero), and sets the current balance adjustment amount CUkon to zero when the value of the current deviation $\Delta I_{UkON}$ is zero (or when within the predetermined range including zero).

The current balance adjustment amount determination circuit 430 compares the value of the current deviation $\Delta I_{UkOFF}$ with zero (or determines whether the value of the current deviation $\Delta I_{UkOFF}$ is within a predetermined range including zero) upon reception of the current deviation $\Delta I_{UkOFF}$ when the U arm is ON, sets the current balance adjustment amount CUkoff to a negative value (=$\Delta$CUkl) when the value of the current deviation $\Delta I_{UkOFF}$ is greater than zero (or when greater than the upper limit value of the predetermined range including zero), sets the current balance adjustment amount CUkoff to a positive value (=$\Delta$CUkd) when the value of the current deviation $\Delta I_{UkOFF}$ is less than zero (or when less than the lower limit value of the predetermined range including zero), and sets the current balance adjustment amount CUkoff to zero when the value of the current deviation $\Delta I_{UkOFF}$ is zero (or when within the predetermined range including zero).

The current balance adjustment amount determination circuit 430 compares the value of the current deviation $\Delta I_{XkON}$ with zero (or determines whether the value of the current deviation $\Delta I_{XkON}$ is within a predetermined range including zero) upon reception of the current deviation $\Delta I_{XkON}$ when the X arm is ON, sets the current balance adjustment amount CXkon to a negative value (=$\Delta$CXkl) when the value of the current deviation $\Delta I_{XkON}$ is less than zero (or when less than the lower limit value of the predetermined range including zero), sets the current balance adjustment amount CXkon to a positive value (=$\Delta$CXkd) when the value of the current deviation $\Delta I_{XkON}$ is greater than zero (or when greater than the upper limit value of the predetermined range including zero), and sets the current balance adjustment amount CXkon to zero when the value of the current deviation $\Delta I_{XkON}$ is zero (or when within the predetermined range including zero).

The current balance adjustment amount determination circuit 430 compares the value of the current deviation $\Delta I_{XkOFF}$ with zero (or determines whether the value of the current deviation $\Delta I_{XkOFF}$ is within a predetermined range including zero) upon reception of the current deviation $\Delta I_{XkOFF}$ when the X arm is OFF, sets the current balance adjustment amount CXkoff to a negative value (=$\Delta$CXkl) when the value of the current deviation $\Delta I_{XkOFF}$ is greater than zero (or when greater than the upper limit value of the predetermined range including zero), sets the current balance adjustment amount CXkoff to a positive value (=$\Delta$CXkd) when the value of the current deviation $\Delta I_{XkOFF}$ is less than zero (or when less than the lower limit value of the predetermined range including zero), and sets the current balance adjustment amount CXkoff to zero when the value of the current deviation $\Delta I_{XkOFF}$ is zero (or when within the predetermined range including zero).

It is noted that the positive value $\Delta$CUkd and the negative value $\Delta$CXkl set as the current balance adjustment amounts in the current balance adjustment amount determination circuit 430 may be fixed values, and may be values which vary according to $|I'_{Rk}-I'_{R1}|$ or $\||I''_{Rk}|-|I''_{R1}|\|$.

For example, the positive value $\Delta$CUkd may be a value obtained by multiplying $|I'_{Rk}-I'_{R1}|$ or $\||I''_{Rk}|-|I''_{R1}|\|$ by a positive proportional constant (for example, kl), and the negative value $\Delta$CXkl may be a value obtained by multiplying $|I'_{Rk}-I'_{R1}|$ or $\||I''_{Rk}|-|I''_{R1}|\|$ by a negative proportional constant (for example, −kl).

The current balance adjustment amounts CUkon, CUkoff, CXkon, and CXkoff output from the current balance adjustment amount determination circuit 430 are added to outputs BUkon, BUkoff, BXkon, and BXkoff of the limiter circuit 434 by the adder A1.

The sample and hold circuits 432 of the integration circuits 43k1 to 43k4 receive the output of the adder A1 and a signal serving as a trigger.

In the present embodiment, the sample and hold circuit 432 of the integration circuit 43k1 receives a U-arm ON current detection signal SUtion as a trigger.

The sample and hold circuit 432 of the integration circuit 43k2 receives a U-arm OFF current detection signal SUtioff as a trigger.

The sample and hold circuit 432 of the integration circuit 43k3 receives an X-arm ON current detection signal SXtion as a trigger.

The sample and hold circuit 432 of the integration circuit 43k4 receives an X-arm OFF current detection signal SXtioff as a trigger.

The sample and hold circuit 432 of the integration circuit 43k1 holds a value output from the adder A1 (current balance adjustment amount CUkon+BUkon) at a timing when the U-arm ON current detection signal SUtion falls, and outputs the value to the limiter circuit 434.

The sample and hold circuit 432 of the integration circuit 43k2 holds a value output from the adder A1 (current balance adjustment amount CUkoff+BUkoff) at a timing when the U-arm OFF current detection signal SUtioff falls, and outputs the value to the limiter circuit 434.

The sample and hold circuit 432 of the integration circuit 43k3 holds a value output from the adder A1 (current balance adjustment amount CXkon+BXkon) at a timing when the X-arm ON current detection signal SXtion falls, and outputs the value to the limiter circuit 434.

The sample and hold circuit 432 of the integration circuit 43k4 holds a value output from the adder A1 (current balance adjustment amount CXkoff+BXkoff) at a timing when the X-arm OFF current detection signal SXtioff falls, and outputs the value to the limiter circuit 434.

In addition, each of the sample and hold circuits 432 of the integration circuits 43k1 to 43k4 receives the whole stop signal $S_{SP}$, and resets the held value by the whole stop signal $S_{SP}$.

That is, when the whole stop signal $S_{SP}$ is "1", the whole stop signal $S_{SP}$ is a signal which instructs stop.

When the whole stop signal $S_{SP}$ is "1", the sample and hold circuit 432 sets the output value to zero.

FIG. 6B is a diagram for describing a configuration example of the limiter circuit of the integration circuit illustrated in FIG. 6A.

The limiter circuits 434 of the integration circuits 43k1 to 43k4 are an upper/lower limiter which compares the value received from the sample and hold circuit 432 with a predetermined upper limit value $|B|_{+MAX}$ and a predetermined lower limit value $-|B|_{-MAX}$, and outputs a value less than or equal to the upper limit value $|B|_{+MAX}$ and greater than or equal to the lower limit value $-|B|_{-MAX}$.

The outputs BUkon, BUkoff, BXkon, and BXkoff of the limiter circuits 434 of the integration circuits 43k1 to 43k4 are output to the adder A1 and the adder A2.

That is, the adder A1, the sample and hold circuit 432, and the limiter circuit 434 constitute each of the integration circuits 43k1 to 43k4.

The standard delay time setting unit 436 outputs a preset standard time delay time Tnm to the adder A2.

The adder A2 disposed at a subsequent stage of the integration circuit 43k1 adds the output BUkon of the limiter circuit 434 and the standard delay time Tnm, and outputs a result as a delay time adjustment element DUkon to the U-arm gate pulse adjustment circuit G for the R phase of the $k^{th}$ power conversion device 3k. The delay time adjustment element DUkon indicates an amount of a delay time of a rising timing (an ON timing) of a U-arm common ON signal $S_{UD}$.

The adder A2 disposed at a subsequent stage of the integration circuit 43k2 adds the output BUkoff of the limiter circuit 434 and the standard delay time Tnm, and outputs a result as a delay time adjustment element DUkoff to the U-arm gate pulse adjustment circuit G for the R phase of the $k^{th}$ power conversion device 3k. The delay time adjustment element DUkoff indicates an amount of a delay time of a falling timing (an OFF timing) of a U-arm common ON signal $S_{UD}$.

The adder A2 disposed at a subsequent stage of the integration circuit 43k3 adds the output BXkon of the limiter circuit 434 and the standard delay time Tnm, and outputs a result as the delay time adjustment element DXkon to the X-arm gate pulse adjustment circuit G for the R phase of the $k^{th}$ power conversion device 3k. The delay time adjustment element DXkon indicates an amount of a delay time of a rising timing (an ON timing) of an X-arm common ON signal $S_{XD}$.

The adder A2 disposed at a subsequent stage of the integration circuit 43k4 adds the output BXkoff of the limiter circuit 434 and the standard delay time Tnm, and outputs a result as a delay time adjustment element DXkoff to the X-arm gate pulse adjustment circuit G for the R phase of the $k^{th}$ power conversion device 3k. The delay time adjustment element DXkoff indicates an amount of a delay time of a falling timing (an OFF timing) of an X-arm common ON signal $S_{XD}$.

The U-arm gate pulse adjustment circuit G receives the delay time adjustment elements DUkon and DUkoff output from the adder A2 disposed at a subsequent stage of the integration circuit 43k1 and the adder A2 disposed at a subsequent stage of the integration circuit 43k2, and outputs a gate signal GUk of a U-arm switching device $Q_{Uk}$ by delaying an ON timing of a U-arm common ON signal $S_{UD}$ by the delay time adjustment element DUkon and delaying an OFF timing of the U-arm common ON signal $S_{UD}$ by the delay time adjustment element DUkoff.

The timing at which the U-arm gate pulse adjustment circuit G adjusts the ON timing and the OFF timing of the gate signal GUk is as follows.

When the ON switching and the OFF switching are sequentially arranged, for example, when an $l^{th}$ switching is turned on, an $(l+1)^{th}$ switching is turned off, an $(l+2)^{th}$ switching is turned on, an $(l+3)^{th}$ switching is turned off, and an $(l+4)^{th}$ switching is turned on.

In this example, to adjust the ON timing means to determine the delay time adjustment element DUkon(l) by detecting the R-phase output current value at the time of the $l^{th}$ ON, give a gate signal by adjusting the ON timing of the gate signal GUk at time of the $(l+2)^{th}$ ON according to the delay time adjustment element DUkon(l), and determine a new delay time adjustment element DUkon(l+2) toward a timing of next $(l+4)^{th}$ ON.

Therefore, to adjust the OFF timing during this period means to determine the delay time adjustment element DUkoff(l+1) by detecting the R-phase output current value at the time of the $(l+1)^{th}$ OFF, give a gate signal by adjusting the OFF timing of the gate signal GUk at the time of the $(l+3)^{th}$ OFF according to the delay time adjustment element DUkoff(l+3), and determine a new delay time adjustment element DUkoff(l+3) toward a timing of next $(l+5)^{th}$ OFF.

The X-arm gate pulse adjustment circuit G receives the delay time adjustment elements DXkon and DXkoff output from the adder A2 disposed at a subsequent stage of the integration circuit 43k3 and the adder A2 disposed at a subsequent stage of the integration circuit 43k4, and outputs a gate signal GXk of an X-arm switching device $Q_{Xk}$ by delaying an ON timing of an X-arm common ON signal $S_{XD}$ by the delay time adjustment element DXkon and delaying an OFF timing of the X-arm common ON signal $S_{XD}$ by the delay time adjustment element DXkoff.

The timing at which the U-arm and X-arm gate pulse adjustment circuits G adjust the ON timing and the OFF timing of the gate signals GUk and GXk is as follows.

When the ON switching and the OFF switching are sequentially arranged, for example, when an $l^{th}$ switching is turned on, an $(l+1)^{th}$ switching is turned off, an $(l+2)^{th}$ switching is turned on, an $(l+3)^{th}$ switching is turned off, and an $(l+4)^{th}$ switching is turned on.

In this example, to adjust the ON timing means to determine the delay time adjustment element DXkon(l) by detecting the R-phase output current value at the time of the $l^{th}$ ON, give a gate signal by adjusting the ON timing of the gate signal GXk at time of the $(l+2)^{th}$ ON according to the delay time adjustment element DXkon(l), and determine a new delay time adjustment element DXkon(l+2) toward a timing of next $(l+4)^{th}$ ON.

Therefore, to adjust the OFF timing during this period means to determine the delay time adjustment element DXkoff(l+1) by detecting the R-phase output current value at the time of the $(l+1)^{th}$ OFF, give a gate signal by adjusting the OFF timing of the gate signal GXk at the time of the $(l+3)^{th}$ OFF according to the delay time adjustment element DXkoff(l+3), and determine a new delay time adjustment element DXkoff (l+3) toward a timing of next $(l+5)^{th}$ OFF.

As described above, in a case where the switching timing of the switching devices $Q_{Uk}$ and $Q_{Xk}$ of the U arm and the X arm is adjusted, when the delay time adjustment elements DUkon and DXkon are positive, the rise timing of the gate pulse to the switching devices $Q_U$ and $Q_X$ of the U arm and the X arm is further delayed by the delay time adjustment element DUkon and DXkon with respect to the timing delayed from the rising timing of the common ON signal by the standard delay time Tnm.

When the delay time adjustment elements DUkon and DXkon are negative, the rising timing of the gate pulse to the switching devices $Q_U$ and $Q_X$ of the U arm and the X arm is advanced by the delay time adjustment elements DUkon and DXkon with respect to the timing delayed from the rising timing of the common ON signal by the standard delay time Tnm.

Similarly, when the delay time adjustment elements DUkoff and DXkoff are positive, the falling timing of the gate pulse to the switching devices $Q_U$ and $Q_X$ of the U arm and the X arm is further delayed by the delay time adjustment elements DUkoff and DXkoff with respect to the timing delayed from the falling timing of the common ON signal by the standard delay time Tnm.

When the delay time adjustment elements DUkoff and DXkoff are negative, the falling timing of the gate pulse to the switching devices $Q_U$ and $Q_X$ of the U arm and the X arm is advanced by the delay time adjustment elements DUkoff and DXkoff with respect to the timing delayed from the falling timing of the common ON signal by the standard delay time Tnm.

As described above, in a case where the switching timing of the switching devices $Q_{U2}$ to $Q_{Un}$ and $Q_{X2}$ to $Q_{Xn}$ of the U arm and the X arm is adjusted, when the output current value $I_{Rk}$ of the $k^{th}$ power conversion device $3k$ is greater than zero, the output current value $I_{R1}$ of the power conversion device 31 serving as a reference is greater than zero, and the output current value $I_{Rk}$ is greater than the output current value $I_{R1}$ (a difference is greater than a predetermined threshold value $I_{\Delta min}$), the timing of turning on the U-arm switching device $Q_{Uk}$ of the $k^{th}$ power conversion device $3k$ is delayed and adjusted so as to advance the OFF timing.

In addition, when the output current value $I_{Rk}$ of the $k^{th}$ power conversion device $3k$ is greater than zero, the output current value $I_{R1}$ of the power conversion device 31 serving as a reference is greater than zero, and the output current value $I_{Rk}$ is less than the output current value $I_{R1}$ (a difference is less than the predetermined threshold value $I_{\Delta min}$), the timing of turning on the U-arm switching device $Q_{Uk}$ of the $k^{th}$ power conversion device $3k$ is advanced and adjusted to delay the OFF timing.

In addition, when the output current value $I_{Rk}$ of the $k^{th}$ power conversion device $3k$ is less than zero, the output current value $I_{R1}$ Of the power conversion device 31 serving as a reference is less than zero, and the absolute value of the output current value $I_{Rk}$ is greater than the absolute value of the output current value $I_{R1}$ (a difference is greater than the predetermined threshold value $I_{\Delta min}$), the timing of turning on the X-arm switching device $Q_{Xk}$ of the $k^{th}$ power conversion device $3k$ is delayed and adjusted to advance the OFF timing.

In addition, when the output current value $I_{Rk}$ of the $k^{th}$ power conversion device $3k$ is less than zero, the output current value $I_{R1}$ of the power conversion device 31 serving as a reference is less than zero, and the absolute value of the output current value $I_{Rk}$ is less than the absolute value of the output current value $I_{Rk}$ (a difference is less than the predetermined threshold value $I_{\Delta min}$), the timing of turning on the X-arm switching device $Q_{Xk}$ of the $k^{th}$ power conversion device $3k$ is advanced and adjusted to delay the OFF timing.

Conventionally, when a reactor is connected to the output terminal of the power conversion device, there is a possibility that the power conversion efficiency in the power conversion system is deteriorated, and thus the number of power conversion devices necessary for obtaining a desired output current increases.

In addition, when the number of power conversion devices connected in parallel increases or decreases, it is necessary to add more reactors.

In addition, when the rise timing of the drive signal of the power conversion device having a large output current was delayed, there was a possibility that the adjustment would be performed only on the power conversion device having a small output current in the power conversion system, and the power conversion system would be stopped by a protection operation taking much time to balance the current.

On the other hand, as described above, when the output currents of the plurality of power conversion devices 31 to $3n$ are balanced, it is possible to prevent the entire power conversion system from being stopped due to an overcurrent state caused by an increase in the output of the specific power conversion device.

In addition, since the output currents of the plurality of power conversion devices 31 to $3n$ are adjusted according to the output current of the power conversion apparatus serving as the reference, it is unnecessary to adjust the output currents of the plurality of power conversion devices 31 to $3n$ according to a low value by checking the margin of the current imbalance, and it is possible to efficiently operate the power conversion system.

Further, for both the ON timing and the OFF timing in the switching devices of each phase of the plurality of power conversion devices 31 to $3n$, since the output current can be adjusted to be delayed and advanced with respect to the reference timing, it is possible to shorten the time until the output currents of the plurality of power conversion devices 31 to $3n$ converge to a balanced state.

That is, according to the present embodiment, it is possible to provide a power conversion system capable of stably operating with high utilization efficiency and a current balance adjustment circuit thereof.

Next, a power conversion system of a second embodiment will be described below with reference to the drawings.

In the power conversion system of the present embodiment, a current value serving as a reference when output currents of a plurality of power conversion device are balanced is different from that in the first embodiment described above.

That is, in the first embodiment described above, the output currents of the plurality of power conversion devices 31 to $3n$ are balanced by setting the output current of a specific power conversion device (for example, the power conversion device 31) as a reference value, but in the present embodiment, the average value of the output currents of the plurality of power conversion devices 31 to $3n$ is set as a reference value.

In the following description, the same reference numerals are assigned to the same configurations as those of the first embodiment described above, and the description thereof will be omitted.

In addition, the configuration and method for adjusting the R-phase output currents of the plurality of power conversion devices 31 to $3n$ will be described, but the same configuration is applied to the S phase and the T phase.

Figure 8:
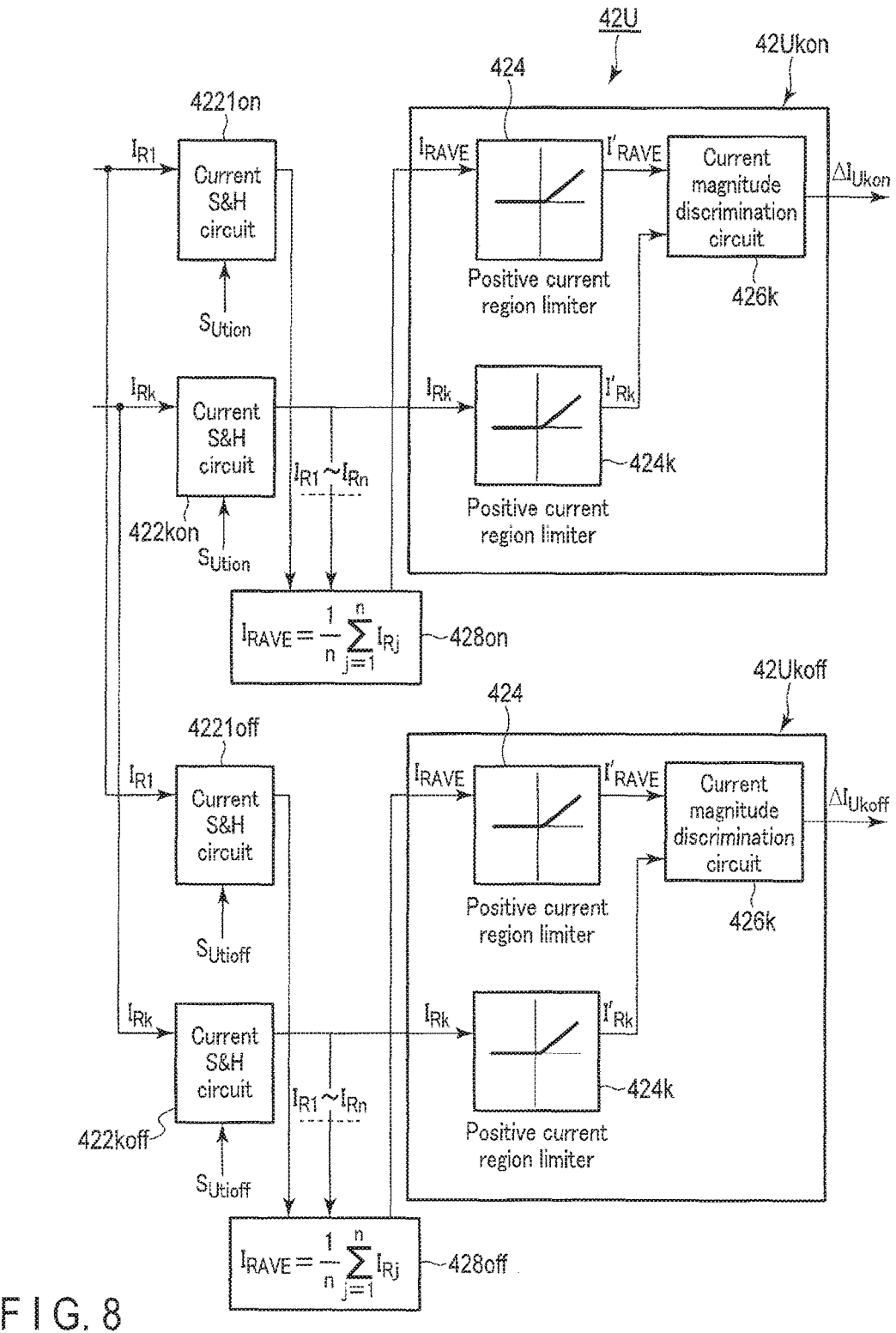
FIG. 8 is a block diagram schematically illustrating a configuration example of a U-arm output current difference calculation circuit for an R phase of a $k^{th}$ power conversion device of a current balance adjustment circuit of a power conversion system according to a second embodiment.

FIG. 8 is a block diagram schematically illustrating a configuration example of a U-arm output current difference calculation circuit for an R phase of a $k^{th}$ power conversion device of a current balance adjustment circuit of a power conversion system according to a second embodiment.

In the present embodiment, a current balance adjustment circuit 4 further includes output current average value calculation circuits 428on and 428off.

The output current average value calculation circuits 428on and 428off receive R-phase output current values $I_{R1}$ to $I_{Rn}$ (ON current values $I_{U1on(l)}$ to $I_{Unon(l)}$, and $I_{U1on(l+2)}$ to $I_{Unon(l+2)}$, and OFF current values $I_{U1off(l+1)}$ to $I_{Unoff(l+1)}$, and $I_{U1off(l+3)}$ to $I_{Unoff(l+3)}$), calculate the average value $I_{RAVE}$ of the R-phase output current values $I_{R1}$ to $I_{Rn}$ by using the following Equation (1) in synchronization with a sampling timing of each of the ON current and the OFF current, and output the current value $I_{RAVE}$ to a positive current region limiter 424.

[Math. 1]

$$I_{RAVE} = \frac{1}{n}\sum_{j=1}^{n} i_{Rj} \quad (1)$$

The output current difference calculation circuit 42U includes current sample and hold (S&H) circuits 4221on, 422kon, 4221off, and 422koff, output current average value calculation circuits 428on and 428off, and output current difference calculation circuits 42Ukon and 42Ukoff. Here, k is an integer being greater than or equal to 1 and being less than or equal to n.

The current sample and hold circuits 4221on and 4221off are circuits each of which receives the R-phase output current value of the first power conversion device 31.

In the present embodiment, each of the current sample and hold circuits 4221on and 4221off receives the R-phase output current value $I_{R1}$ of the power conversion device 31 from the current detection circuit R1.

Each of the current sample and hold circuits 422kon and 422koff receives a detected value of the R-phase output current value $I_{Rk}$ of the power conversion device 3k from the current detection circuit Rk.

The current sample and hold circuit 4221on receives the U-arm ON current detection signal SUtion and the output current value $I_{R1}$, samples a value of the R-phase output current value $I_{R1}$ of the power conversion device 31 at a timing when the U-arm ON current detection signal SUtion rises, and outputs the sampled value as ON current values $I_{U1on(l)}$, $I_{U1on(l+2)}$, . . .

The current sample and hold circuit 422kon receives the U-arm ON current detection signal SUtion and the output current value $I_{Rk}$, samples a value of the R-phase output current value $I_{Rk}$ of the power conversion device 3k at a timing when the U-arm ON current detection signal SUtion rises, and outputs the sampled value as ON current values $I_{UkON(l)}$, $I_{UkON(l+2)}$, . . .

The output current difference calculation circuit 42Ukon includes positive current region limiters 424 and 424k and a current magnitude discrimination circuit 426k.

The positive current region limiter 424 outputs $I'_{RAVE}$ which is a received value (a value obtained by multiplying the received value by 1) when an average value $I_{RAVE}$ is greater than zero, and outputs $I'_{RAVE}$ which is zero (a value obtained by multiplying the received value by zero) when the average value $I_{RAVE}$ is less than or equal to zero.

The positive current region limiter 424k outputs $I'_{Rk}$ which is a received value (a value obtained by multiplying the received value by 1) when the ON current values $I_{UkON(l)}$, $I_{Ukon(l+2)}$, . . . are greater than zero, and outputs $I'_{Rk}$ which is zero (a value obtained by multiplying the received value by zero) when the ON current values IUkon(l), $I_{Ukon(l+2)}$, . . . are less than or equal to zero.

The current magnitude discrimination circuit 426k calculates an absolute value of a difference ($I'_{Rk} - I'_{RAVE}$) between the value $I'_{RAVE}$ output from the positive current region limiter 424 and the value $I'_{Rk}$ output from the positive current region limiter 424k, and outputs a current deviation $\Delta I_{Ukon}$ at the time of ON.

Here, the current magnitude discrimination circuit 426k compares $|I'_{Rk} - I'_{RAVE}|$ with a predetermined threshold value $I_{\Delta min}$, sets the current deviation $\Delta I_{Ukon}$ to a value equal to $I'_{Rk} - I'_{RAVE}$ when $|I'_{Rk} - I'_{RAVE}|$ is greater than or equal to the threshold value $I_{\Delta min}$, and sets the current deviation ($\Delta I_{Ukon}$) to zero when $|I'_{Rk} - I'_{RAVE}|$ is less than the threshold value $I_{\Delta min}$.

That is, in the present embodiment, when the absolute value of the difference between the reference output current and the R-phase output current of the $k^{th}$ power conversion device 3k is less than the predetermined threshold value, the switching timing of the switching device of the R phase of the $k^{th}$ power conversion device 3k is not adjusted.

The current sample and hold circuit 4221off receives the U-arm OFF current detection signal SUtioff and the output current value $I_{R1}$, samples a value of the R-phase output current value $I_{R1}$ of the power conversion device 31 at a timing when the U-arm OFF current detection signal SUtioff rises, and outputs the sampled value as OFF current values $I_{U1off(l+1)}$, $I_{U1off(l+3)}$, . . .

The current sample and hold circuit 422koff receives the U-arm OFF current detection signal SUtioff and the output current value $I_{Rk}$, samples a value of the R-phase output current value $I_{Rk}$ of the power conversion device 3k at a timing when the U-arm OFF current detection signal SUtioff rises, and outputs the sampled value as OFF current values $I_{Ukoff(l+1)}$, $I_{Ukoff(l+3)}$, . . .

The output current difference calculation circuit 42Ukoff includes positive current region limiters 424 and 424k and a current magnitude discrimination circuit 426k.

The positive current region limiter 424 outputs $I'_{RAVE}$ which is a received value (a value obtained by multiplying the received value by 1) when an average value $I_{RAVE}$ is greater than zero, and outputs $I'_{RAVE}$ which is zero (a value obtained by multiplying the received value by zero) when the average value $I_{RAVE}$ is less than or equal to zero.

The positive current region limiter 424k outputs $I'_{Rk}$ which is a received value (a value obtained by multiplying the received value by 1) when the OFF current values $I_{Ukoff(l+1)}$, $I_{Ukoff(l+3)}$, . . . are greater than zero, and outputs $I'_{Rk}$ which is zero (a value obtained by multiplying the received value by zero) when the OFF current values $I_{Ukoff(l+1)}$, $I_{Ukoff(l+3)}$, . . . are less than or equal to zero.

The current magnitude discrimination circuit 426k calculates an absolute value of a difference ($I'_{Rk} - I'_{AVE}$) between the value $I'_{RAVE}$ output from the positive current region limiter 424 and the value $I'_{Rk}$ output from the positive current region limiter 424k, and outputs a current deviation $\Delta I_{Ukoff}$ at the time of OFF.

Here, the current magnitude discrimination circuit 426k compares $|I'_{Rk} - I'_{RAVE}|$ with a predetermined threshold value $I_{\Delta min}$, sets the current deviation $\Delta I_{Ukoff}$ to a value equal to $I'_{Rk} - I'_{RAVE}$ when $|I'_{Rk} - I'_{RAVE}|$ is greater than or equal to the threshold value $I_{\Delta min}$, and sets the current deviation ($\Delta I_{Ukoff}$) to zero when $|I'_{Rk} - I'_{RAVE}|$ is less than the threshold value $I_{\Delta min}$.

That is, in the present embodiment, when the absolute value of the difference between the reference output current value and the R-phase output current value of the $k^{th}$ power conversion device 3k is less than the predetermined threshold value, the switching timing of the switching device of the R phase of the $k^{th}$ power conversion device 3k is not adjusted.

Figure 9:
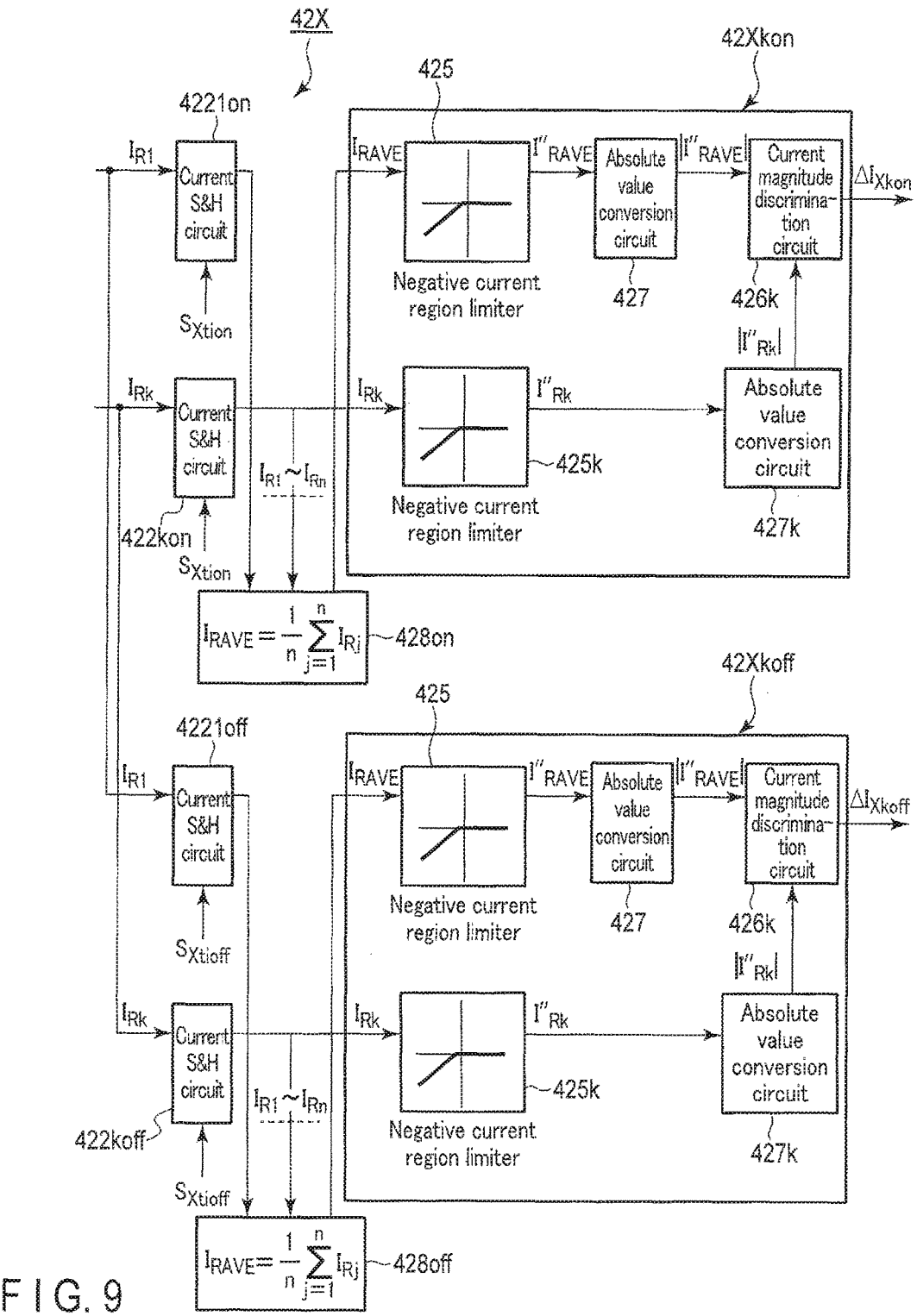
FIG. 9 is a block diagram schematically illustrating a configuration example of an X-arm output current difference calculation circuit for the R phase of the $k^{th}$ power conversion device of the current balance adjustment circuit of the power conversion system according to the second embodiment.

FIG. 9 is a block diagram schematically illustrating a configuration example of the X-arm output current difference calculation circuit for the R phase of the $k^{th}$ power conversion device of the current balance adjustment circuit of the power conversion system according to the second embodiment;

The output current difference calculation circuit 42X includes output current detection circuits 4201 and 420k (illustrated in FIG. 4), current sample and hold (S&H) circuits 4221on, 422kon, 4221off, and 422koff, and output current difference calculation circuits 42Xkon and 42Xkoff.

Since the output current detection circuit 4201 and the output current detection circuit 420k have the same configuration as illustrated in FIG. 8, the description thereof is omitted herein.

The current sample and hold circuit 4221on receives the X-arm ON current detection signal SXtion and the output current value $I_{R1}$, samples a value of the R-phase output current value $I_{R1}$ of the power conversion device 31 at a timing when the X-arm ON current detection signal SXtion rises, and outputs the sampled value as ON current values $I_{X1on(l)}, I_{X1on(l+2)}, \ldots$ The current sample and hold circuit 422kon receives the X-arm ON current detection signal SXtion and the output current value $I_{Rk}$, samples a value of the R-phase output current value $I_{Rk}$ of the power conversion device 3k at a timing when the X-arm ON current detection signal SXtion rises, and outputs the sampled value as ON current values $I_{Xkon(l)}, I_{Xkon(l+2)}, \ldots$ The output current difference calculation circuit 42Xkon includes negative current region limiters 425 and 425k, absolute value conversion circuits 427 and 427k, and a current magnitude discrimination circuit 426k.

The negative current region limiter 425 outputs $I''_{RAVE}$ which is zero (a value obtained by multiplying the received value by zero) when an average value $I_{RAVE}$ is greater than zero, and outputs $I''_{RAVE}$ which is a received value (a value obtained by multiplying the received value by 1) when the average value $I_{RAVE}$ is less than or equal to zero.

The negative current region limiter 425k outputs $I''_{Rk}$ which is zero (a value obtained by multiplying the received value by zero) when the ON current values $I_{Xkon(l)}, I_{Xkon(l+2)}, \ldots$ are greater than zero, and outputs $I''_{Rk}$ which is a received value (a value obtained by multiplying the received value by 1) when the ON current values $I_{Xkon(l)}, I_{Xkon(l+2)}, \ldots$ are less than or equal to zero.

The absolute value conversion circuit 427 receives the output value $I''_{RAVE}$ of the negative current region limiter 425 and outputs the absolute value $|I''_{RAVE}|$ of the received value.

The absolute value conversion circuit 427k receives the output value $I''_{Rk}$ of the negative current region limiter 425k and outputs the absolute value $|I''_{Rk}|$ of the received value.

The current magnitude discrimination circuit 426k calculates an absolute value of a difference ($|I''_{Rk}|-|I''_{R1}|$) between the value $|I''_{R1}|$ output from the absolute value conversion circuit 427 and the value $|I''_{Rk}|$ output from the absolute value conversion circuit 427k with respect to each of the ON current and the OFF current, and outputs a current deviation $\Delta I_{XkON}$ at the time of ON.

Here, the current magnitude discrimination circuit 426k compares $\||I''_{Rk}|-|I''_{RAVE}|\|$ with a predetermined threshold value $I_{\Delta min}$, sets the current deviation ($\Delta I_{XkON}$) to a value equal to $|I''_{Rk}|-|I''_{RAVE}|$ when $\||I''_{Rk}|-|I''_{RAVE}|\|$ is greater than or equal to the threshold value $I_{\Delta min}$, and sets the current deviation $\Delta I_{XkON}$ to zero when $\||I''_{Rk}|-|I''_{RAVE}|\|$ is less than the threshold value $I_{\Delta min}$.

That is, in the present embodiment, when the absolute value of the difference between the reference output current value and the R-phase output current value of the $k^{th}$ power conversion device 3k is less than the predetermined threshold value, the switching timing of the switching device of the R-phase X arm of the $k^{th}$ power conversion device 3k is not adjusted.

The current sample and hold circuit 4221off receives the X-arm OFF current detection signal SXtioff and the output current value $I_{R1}$, samples a value of the R-phase output current value $I_{R1}$ of the power conversion device 31 at a timing when the X-arm OFF current detection signal SXtioff rises, and outputs the sampled value as OFF current values $I_{X1off(l+1)}, I_{X1off(l+3)}, \ldots$ The current sample and hold circuit 422koff receives the X-arm OFF current detection signal SXtioff and the output current value $I_{Rk}$, samples a value of the R-phase output current value $I_{Rk}$ of the power conversion device 3k at a timing when the X-arm OFF current detection signal SXtioff rises, and outputs the sampled value as OFF current values $I_{Xkoff(l+1)}, I_{Xkoff(l+3)}, \ldots$ The output current difference calculation circuit 42Xkoff includes negative current region limiters 425 and 425k, absolute value conversion circuits 427 and 427k, and a current magnitude discrimination circuit 426k.

The negative current region limiter 425 outputs $I''_{RAVE}$ which is zero (a value obtained by multiplying the received value by zero) when an average value $I_{RAVE}$ is greater than zero, and outputs $I''_{RAVE}$ which is a received value (a value obtained by multiplying the received value by 1) when the average value $I_{RAVE}$ is less than or equal to zero.

The negative current region limiter 425k outputs $I''_{Rk}$ which is zero (a value obtained by multiplying the received value by zero) when the OFF current values $I_{Xkoff(l+1)}, I_{Xkoff(l+3)}, \ldots$ are greater than zero, and outputs $I''_{Rk}$ which is a received value (a value obtained by multiplying the received value by 1) when the OFF current values $I_{Xkoff(l+1)}, I_{Xkoff(l+3)}, \ldots$ are less than or equal to zero.

The absolute value conversion circuit 427 receives the output value $I''_{RAVE}$ of the negative current region limiter 425 and outputs the absolute value $|I''_{RAVE}|$ of the received value.

The absolute value conversion circuit 427k receives the output value $I''_{Rk}$ of the negative current region limiter 425k and outputs the absolute value $|I''_{Rk}|$ of the received value.

The current magnitude discrimination circuit 426k calculates an absolute value of a difference ($|I''_{Rk}|-|I''_{R1}|$) between the value $|I''_{R1}|$ output from the absolute value conversion circuit 427 and the value $|I''_{Rk}|$ output from the absolute value conversion circuit 427k with respect to each of the ON current and the OFF current, and outputs a current deviation $\Delta I_{Xkoff}$ at the time of OFF.

Here, the current magnitude discrimination circuit 426k compares $\||I''_{Rk}|-|I''_{RAVE}|\|$ with a predetermined threshold value $I_{\Delta min}$, sets the current deviation ($\Delta I_{Xkoff}$) to a value equal to $|I''_{Rk}|-|I''_{RAVE}|$ when $\||I''_{Rk}|-|I''_{RAVE}|\|$ is greater than or equal to the threshold value $I_{\Delta min}$, and sets the current deviation $\Delta I_{Xkoff}$ to zero when $\||I''_{Rk}|-|I''_{RAVE}|\|$ is less than the threshold value $I_{\Delta min}$.

That is, in the present embodiment, when the absolute value of the difference between the reference output current value and the R-phase output current value of the $k^{th}$ power conversion device 3k is less than the predetermined threshold value, the switching timing of the switching device of the R-phase X arm of the $k^{th}$ power conversion device $3k$ is not adjusted.

The power conversion system of the present embodiment is the same as that of the first embodiment described above, except for the configuration of the current balance adjustment circuit 4.

According to the power conversion system of the present embodiment, the same effects as those of the first embodiment described above can be obtained.

That is, according to the present embodiment, it is possible to provide a power conversion system capable of stably operating with high utilization efficiency and a current balance adjustment circuit thereof.

Next, a power conversion system of a third embodiment will be described below with reference to the drawings.

The operation of the current magnitude discrimination circuit 426k in the power conversion system of the present embodiment is different from that of the second embodiment described above, and will be described with reference to FIGS. 8 and 9.

In the present embodiment, the current magnitude discrimination circuit 426k in the configuration example of the U-arm output current difference calculation circuit for the R phase of the $k^{th}$ power conversion device of the current balance adjustment circuit of the power conversion system compares $I'_{Rk} - I'_{RAVE}$ with a predetermined threshold value Imin, sets the current deviation ($\Delta I_{Ukon}$ or $\Delta I_{Ukoff}$) to a value equal to $I'_{Rk} - I'_{RAVE}$ ($\geq 0$) when $I'_{Rk} - I'_{RAVE}$ is greater than or equal to the threshold value $I_{\Delta min}$, and sets the current deviation ($\Delta I_{Ukon}$ or $\Delta I_{Ukoff}$) to zero when $|I'_{Rk} - I'_{RAVE}|$ is less than the threshold value $I_{\Delta min}$.

That is, regarding the adjustment of the rising timing and the falling timing of the gate pulse, when the output current value $I_{Rk}$ is greater than zero and the output current value $I_{Rk}$ is less than the average current value $I_{RAVE}$ (also including a case where a difference is less than the threshold value $I_{\Delta min}$), the current balance adjustment amount determination circuit 430 in the power conversion system of the present embodiment sets the current balance adjustment amounts CUkon and CUkoff to zero, the adjustment to advance the ON timing of the U-arm switching device $Q_U$ is not performed, and the adjustment to delay the OFF timing is not performed.

In addition, in the present embodiment, the current magnitude discrimination circuit 426k in the configuration example of the X-arm output current difference calculation circuit for the R phase of the $k^{th}$ power conversion device of the current balance adjustment circuit of the power conversion system compares $||I''_{Rk}| - |I''_{RAVE}||$ with a predetermined threshold value $I_{\Delta min}$, sets the current deviation ($\Delta IXkon$ or $\Delta I_{Xkoff}$) to a value equal to $|I''_{Rk}| - |I''_{RAVE}|$ ($\geq 0$) when $||I''_{Rk}| - |I''_{RAVE}||$ is greater than or equal to the threshold value $I_{\Delta min}$, and sets the current deviation ($\Delta IXkon$ or $\Delta I_{Xkoff}$) to zero when $||I''_{Rk}| - |I''_{RAVE}||$ is less than the threshold value $I_{\Delta min}$ or when $|I''_{Rk}| - |I''_{RAVE}|$ is less than zero.

That is, when the output current value $I_{Rk}$ is less than zero, the average current value $I_{RAVE}$ is less than zero, and the absolute value of the output current value $I_{Rk}$ is less than the absolute value of the average current value $I_{RAVE}$ (also including a case where a difference is less than the threshold value $I_{\Delta min}$), the current balance adjustment amount determination circuit 430 in the power conversion system of the present embodiment sets the current balance adjustment amounts CXkon and CXkoff to zero, the adjustment to advance the ON timing of the X-arm switching device QX is not performed, and the adjustment to delay the OFF timing is not performed.

In other words, in the present embodiment, when the output current value $I_{Rk}$ is greater than the reference value (average current value $I_{RAVE}$), the current balance adjustment circuit 4 adjusts the delay time (increases the delay time) so that the rising timing of the common gate pulse (common ON signal) is delayed, and sets the delay time of the falling timing of the common gate pulse (common ON signal) to a constant value (=Td).

According to the power conversion system of the present embodiment, as compared with the first and second embodiments described above, the same effects as those of the first and second embodiments can be obtained, except that the time required for the output current to converge to a balanced state becomes longer, and it is possible to sufficiently secure the dead time Td of the gate pulse.

That is, according to the present embodiment, it is possible to provide a power conversion system capable of stably operating with high utilization efficiency and a current balance adjustment circuit thereof.

Next, a power conversion system of a fourth embodiment will be described below with reference to the drawings.

FIG. 10 is a block diagram schematically illustrating a configuration example of a power conversion system according to a fourth embodiment.

The power conversion system includes a control device including a current balance adjustment circuit, and a plurality of power conversion devices, and AC output terminals of the plurality of power conversion devices are connected in parallel to each other.

The power conversion system of the present embodiment is configured to be able to stop only an arbitrary $k^{th}$ power conversion device $3k$, for example, when the power conversion system continues to operate.

In addition, the power conversion system, in which a plurality of power conversion devices 31 to 3n are connected in parallel, is configured to be operable from a state in which the power conversion device $3k$ is stopped, in a state in which power conversion devices other than the arbitrary $k^{th}$ power conversion device $3k$ is operating.

When only the power conversion device $3k$ is stopped, the switching timing is adjusted to the maximum so as to lower the output current value $I_{R3k}$ of the power conversion device $3k$, and then the operation of the power conversion device $3k$ is stopped.

The power conversion system of the present embodiment includes a control device and a plurality of power conversion devices 31 to 3n (n is a positive integer).

The control device includes, for example, a whole operation signal generation unit 1, a gate pulse generation circuit 2, a current balance adjustment circuit 4, an operation stop instruction circuit 5, AND circuits KA1, KA2, and KA3, and an OFF delay circuit D1.

The operation stop instruction circuit 5 outputs an operation signal $S_{SK}$ of a specific power conversion device $3k$. The operation signal $S_{SK}$ is, for example, "0" when stopping the power conversion device $3k$ and "1" when operating the power conversion device $3k$.

The AND circuit KA1 receives the whole operation signal $S_{ST}$ and the operation signal $S_{SK}$, calculates a logical AND of the whole operation signal $S_{ST}$ and the stop instruction $S_{SK}$, and outputs as a unit k operation signal $S_{STK}$.

Therefore, the unit k operation signal $S_{STK}$ is "1" when both the whole operation signal $S_{ST}$ and the stop instruction $S_{SK}$ are "1", and is "0" at least one of the whole operation signal $S_{ST}$ and the stop instruction $S_{SK}$ is "0".

That is, the unit k operation signal $S_{STK}$ is "1" when the whole power conversion system is in an operating state and the operation of the power conversion device 3k is continued, and is "0" in the other cases.

The OFF delay circuit D1 receives the unit k operation signal $S_{STK}$, delays an OFF timing of the unit k operation signal $S_{STK}$ (timing of changing from "1" to "0"), and outputs the delayed OFF timing.

The AND circuit KA2 receives the delayed unit k operation signal $S_{STK}$ and the U-arm common ON signal $S_{UD}$, calculates the logical AND of the delayed unit k operation signal $S_{STK}$ and the U-arm common ON signal $S_{UD}$, and outputs the calculation result to the gate pulse adjustment circuit G.

The AND circuit KA3 receives the delayed unit k operation signal $S_{STK}$ and the X-arm common ON signal $S_{XD}$, calculates the logical AND of the delayed unit k operation signal $S_{STK}$ and the X-arm common On signal $S_{XD}$, and outputs the calculation result to the gate pulse adjustment circuit G.

Therefore, when the unit k operation signal $S_{STK}$ is "0", the input of the gate pulse adjustment circuit G is "0", and no gate pulse is applied to the switching devices $Q_U$ and $Q_X$.

It is noted that only the R phases of the plurality of power conversion devices 31 to 3n are described in FIG. 10, and the description of the S phases and the T phases is omitted. The same configurations as those of the R phases are applied to the S phases and the T phases of the plurality of power conversion devices 31 to 3n.

FIG. 11 is a block diagram schematically illustrating a configuration example of a current detection timing generation circuit of the current balance adjustment circuit illustrated in FIG. 10.

The current balance adjustment circuit 4 includes a current detection timing generation circuit 41'.

The current detection timing generation circuit 41' includes NOT circuit 41c and 41ck, a U-arm delay circuit 41U, and an X-arm delay circuit 41X.

The NOT circuit 41ck receives the unit k operation signal $S_{STk}$ and outputs a unit k stop signal $S_{SPk}$ which is obtained by inverting the unit k operation signal $S_{STk}$.

The other configurations of the current detection timing generation circuit 41' is the same as those of the current detection timing generation circuit 41 illustrated in FIG. 3.

Figure 12:
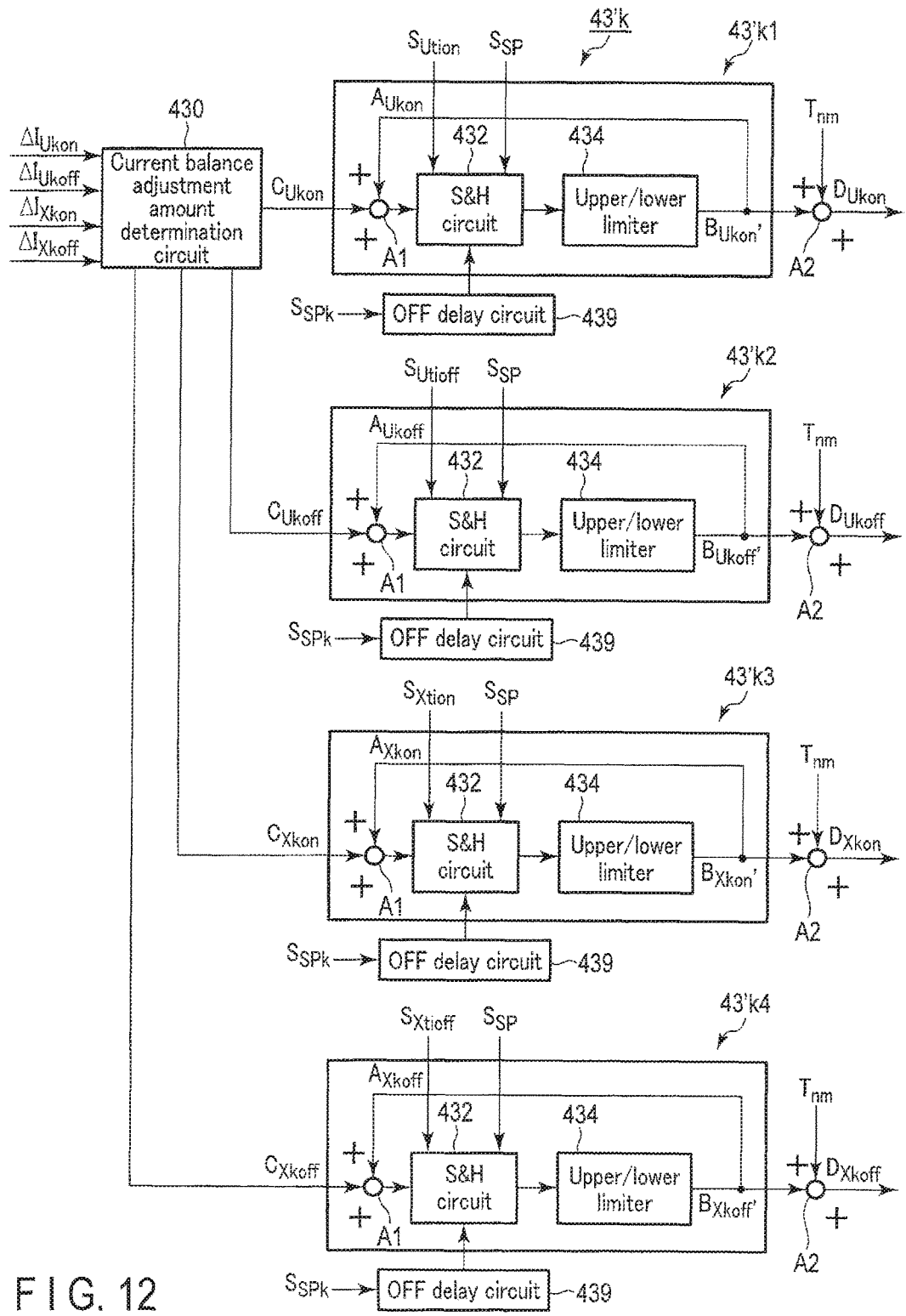
FIG. 12 is a block diagram schematically illustrating a configuration example of an adjustment time calculation circuit for an R phase of a $k^{th}$ power conversion device of the current balance adjustment circuit illustrated in FIG. 10.

FIG. 12 is a block diagram schematically illustrating a configuration example of an adjustment time calculation circuit for an R phase of a $k^{th}$ power conversion device of the current balance adjustment circuit illustrated in FIG. 10.

The adjustment time calculation circuit 43'k includes a current balance adjustment amount determination circuit 430, a sample and hold (S&H) circuit 432, a limiter circuit 434, a standard delay time setting unit 436, an OFF delay circuit 439, and adders A1 and A2.

The current balance adjustment amount determination circuit 430 receives the current deviations $\Delta I_{Ukon}$, $\Delta I_{Ukoff}$, $\Delta I_{Xkon}$, and $\Delta I_{Xkoff}$ from the output current difference calculation circuits 42U and 42X, and outputs current balance adjustment amounts CUkon, CUkoff, CXkon, and CXkoff corresponding to the values of the current deviations $\Delta I_{Ukon}$, $\Delta I_{Ukoff}$, $\Delta I_{Xkon}$, and $\Delta I_{Xkoff}$.

The current balance adjustment amount determination circuit 430 compares the value of the current deviation $\Delta I_{Ukon}$ with zero upon reception of the current deviation $\Delta I_{Ukon}$ when the U arm is ON, sets the current balance adjustment amount CUkon to a negative value ($=\Delta CUkl$) when the value of the current deviation $\Delta I_{Ukon}$ is less than zero, sets the current balance adjustment amount CUkon to a positive value ($=\Delta CUkd$) when the value of the current deviation $\Delta I_{Ukon}$ is greater than zero, and sets the current balance adjustment amount CUkon to zero when the value of the current deviation $\Delta I_{Ukon}$ is zero.

The current balance adjustment amount determination circuit 430 compares the value of the current deviation $\Delta I_{Ukoff}$ with zero upon reception of the current deviation $\Delta I_{Ukoff}$ when the U arm is OFF, sets the current balance adjustment amount CUkoff to a negative value ($=\Delta CUkl$) when the value of the current deviation $\Delta I_{Ukoff}$ is greater than zero, sets the current balance adjustment amount CUkoff to a positive value ($=\Delta CUkd$) when the value of the current deviation $\Delta I_{Ukoff}$ is less than zero, and sets the current balance adjustment amount CUkoff to zero when the value of the current deviation $\Delta I_{Ukoff}$ is zero.

The current balance adjustment amount determination circuit 430 compares the value of the current deviation $\Delta I_{Xkon}$ with zero upon reception of the current deviation $\Delta I_{Xkon}$ when the X arm is ON, sets the current balance adjustment amount CXkon to a negative value ($=\Delta CXkl$) when the value of the current deviation $\Delta I_{Xkon}$ is less than zero, sets the current balance adjustment amount CXkon to a positive value ($=\Delta CXkd$) when the value of the current deviation $\Delta I_{Xkon}$ is greater than zero, and sets the current balance adjustment amount CXkon to zero when the value of the current deviation $\Delta I_{Xkon}$ is zero.

The current balance adjustment amount determination circuit 430 compares the value of the current deviation $\Delta I_{Xkoff}$ with zero upon reception of the current deviation $\Delta I_{Xkoff}$ when the X arm is OFF, sets the current balance adjustment amount CXkoff to a negative value ($=\Delta CXkl$) when the value of the current deviation $\Delta I_{Xkoff}$ is greater than zero, sets the current balance adjustment amount CXkoff to a positive value ($=\Delta CXkd$) when the value of the current deviation $\Delta I_{Xkoff}$ is less than zero, and sets the current balance adjustment amount CXkoff to zero when the value of the current deviation $\Delta I_{Xkoff}$ is zero.

It is noted that the positive value $\Delta CUkd$ and the negative value $\Delta CXkl$ set as the current balance adjustment amounts in the current balance adjustment amount determination circuit 430 may be fixed values, and may be values which vary according to $|I'_{Rk}-I'_{R1}|$ or $|I''_{Rk}|-|I''_{R1}|$ (or values which vary according to the values of $I_{Ukon}$, $\Delta I_{Ukoff}$, $\Delta I_{Xkon}$, and $\Delta I_{Xkoff}$).

For example, the positive value $\Delta CUkd$ may be a value obtained by multiplying $|I'_{Rk}-I'_{R1}|$ or $\||I''_{Rk}|-|I''_{R1}|\|$ (or the current deviations $\Delta I_{Ukon}$, $\Delta I_{Ukoff}$, $\Delta I_{Xkon}$, and $\Delta I_{Xkoff}$) by a positive proportional constant (for example, kl), and the negative value $\Delta CXkl$ may be a value obtained by multiplying $|I'_{Rk}-I'_{R1}|$ or $\||I''_{Rk}|-|I''_{R1}|\|$ (or the current deviations $\Delta I_{Ukon}$, $\Delta I_{Ukoff}$, $\Delta I_{Xkon}$, and $\Delta I_{Xkoff}$) by a negative proportional constant (for example, -kl).

The current balance adjustment amounts CUkon, CUkoff, CXkon, and CXkoff output from the current balance adjustment amount determination circuit 430 are added to outputs BUkon, BUkoff, BXkon, and BXkoff of the limiter circuit 434 by the adder A1.

The OFF delay circuit 439 receives the unit k stop signal $S_{SPk}$ and outputs a signal obtained by delaying the unit k stop signal $S_{SPk}$.

The sample and hold circuit 432 receives the output of the adder A1, the signal serving as the trigger, the whole stop signal $S_{SP}$, and the delayed unit k stop signal $S_{SPk}$.

In the present embodiment, the sample and hold circuit 432 receives a U-arm ON current detection signal SUtion, a U-arm OFF current detection signal SUtioff, an X-arm ON current detection signal SXtion, and an X-arm OFF current detection signal SXtioff as the trigger.

The sample and hold circuits 432 of the integration circuits 43′k1 to 43′k4 receive the output of the adder A1 and the signal serving as the trigger.

In the present embodiment, the sample and hold circuit 432 of the integration circuit 43′k1 receives a U-arm ON current detection signal SUtion as a trigger.

The sample and hold circuit 432 of the integrating circuit 43′k2 receives the U-arm ON current detection signal SUtioff as the trigger.

The sample and hold circuit 432 of the integrating circuit 43′k3 receives the X-arm ON current detection signal SXtion as the trigger.

The sample and hold circuit 432 of the integrating circuit 43′k4 receives the X-arm OFF current detection signal SXtioff as the trigger.

The sample and hold circuit 432 of the integration circuit 43′k1 holds a value output from the adder A1 (current balance adjustment amount CUkon+BUkon) at a timing when the U-arm ON current detection signal SUtion falls, and outputs the value to the limiter circuit 434.

The sample and hold circuit 432 of the integration circuit 43′k2 holds a value output from the adder A1 (current balance adjustment amount CUkoff+BUkoff) at a timing when the U-arm OFF current detection signal SUtioff falls, and outputs the value to the limiter circuit 434.

The sample and hold circuit 432 of the integration circuit 43′k3 holds a value output from the adder A1 (current balance adjustment amount CXkon+BXkon) at a timing when the X-arm ON current detection signal SXtion falls, and outputs the value to the limiter circuit 434.

The sample and hold circuit 432 of the integration circuit 43′k4 holds a value output from the adder A1 (current balance adjustment amount CXkoff+BXkoff) at a timing when the X-arm OFF current detection signal SXtioff falls, and outputs the value to the limiter circuit 434.

In addition, each of the sample and hold circuits 432 of the integration circuits 43′k1 to 43′k4 resets the held value by the whole stop signal $S_{SP}$.

That is, when the whole stop signal $S_{SP}$ is "1", the whole stop signal $S_{SP}$ is a signal which instructs stop.

When the whole stop signal $S_{SP}$ is "1", the sample and hold circuit 432 sets the output value to zero.

In addition, when the value of the unit k stop signal $S_{SPk}$ is "1", each of the sample and hold circuits 432 of the integration circuits 43′k1 to 43′k4 sets the outputs BUkon, BUkoff, BXkon, and BXkoff to an upper limit value $|B|_{+MAX}$ or a lower limit value $-|B|_{-MAX}$ of the limiter circuit 434.

The upper limit value $|B|_{+MAX}>0$, and the lower limit value $-|B|_{-MAX}<0$.

In addition, when the value of the delayed unit k stop signal $S_{SPk}$ is "1", the outputs BUkon and BXkon are set to the upper limit value $|B|_{+MAX}$, and the outputs BUkoff and BXkoff are set to the lower limit value $-|B|_{-MAX}$ of the limiter circuit 434.

As described above, the outputs of the sample and hold circuits 432 of the integration circuits 43′k1 to 43′k4 are fixed, the delay times DUkoff and DXkoff at the falling edge of the gate pulse become a minimum value (=Tnm − $|B|_{-MAX}$), and the delay times DUkon and DXkon at the rising edge become a maximum value (=Tnm+$|B|_{+MAX}$).

Therefore, the output current value $I_{Rk}$ shared by the power conversion device 3k is minimized.

After that, the unit k operation signal $S_{STk}$ delayed by the OFF delay circuit D1 is switched from "1" to "0", the gate signal to the power conversion device 3k is stopped, and the operation of the power conversion device 3k is stopped.

As the operation of the OFF delay circuit 439, the power conversion device 3k enters a stop operation when the corresponding stop signal $S_{SPk}$ is switched from "0" to "1".

At this time, since the OFF delay circuit 439 operates without delay, the delay time by the OFF delay circuit 439 is zero.

Next, when operating from a state in which only the power conversion device 3k is stopped, the operation is started with an initial setting in which the output current value $I_{Rk}$ of the power conversion device 3k is set to be lowest, and after that, a parallel operation is performed with other power conversion devices so as to be balanced with the output currents of other power conversion devices.

First, the operation stop instruction circuit 5 sets the operation signal $S_{SK}$ from "0" to "1".

At this time, since the whole operation signal is "1", the unit k operation signal $S_{STk}$ to the power conversion device 3k is set from "0" to "1".

Here, since the whole stop signal is "0" and the unit k stop signal is "1" when the power conversion device 3k is in a stopped state, each of the sample and hold circuits 432 of the integration circuits 43′k1 to 43′k4 is in a state in which the outputs BUkon, BUkoff, BXkon, and BXkoff are set to the upper limit value $|B|_{+MAX}$ or the lower limit value $-|B|_{-MAX}$ of the limiter circuit 434.

When the unit k operation signal $S_{STk}$ is given, the OFF delay circuit D1 becomes "1" without delay, and thus the power conversion device 3k starts operating.

On the other hand, although the unit k stop signal $S_{SPk}$ which is "0" is given to the sample and hold circuit 432 via the OFF delay circuit 439, the set output value is not released immediately after the start of the operation of the power conversion device 3k, and the output of the sample and hole circuit 432 is set to a set value in the period until the elapse of the delay time by the OFF delay circuit 439.

When the delay time by the OFF delay circuit 439 has elapsed, the delayed unit k stop signal $S_{SPk}$ becomes "0", the output current value $I_{Rk}$ of the power conversion device 3k is controlled so as to be balanced with the output currents of other power conversion devices, and the parallel operation is finally performed with other power conversion devices.

As described above, by adjusting the output current of a specific power conversion device among the plurality of power conversion devices connected in parallel, maintenance or the like of the specific power conversion device can be performed without stopping the operation of the entire power conversion system.

That is, according to the present embodiment, it is possible to provide a power conversion system capable of stably operating with high utilization efficiency and a current balance adjustment circuit thereof.

Next, a power conversion system of a fifth embodiment will be described below with reference to the drawings.

FIG. 13 is a block diagram schematically illustrating a configuration example of a power conversion system according to a fifth embodiment.

The power conversion system includes a control device including a current balance adjustment circuit, and a plurality of power conversion devices, and AC output terminals of the plurality of power conversion devices are connected in parallel to each other.

The power conversion system of the present embodiment includes a control device and a plurality of power conversion devices 61 to 6n (n is a positive integer).

The control device includes, for example, a whole operation signal generation unit 1, a gate pulse generation circuit 2', and a current balance adjustment circuit 4.

A three-phase three-level power conversion device includes, for example, a three-level conversion circuit in which first to fourth switching devices having diodes connected in anti-parallel are sequentially connected in series from a positive electrode toward a negative electrode of a DC power source having the positive electrode, the negative electrode, and a neutral electrode, an AC output terminal is taken out from a connection point between the second switching device and the third switching device, and diodes are respectively inserted from a connection point between the third switching device and the fourth switching device toward the neutral electrode and from the neutral electrode toward a connection point between the first switching device and the second switching device.

The whole operation signal generation unit 1 generates a whole operation signal $S_{ST}$ for switching between an operation and a stop of the power conversion system, and outputs the whole operation signal $S_{ST}$ to the gate pulse generation circuit 2' and the current balance adjustment circuit 4.

The gate pulse generation circuit 2' receives the whole operation signal $S_{ST}$ from the whole operation signal generation unit 1, generates gate pulses common to R phases of the plurality of power conversion devices 61 to 6n (UNA-arm common ON signal $S_{UNAD}$, UNB-arm common ON signal $S_{UNBD}$, XNA-arm common ON signal $S_{XNAD}$, and XNB-arm common ON signal $S_{XNBD}$) based on the whole operation signal $S_{ST}$, and outputs the common gate pulses to the R phases of the plurality of power conversion devices 61 to 6n.

Each of the power conversion devices 61 to 6n has three phases, that is, an R phase, an S phase, and a T phase, and each of the three phases includes an upper arm and a lower arm connected in series between DC links. The upper arm and the lower arm are electrically connected to the AC output terminal. The upper arm of the R phase is constituted by a series connection of a UNA arm on a positive DC link side and a UNB on an AC output terminal side, and the lower arm of the R phase is constituted by a series connection of an XNB arm on an AC output terminal side and an XNA arm on a negative DC link side.

In the present embodiment, for example, a switching device of a UNA arm of a $k^{th}$ power conversion device 6k is $Q_{UNAk}$, a switching device of a UNB arm is $Q_{UNBk}$, a switching device of an XNB arm is $Q_{XNBk}$, and a switching device of an XNA arm is $Q_{XNAk}$.

The current balance adjustment circuit 4 outputs a plurality of adjustment time signals (delay time adjustment elements) of a gate pulse (the common ON signals) of each phase arm of each of the plurality of power conversion devices 61 to 6n, based on the whole operation signal $S_{ST}$ from the whole operation signal generation unit 1, a plurality of gate pulses (the common ON signals) from the gate pulse generation circuit 2 (for example, for the R phase, UNA-arm common ON signal $S_{UNAD}$, UNB-arm common ON signal $S_{UNBD}$, XNA-arm common ON signal $S_{XNAD}$, and XNB-arm common ON signal $S_{XNBD}$), and the output current of each phase of each of the plurality of power conversion devices 61 to 6n.

It is noted that only the R phases of the plurality of power conversion devices 61 to 6n are described in FIG. 13, and the description of the S phases and the T phases is omitted. The same configurations as those of the R phases are applied to each of the S phases and the T phases of the plurality of power conversion devices 61 to 6n.

Hereinafter, the respective configurations of the gate pulse generation circuit 2' and the current balance adjustment circuit 4 will be described in detail.

FIG. 14 is a block diagram schematically illustrating a configuration example of the gate pulse generation circuit 2' illustrated in FIG. 13.

FIG. 15 is a timing chart for describing an example of the operation of the gate pulse generation circuit 2' and the current balance adjustment circuit 4 illustrated in FIG. 13.

The gate pulse generation circuit 2' includes an ON/OFF signal generation circuit 21', NOT circuits 21Uc and 21Xc, and ON delay circuits 22UA, 22UB, 22XA, and 22XB.

The ON/OFF signal generation circuit 21' receives the whole operation signal $S_{ST}$ and generates an R-phase positive-side PWM control signal $S_{RPC}$, an R-phase negative-side PWM control signal $S_{RMC}$, an S-phase positive-side PWM control signal $S_{SPC}$, an S-phase negative-side PWM control signal $S_{SMC}$, a T-phase positive-side PWM control signal $S_{TPC}$, and a T-phase negative-side PWM control signal $S_{TMC}$.

The ON/OFF signal generation circuit 21' compares modulation waves $V_{RO}^*$, $V_{SO}^*$, and $V_{TO}^*$ corresponding to the output voltages of the R phase, the S phase, and the T phase with a positive carrier wave and a negative carrier wave common to the three phases, and generates the PWM control signal, to which ON and OFF timings are set for each phase, as the R-phase positive-side PWM control signal $S_{RPC}$, the R-phase negative-side PWM control signal $S_{RMC}$, the S-phase positive-side PWM control signal $S_{SPC}$, the S-phase negative-side PWM control signal $S_{SMC}$, the T-phase positive-side PWM control signal $S_{TPC}$, and the T-phase negative-side PWM control signal $S_{TMC}$.

FIG. 15 illustrates the R-phase positive-side PWM control signal $S_{RPC}$, the R-phase negative-side PWM control signal $S_{RMC}$, and inverted signals $S_{RPCN}$ and $S_{RMCN}$ thereof.

In a period during which the R-phase modulation wave $V_{RO}^*$ is positive, the R-phase positive-side PWM control signal $S_{RPC}$ is generated by the positive carrier wave common to the three phases and the modulation wave $V_{RO}^*$.

The positive-side PWM control signal $S_{RPC}$ on the R side is the PWM control signal of the switching device $Q_{UNAk}$ of the UNA arm.

The inverted signal $S_{RPCN}$ of the positive-side PWM control signal $S_{RPC}$ on the R side is the PWM control signal of the switching device $Q_{XNBk}$ of the XNB arm.

In a period during which the modulation wave $V_{RO}^*$ of the R phase is positive, the PWM control signal $S_{RMC}$ of the switching device $Q_{UNBk}$ of the UNB arm is "1" and the PWM control signal $S_{RMCN}$ of the switching device $Q_{XNAk}$ of the XNA arm is "0".

In a period during which the R-phase modulation wave $V_{RO}^*$ is negative, the R-phase negative-side PWM control signal $S_{RMC}$ is generated by the negative carrier wave common to the three phases and the modulation wave $V_{RO}^*$.

The negative-side PWM control signal $S_{RMC}$ on the R side is the PWM control signal of the switching device $Q_{UNBk}$ of the UNB arm.

The inverted signal $S_{RMCN}$ of the negative-side PWM control signal $S_{RMC}$ on the R side is the PWM control signal of the switching device $Q_{XNAk}$ of the XNA arm.

In a period during which the modulation wave $V_{RO}^*$ of the R phase is negative, the PWM control signal $S_{RPC}$ of the switching device $Q_{UNAk}$ of the UNA arm is "0" and the PWM control signal $S_{RPCN}$ of the switching device $Q_{XNBk}$ of the XNB arm is "1".

The ON delay circuit 22UA receives the R-phase positive-side PWM control signal $S_{RPC}$ output from the ON/OFF signal generation circuit 21, and outputs a UNA-arm common ON signal $S_{UNAD}$, which is obtained by delaying the rising timing of the positive-side PWM control signal $S_{RPC}$ by a predetermined period Td, to the plurality of power conversion devices 61 to 6n and the current balance adjustment circuit 4.

In consideration of the dead time necessary for avoiding occurrence of a period during which a U-arm switching device and an X-arm switching device are simultaneously turned on, it is determined how long the predetermined period Td should be.

The NOT circuit 21Uc receives the R-phase positive-side PWM control signal $S_{RPC}$ output from the ON/OFF signal generation circuit 21, and outputs the inverted positive-side PWM control signal $S_{RPCN}$, which is obtained by inverting the positive-side PWM control signal, to the ON delay circuit 22XB.

The ON delay circuit 22XB receives the R-phase inverted positive-side PWM control signal $S_{RPCN}$ output from the NOT circuit 21Uc, and outputs an XNB-arm common ON signal $S_{XNBD}$, which is obtained by delaying the rising timing of the inverted positive-side PWM control signal $S_{RPCN}$ by the predetermined period Td, to the plurality of power conversion devices 61 to 6n and the current balance adjustment circuit 4.

The ON delay circuit 22UB receives the R-phase negative-side PWM control signal $S_{RMC}$ output from the ON/OFF signal generation circuit 21, and outputs a UNB-arm common ON signal $S_{UNBD}$, which is obtained by delaying the rising timing of the negative-side PWM control signal $S_{RMC}$ by the predetermined period Td, to the plurality of power conversion devices 61 to 6n and the current balance adjustment circuit 4.

The NOT circuit 21Xc receives the R-phase negative-side PWM control signal $S_{RMC}$ output from the ON/OFF signal generation circuit 21, and outputs the inverted negative-side PWM control signal $S_{RMCN}$, which is obtained by inverting the negative-side PWM control signal, to the ON delay circuit 22XA.

The ON delay circuit 22XA receives the R-phase inverted negative-side PWM control signal $S_{RMCN}$ output from the NOT circuit 21Xc, and outputs an XNA-arm common ON signal $S_{XNAD}$, which is obtained by delaying the rising timing of the inverted negative-side PWM control signal $S_{RMCN}$ by the predetermined period Td, to the plurality of power conversion devices 61 to 6n and the current balance adjustment circuit 4.

The current balance adjustment circuit 4 includes a current detection timing generation circuit 41', output current difference calculation circuits 42UNA, 42UNB, 42XNB, and 42XNA, and an adjustment time calculation circuit 43.

Figure 16:
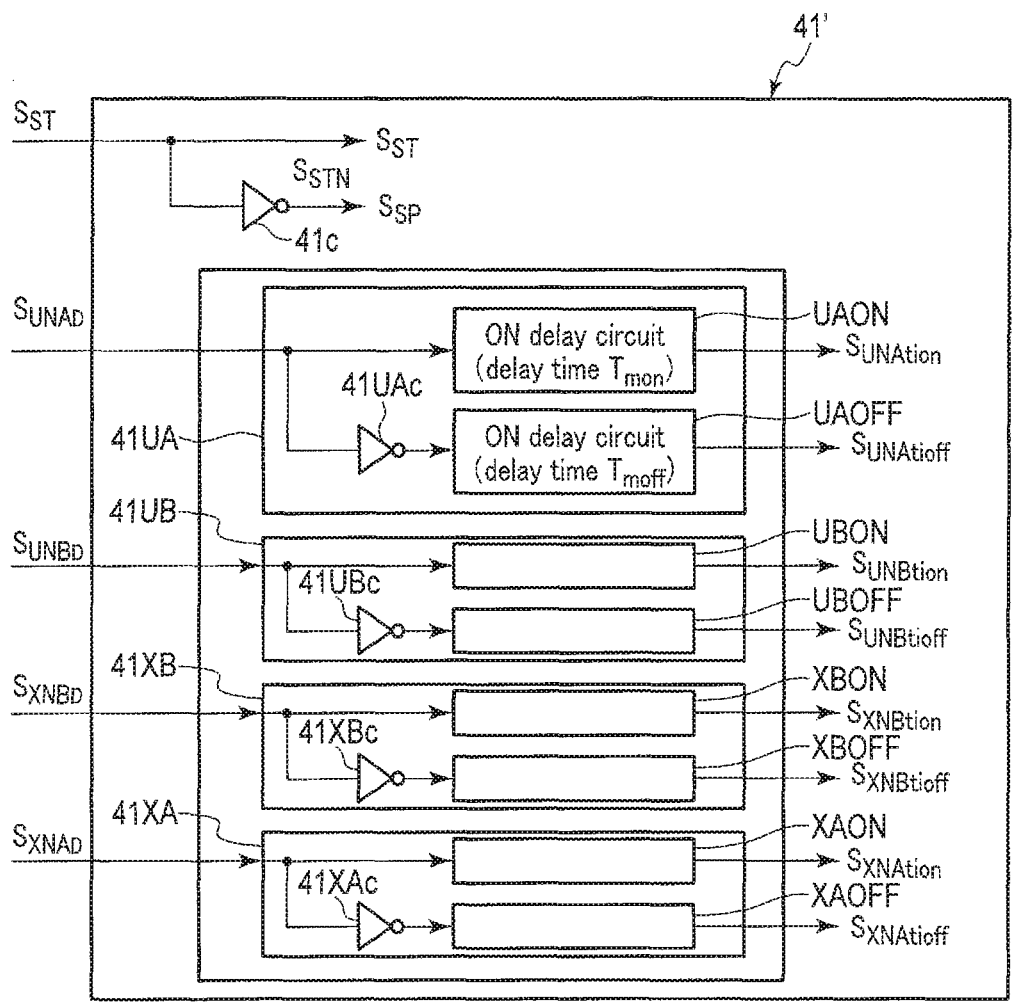
FIG. 16 is a block diagram schematically illustrating a configuration example of a current detection timing generation circuit of the current balance adjustment circuit illustrated in FIG. 13.

FIG. 16 is a block diagram schematically illustrating a configuration example of the current detection timing generation circuit of the current balance adjustment circuit illustrated in FIG. 13.

Figure 17:
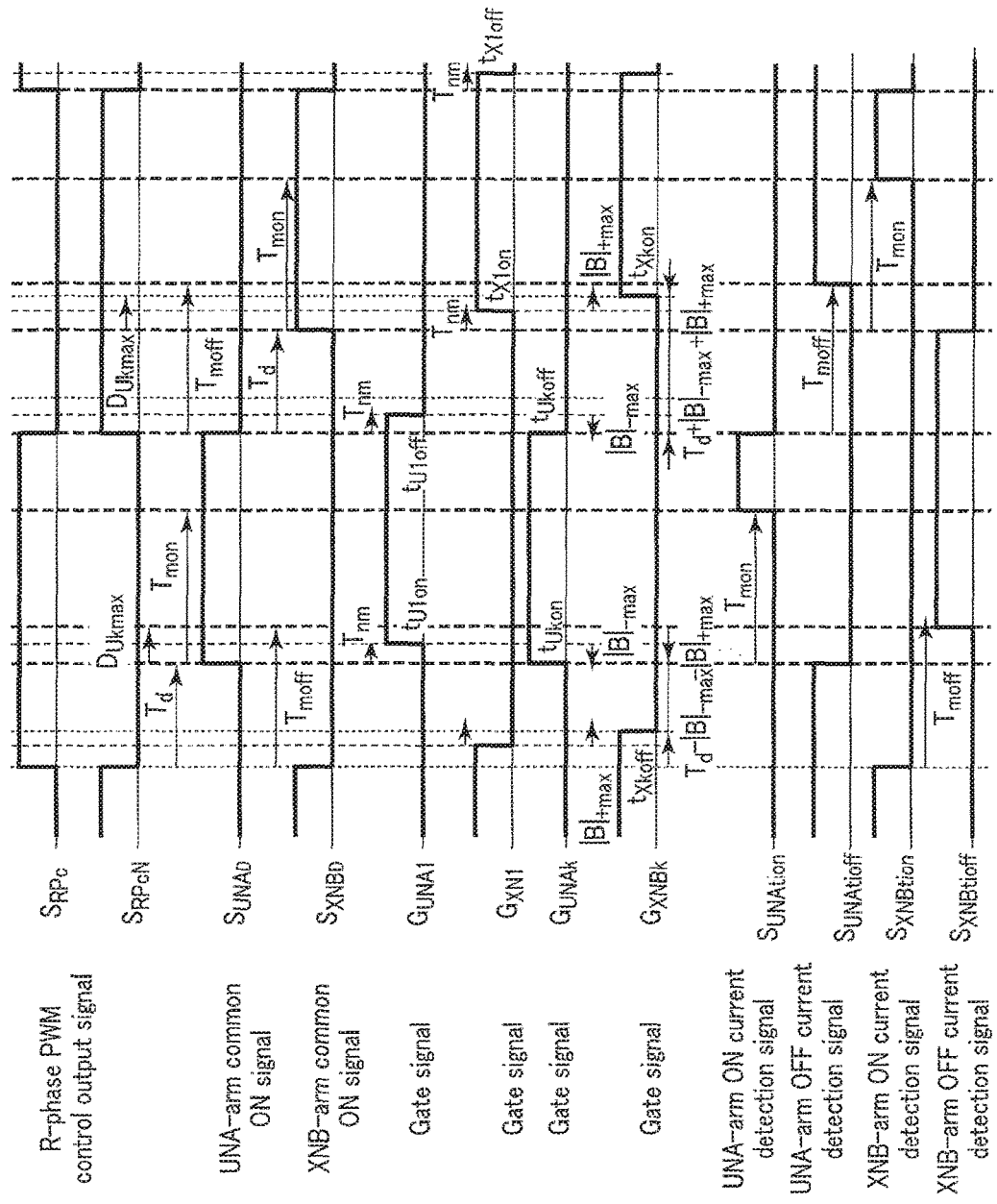
FIG. 17 is a timing chart for describing an example of the operation of the current balance adjustment circuit illustrated in FIG. 13.

FIG. 17 is a timing chart for describing an example of a relationship between gate pulses of a UNA arm and an XNB arm in the operation of the current balance adjustment circuit illustrated in FIG. 13.

The current detection timing generation circuit 41' includes a NOT circuit 41c, a UNA-arm delay circuit 41UA, a UNB-arm delay circuit 41UB, an XNA-arm delay circuit 41XA, and an XNB-arm delay circuit 41XB.

The NOT circuit 41c receives the whole operation signal $S_{ST}$ and outputs a whole stop signal $S_{SP}$ which is obtained by inverting the whole operation signal $S_{ST}$.

The UNA-arm delay circuit 41UA includes ON delay circuits UAON and UAOFF and a NOT circuit 41UAc.

The ON delay circuit UAON receives the UNA-arm common ON signal $S_{UNAD}$, and outputs a UNA-arm ON current detection signal SUNAtion which is obtained by delaying the rise timing of the UNA-arm common ON signal $S_{UNAD}$ by a predetermined period Tmon.

The NOT circuit 41UAc receives the UNA-arm common ON signal $S_{UNAD}$, inverts the UNA-arm common ON signal $S_{UNAD}$, and outputs the inverted UNA-arm common ON signal to the ON delay circuit UAOFF.

The ON delay circuit UAOFF receives the inverted signal of the UNA-arm common ON signal $S_{UNAD}$, and outputs a UNA-arm OFF current detection signal SUNAtioff which is obtained by delaying the rising timing of the received inverted signal by the predetermined period Tmoff.

The UNB-arm delay circuit 41UB includes ON delay circuits UBON and UBOFF and a NOT circuit 41UBc.

The ON delay circuit UBON receives the UNB-arm common ON signal $S_{UNBD}$, and outputs a UNB-arm ON current detection signal SUNBtion which is obtained by delaying the rise timing of the UNB-arm common ON signal $S_{UNBD}$ by the predetermined period Tmon.

The NOT circuit 41UBc receives the UNB-arm common ON signal $S_{UNBD}$, inverts the UNB-arm common ON signal $S_{UNBD}$, and outputs the inverted UNB-arm common ON signal to the ON delay circuit UBOFF.

The ON delay circuit UBOFF receives the inverted signal of the UNB-arm common ON signal $S_{UNBD}$, and outputs a UNB-arm OFF current detection signal $S_{UNBtioff}$ which is obtained by delaying the rising timing of the received inverted signal by the predetermined period Tmoff.

The XNB-arm delay circuit 41XB includes ON delay circuits XBON and XBOFF and a NOT circuit 41XBc.

The ON delay circuit XBON receives the XNB-arm common ON signal $S_{XNBD}$, and outputs an XNB-arm ON current detection signal SXNBtion which is obtained by delaying the rise timing of the XNB-arm common ON signal $S_{XNBD}$ by the predetermined period Tmon.

The NOT circuit 41XBc receives the XNB-arm common ON signal $S_{XNBD}$, inverts the X-arm common ON signal $S_{XNBD}$, and outputs the inverted signal of the X-arm common ON signal $S_{XNBD}$ to the ON delay circuit XNBOFF.

The ON delay circuit XNBOFF receives the inverted signal of the XNB-arm common ON signal $S_{XNBD}$, and outputs an XNB-arm OFF current detection signal $S_{XNBtioff}$ which is obtained by delaying the rising timing of the received inverted signal by the predetermined period Tmoff.

The XNA-arm delay circuit 41XA includes ON delay circuits XAON and XAOFF and a NOT circuit 41XAc.

The ON delay circuit XAON receives the XNA-arm common ON signal $S_{XNAD}$, and outputs an XNA-arm ON current detection signal $S_{XNAtion}$ which is obtained by delaying the rise timing of the XNA-arm common ON signal $S_{XNAD}$ by the predetermined period Tmon.

The NOT circuit 41XAc receives the XNA-arm common ON signal $S_{XNAD}$, inverts the XNA-arm common ON signal $S_{XNAD}$, and outputs the inverted signal of the XNA-arm common ON signal $S_{XNAD}$ to the ON delay circuit XNBOFF.

The ON delay circuit XNBOFF receives the inverted signal of the XNA-arm common ON signal $S_{XNAD}$, and outputs an XNA-arm OFF current detection signal $S_{XNAtioff}$ which is obtained by delaying the rising timing of the received inverted signal by the predetermined period Tmoff.

FIG. 17 illustrates an example of gate signals of the UNA arm and the XNB arm in, for example, the positive-side voltage generation period illustrated in FIG. 15.

As illustrated in FIG. 15, in the positive-side voltage generation period, the ON/OFF timing of the gate signal GUNAk of the switching device $Q_{UNAk}$ is adjusted in a period during which the output current value $I_R$ is positive, and the ON/OFF timing of the gate signal $G_{XNBk}$ of the switching device $Q_{XNBk}$ is adjusted in a period during which the output current value $I_R$ is negative.

In addition, in the negative-side voltage generation period, the ON/OFF timing of the gate signal $G_{UNBk}$ of the switching device $Q_{UNBk}$ is adjusted in a period during which the output current value $I_R$ is positive, and the ON/OFF timing of the gate signal $G_{XNAk}$ of the switching device $Q_{XNAk}$ is adjusted in a period during which the output current value $I_R$ is negative.

FIG. 17 illustrates the operable ranges of ON/OFF timings of the UNA arm and the XNB arm in one entire cycle. As illustrated in FIG. 17, in the present embodiment, a dead time is sufficiently secured even when an adjustment amount of an ON timing and an OFF timing becomes maximum.

In the power conversion system of this embodiment, the output currents of the plurality of power conversion devices 61 to 6n are balanced with reference to the output current $I_{R1}$ of the specific power conversion device 61.

Since the output current difference calculation circuit 42UNA and the output current difference calculation circuit 42UXB have the same configurations as those of the output current difference calculation circuit 42U and the output current difference calculation circuit 42X illustrated in FIG. 4, the output current difference calculation circuit 42UNA will be first described with reference to FIG. 4.

The output current difference calculation circuit 42UNA includes current sample and hold (S&H) circuits 4221on, 422kon, 4221off, and 422koff, and output current difference calculation circuits 42Ukon and 42Ukoff.

The current sample and hold circuits 4221on and 4221off are circuits each of which receives the R-phase output current value of the power conversion device serving as a reference.

In the present embodiment, since the R-phase output current value $I_{R1}$ of the power conversion device 61 is used as a reference, each of the current sample and hold circuits 4221on and 4221off receives the R-phase output current value $I_{R1}$ of the power conversion device 61 from the current detection circuit R1.

Each of the current sample and hold circuits 422kon and 422koff receives the R-phase output current value $I_{Rk}$ of the power conversion device 6k from the current detection circuit Rk.

The current sample and hold circuit 4221on receives the UNA-arm ON current detection signal SUNAtion and the output current value $I_{R1}$, samples a value of the R-phase output current value $I_{R1}$ of the power conversion device 61 at a timing when the UNA-arm ON current detection signal SUNAtion rises, and outputs the sampled value as ON current values $I_{UNA1on(l)}$, $I_{U1NAon(l+2)}$, . . . .

The current sample and hold circuit 422kon receives the UNA-arm ON current detection signal SUNAtion and the output current value $I_{Rk}$, samples a value of the R-phase output current value $I_{Rk}$ of the power conversion device 6k at a timing when the UNA-arm ON current detection signal SUNAtion rises, and outputs the sampled value as ON current values $I_{UNAkon(l)}$, $I_{UNAkon(l+2)}$, . . .

The output current difference calculation circuit 42Ukon includes positive current region limiters 424 and 424k and a current magnitude discrimination circuit 426k.

The positive current region limiter 424 outputs $I'_{R1}$ which is a received value (a value obtained by multiplying the received value by 1) when the ON current values $I_{UNA1on(l)}$, $I_{UNA1on(l+2)}$, . . . are greater than zero, and outputs $I'_{R1}$ which is zero (a value obtained by multiplying the received value by zero) when the ON current values $I_{UNA1on(l)}$, $I_{UNA1on(l+2)}$, . . . are less than or equal to zero.

The positive current region limiter 424k outputs $I'_{Rk}$ which is a received value (a value obtained by multiplying the received value by 1) when the ON current values $I_{UNAkon(l)}$, $I_{UNAkon(l+2)}$, . . . are greater than zero, and outputs $I'_{Rk}$ which is zero (a value obtained by multiplying the received value by zero) when the ON current values $I_{UNAkon(l)}$, $I_{UNAkon(l+2)}$, . . . are less than or equal to zero.

The current magnitude discrimination circuit 426k calculates an absolute value of a difference ($I'_{Rk}-I'_{R1}$) between the value $I'_{R1}$ output from the positive current region limiter 424 and the value $I'_{Rk}$ output from the positive current region limiter 424k, and outputs a current deviation $\Delta I_{UNAkon}$ at the time of ON.

Here, the current magnitude discrimination circuit 426k compares $|I'_{Rk}-I'_{R1}|$ with a predetermined threshold value $I_{\Delta min}$, sets the current deviation $\Delta I_{UNAkon}$ to a value equal to $I'_{Rk}-I'_{R1}$ when $|I'_{Rk}-I'_{R1}|$ is greater than or equal to the threshold value $I_{\Delta min}$, and sets the current deviation $\Delta I_{UNAkon}$ to zero when $|I'_{Rk}-I'_{R1}|$ is less than the threshold value $I_{\Delta min}$.

That is, in the present embodiment, when the absolute value of the difference between the reference output current value and the R-phase output current value of the $k^{th}$ power conversion device 6k is less than the predetermined threshold value, the switching timing of the switching device of the R phase of the $k^{th}$ power conversion device 6k is not adjusted.

The current sample and hold circuit 4221off receives the UNA-arm OFF current detection signal SUNAtioff and the output current value $I_{R1}$, samples a value of the R-phase output current value $I_{R1}$ of the power conversion device 61 at a timing when the UNA-arm OFF current detection signal SUNAtioff rises, and outputs the sampled value as OFF current values $I_{UNA1off(l+1)}$, $I_{UNA1off(l+3)}$, . . .

The current sample and hold circuit 422koff samples a value of the R-phase output current value $I_{Rk}$ of the power conversion device 6k at a timing when the UNA-arm OFF current detection signal SUNAtioff rises, and outputs the sampled value as OFF current values $I_{UNAkoff(l+1)}$, $I_{UNAkoff(l+3)}$, . . .

The output current difference calculation circuit 42Ukoff includes positive current region limiters 424 and 424k and a current magnitude discrimination circuit 426k.

The positive current region limiter 424 outputs $I'_{R1}$ which is a received value (a value obtained by multiplying the received value by 1) when the OFF current values $I_{UNA1off(l+1)}$, $I_{UNA1off(l+3)}$, . . . are greater than zero, and outputs $I'_{R1}$ which is zero (a value obtained by multiplying the received value by zero) when the OFF current values $I_{UNA1off(l+1)}$, $I_{UNA1off(l+3)}$, . . . are less than or equal to zero.

The positive current region limiter 424k outputs $I'_{Rk}$ which is a received value (a value obtained by multiplying the received value by 1) when the OFF current values $I_{UNAkoff(l+1)}$, $I_{UNAkoff(l+3)}$, . . . are greater than zero, and outputs $I'_{Rk}$ which is zero (a value obtained by multiplying the received value by zero) when the OFF current values $I_{UNAkoff(l+1)}$, $I_{UNAkoff(l+3)}$, . . . are less than or equal to zero.

The current magnitude discrimination circuit 426k calculates an absolute value of a difference ($I'_{Rk}-I'_{R1}$) between the value $I'_{R1}$ output from the positive current region limiter 424 and the value $I'_{Rk}$ output from the positive current region limiter 424k, and outputs a current deviation $\Delta I_{Ukoff}$ at the time of OFF.

Here, the current magnitude discrimination circuit 426k compares $|I'_{Rk}-I'_{R1}|$ with a predetermined threshold value $I_{\Delta min}$, sets the current deviation $\Delta I_{UNAkoff}$ to a value equal to $I'_{Rk}-I'_{R1}$ when $|I'_{Rk}-I'_{R1}|$ is greater than or equal to the threshold value $I_{\Delta min}$, and sets the current deviation $\Delta I_{UNAkoff}$ to zero when $|I'_{Rk}-I'_{R1}|$ is less than the threshold value $I_{\Delta min}$.

That is, in the present embodiment, when the absolute value of the difference between the reference output current value and the R-phase output current value of the $k^{th}$ power conversion device 6k is less than the predetermined threshold value, the switching timing of the switching device of the R phase of the $k^{th}$ power conversion device 6k is not adjusted.

The output current difference calculation circuit 42XNB has the same configuration as that of the output current difference calculation circuit 42X illustrated in FIG. 5, and thus will be described with reference to FIG. 5.

The output current difference calculation circuit 42XNB includes output current detection circuits 420 and 420k (illustrated in FIG. 4), current sample and hold (S&H) circuits 4231on, 423kon, 4231off, and 423koff, and output current difference calculation circuits 42Xkon and 42Xkoff.

Since the output current detection circuit 420 and the output current detection circuit 420k have the same configuration as illustrated in FIG. 4, the description thereof is omitted herein.

The current sample and hold circuit 4231on receives the XNB-arm ON current detection signal SXNBtion and the output current value $I_{R1}$, samples a value of the R-phase output current value $I_{R1}$ of the power conversion device 61 at a timing when the X-arm ON current detection signal SXNBtion rises, and outputs the sampled value as ON current values $I_{XNB1on(l)}, I_{XNB1on(l+2)}, \ldots$ The current sample and hold circuit 423kon receives the XNB-arm ON current detection signal SXNBtion and the output current value $I_{Rk}$, samples a value of the R-phase output current value $I_{Rk}$ of the power conversion device 6k at a timing when the XNB-arm ON current detection signal SXNBtion rises, and outputs the sampled value as ON current values $I_{XNBkon(l)}, I_{XNBkon(l+2)}, \ldots$ The output current difference calculation circuit 42Xkon includes negative current region limiters 425 and 425k, absolute value conversion circuits 427 and 427k, and a current magnitude discrimination circuit 426k.

The negative current region limiter 425 outputs $I''_{R1}$ which is zero (a value obtained by multiplying the received value by zero) when the ON current values $I_{XNB1on(l)}, I_{XNB1on(l+2)}, \ldots$ are greater than zero, and outputs $I''_{R1}$ which is a received value (a value obtained by multiplying the received value by 1) when the ON current values $I_{XNB1on(l)}, I_{XNB1on(l+2)}, \ldots$ are zero or less.

The negative current region limiter 425k outputs $I''_{Rk}$ which is zero (a value obtained by multiplying the received value by zero) when the ON current values $I_{XNBkon(l)}, I_{XNBkon(l+2)}, \ldots$ are greater than zero, and outputs $I''_{Rk}$ which is a received value (a value obtained by multiplying the received value by 1) when the ON current values $I_{XNBkon(l)}, I_{XNBkon(l+2)}, \ldots$ are less than or equal to zero.

The absolute value conversion circuit 427 receives the output value $I''_{R1}$ of the negative current region limiter 425 and outputs the absolute value $|I''_{R1}|$ of the received value.

The absolute value conversion circuit 427k receives the output value $I''_{Rk}$ of the negative current region limiter 425k and outputs the absolute value $|I''_{Rk}|$ of the received value.

The current magnitude discrimination circuit 426k calculates an absolute value of a difference $(|I''_{Rk}|-|I''_{R1}|)$ between the value $|I''_{R1}|$ output from the absolute value conversion circuit 427 and the value $|I''_{Rk}|$ output from the absolute value conversion circuit 427k, and outputs a current deviation $\Delta I_{XNBkON}$ at the time of ON.

Here, the current magnitude discrimination circuit 426k compares $\||I''_{Rk}|-|I''_{R1}|\|$ with a predetermined threshold value $I_{\Delta min}$, sets the current deviation $(\Delta I_{XNBkON})$ to a value equal to $|I''_{Rk}-|I''_{R1}|$ when $\||I''_{Rk}|-|I''_{R1}|\|$ is greater than or equal to the threshold value $I_{\Delta min}$, and sets the current deviation $(\Delta I_{XNBkON})$ to zero when $\||I''_{Rk}|-|I''_{R1}|\|$ is less than the threshold value $I_{\Delta min}$.

That is, in the present embodiment, when the absolute value of the difference between the reference output current value and the R-phase output current value of the $k^{th}$ power conversion device 6k is less than the predetermined threshold value, the switching timing of the switching device of the R phase of the $k^{th}$ power conversion device 6k is not adjusted.

The current sample and hold circuit 4231off receives the X-arm OFF current detection signal $S_{XNBtioff}$ and the output current value $I_{R1}$, samples a value of the R-phase output current value $I_{R1}$ of the power conversion device 61 at a timing when the XNB-arm OFF current detection signal $S_{XNBtioff}$ rises, and outputs the sampled value as OFF current values $I_{XNB1off(l+1)}, I_{XNB1off(l+3)}, \ldots$ The current sample and hold circuit 423koff receives the XNB-arm OFF current detection signal $S_{XNBtioff}$ and the output current value $I_{Rk}$, samples a value of the R-phase output current value $I_{Rk}$ of the power conversion device 6k at a timing when the XNB-arm OFF current detection signal $S_{XNBtioff}$ rises, and outputs the sampled value as OFF current values $I_{XNBkoff(l+1)}, I_{XNBkoff(l+3)}, \ldots$ The output current difference calculation circuit 42Xkoff includes negative current region limiters 425 and 425k, absolute value conversion circuits 427 and 427k, and a current magnitude discrimination circuit 426k.

The negative current region limiter 425 outputs $I''_{R1}$ which is zero (a value obtained by multiplying the received value by zero) when the OFF current values $I_{XNB1off(l+1)}, I_{XNB1off(l+3)}, \ldots$ are greater than zero, and outputs $I''_{R1}$ which is a received value (a value obtained by multiplying the received value by 1) when the OFF current values $I_{XNB1off(l+1)}, I_{XNB1off(l+3)}, \ldots$ are less than or equal to zero.

The negative current region limiter 425k outputs $I''_{Rk}$ which is zero (a value obtained by multiplying the received value by zero) when the OFF current values $I_{XNBkoff(l+1)}, I_{XNBkoff(l+3)}, \ldots$ are greater than zero, and outputs $I''_{Rk}$ which is a received value (a value obtained by multiplying the received value by 1) when the OFF current values $I_{XNBkoff(l+1)}, I_{XNBkoff(l+3)}, \ldots$ are less than or equal to zero.

The absolute value conversion circuit 427 receives the output value $I''_{R1}$ of the negative current region limiter 425 and outputs the absolute value $|I''_{R1}|$ of the received value.

The absolute value conversion circuit 427k receives the output value $I''_{Rk}$ of the negative current region limiter 425k and outputs the absolute value $|I''_{Rk}|$ of the received value.

The current magnitude discrimination circuit 426k calculates an absolute value of a difference $(|I''_{Rk}|-|I''_{R1}|)$ between the value $|I''_{R1}|$ output from the absolute value conversion circuit 427 and the value $|I''_{Rk}|$ output from the absolute value conversion circuit 427k, and outputs a current deviation $\Delta I_{XNBkoff}$ at the time of OFF.

Here, the current magnitude discrimination circuit 426*k* compares $\|I''_{Rk}|-|I''_{R1}\|$ with a predetermined threshold value $I_{\Delta min}$, sets the current deviation $\Delta I_{XNBkoff}$ to a value equal to $|I''_{Rk}|-|I''_{R1}|$ when $\|I''_{Rk}|-|I''_{R1}\|$ is greater than or equal to the threshold value $I_{\Delta min}$, and sets the current deviation $\Delta I_{XNBkoff}$ to zero when $\|I''_{Rk}|-|I''_{R1}\|$ is less than the threshold value $I_{\Delta min}$.

That is, in the present embodiment, when the absolute value of the difference between the reference output current value and the R-phase output current value of the $k^{th}$ power conversion device 6*k* is less than the predetermined threshold value, the switching timing of the switching device of the R phase of the $k^{th}$ power conversion device 6*k* is not adjusted.

Since the UNB-arm output current difference calculation circuit has the same configuration as that of the UNA-arm output current difference calculation circuit and the XNA-arm output current difference calculation circuit has the same configuration as that of the XNB-arm output current difference calculation circuit, the description thereof will be omitted.

Since the adjustment time calculation circuits 43 of the UNA arm and the XNB arm have the same configurations as illustrated in FIG. 6A and the adjustment time calculation circuits 43 of the UNB arm and XNA arm have the same configurations as illustrated in FIG. 6A, they will be described with reference to FIG. 6A.

Since the adjustment time calculation circuits of the UNB arm and XNA arm have the same configurations as those of the adjustment time calculation circuits of the UNA arm and the XNB arm, only the adjustment time calculation circuits of the UNA arm and the XNB arm will be described below, and the description of the configurations of the adjustment time calculation circuits of the UNB arm and XNA arm will be omitted.

The adjustment time calculation circuit 43*k* includes a current balance adjustment amount determination circuit 430, a sample and hold (S&H) circuit 432, a limiter circuit 434, a standard delay time setting unit 436, and adders A1 and A2.

The current balance adjustment amount determination circuit 430 receives the current deviations $\Delta I_{UNAkon}$, $\Delta I_{UNAkOFF}$, $\Delta I_{XNBkON}$, and $\Delta I_{XNBkOFF}$ from the output current difference calculation circuits 42UNA and 42XNB, and outputs current balance adjustment amounts CUNAkon, CUNAkoff, CXNBkon, and CXNBkoff corresponding to the values of the current deviations $\Delta I_{UNAkON}$, $I_{UNAkOFF}$, $\Delta I_{XNBkON}$, and $\Delta I_{XNBkOFF}$.

The current balance adjustment amount determination circuit 430 compares the value of the current deviation $\Delta I_{UNAON}$ with zero upon reception of the current deviation $\Delta I_{UNAON}$ when the UNA arm is ON, sets the current balance adjustment amount CUNAkon to a negative value ($=\Delta$CUNAkl) when the value of the current deviation $\Delta I_{UNAON}$ is less than zero, sets the current balance adjustment amount CUNAkon to a positive value ($=\Delta$CUNAkd) when the value of the current deviation $\Delta I_{UNAON}$ is greater than zero, and sets the current balance adjustment amount CUNAkon to zero when the value of the current deviation $\Delta I_{UNAON}$ is zero.

The current balance adjustment amount determination circuit 430 compares the value of the current deviation $\Delta I_{UNAkOFF}$ with zero upon reception of the current deviation $\Delta I_{UNAkOFF}$ when the UNA arm is OFF, sets the current balance adjustment amount CUNAkoff to a negative value ($=\Delta$CUNAkl) when the value of the current deviation $\Delta I_{UNAkOFF}$ is greater than zero, sets the current balance adjustment amount CUNAkoff to a positive value ($=\Delta$CUNAkd) when the value of the current deviation $\Delta I_{UNAkOFF}$ is less than zero, and sets the current balance adjustment amount CUNAkoff to zero when the value of the current deviation $\Delta I_{UNAkOFF}$ is zero.

The current balance adjustment amount determination circuit 430 compares the value of the current deviation $\Delta I_{XNBkON}$ with zero upon reception of the current deviation $\Delta I_{XNBkON}$ when the XNB arm is ON, sets the current balance adjustment amount CXNBkon to a negative value ($=\Delta$CXNBkl) when the value of the current deviation $\Delta I_{XNBkON}$ is less than zero, sets the current balance adjustment amount CXNBkon to a positive value ($=\Delta$CXNBkd) when the value of the current deviation $\Delta I_{XNBkON}$ is greater than zero, and sets the current balance adjustment amount CXNBkon to zero when the value of the current deviation $\Delta I_{XNBkON}$ is zero.

(Restoration)

The current balance adjustment amount determination circuit 430 compares the value of the current deviation $\Delta I_{XNBkOFF}$ with zero upon reception of the current deviation $\Delta I_{XNBkOFF}$ when the XNB arm is OFF, sets the current balance adjustment amount CXNBkoff to a negative value ($=\Delta$CXNBkl) when the value of the current deviation $\Delta I_{XNBkOFF}$ is greater than zero, sets the current balance adjustment amount CXNBkoff to a positive value ($=\Delta$CXNBkd) when the value of the current deviation $\Delta I_{XNBkOFF}$ is less than zero, and sets the current balance adjustment amount CXNBkoff to zero when the value of the current deviation $\Delta I_{XNBkOFF}$ is zero.

It is noted that the positive values $\Delta$CUNAkd and $\Delta$CXNBkd (restoration) and the negative values $\Delta$CUNAkl and $\Delta$CXNBkl set as the current balance adjustment amounts in the current balance adjustment amount determination circuit 430 may be fixed values, and may be values which vary according to $|I'_{Rk}-I'_{R1}|$ or $\|I''_{Rk}|-|I''_{R1}\|$.

For example, the positive values $\Delta$CUNAkd and $\Delta$CXNBkd may be a value obtained by multiplying $|I'_{Rk}-I'_{R1}|$ or $\|I''_{Rk}|-|I''_{R1}\|$ by a positive proportional constant (for example, kl), and the negative values $\Delta$CUNAkl and $\Delta$CXNBkl may be a value obtained by multiplying $|I'_{Rk}-I'_{R1}|$ or $\|I''_{Rk}|-|I''_{R1}\|$ by a negative proportional constant (for example, −kl).

The current balance adjustment amounts CUNAkon, CUNAkoff, CXNBkon, and CXNBkoff output from the current balance adjustment amount determination circuit 430 are added to outputs BUNAkon, BUNAkoff, BXNBkon, and BXNBkoff of the limiter circuit 434 by the adder A1.

The sample and hold circuit 432 receives the output of the adder A1 and the signal serving as the trigger.

In the present embodiment, the sample and hold circuit 432 receives the UNA-arm ON current detection signal SUNAtion, the UNA-arm OFF current detection signal SUNAtioff, the XNB-arm ON current detection signal SXNBtion, and the XNB-arm OFF current detection signal S$_{XNBtioff}$ as the trigger.

The sample and hold circuit 432 holds a value output from the adder A1 (current balance adjustment amount CUNAkon+BUNAkon) at a timing when the UNA-arm ON current detection signal SUNAtion falls, and outputs the value to the limiter circuit 434.

The sample and hold circuit 432 holds a value output from the adder A1 (current balance adjustment amount CUNAkoff+BUNAkoff) at a timing when the U-arm OFF current detection signal SUNAtioff falls, and outputs the value to the limiter circuit 434.

The sample and hold circuit 432 holds a value output from the adder A1 (current balance adjustment amount CXNBkon+BXNBkon) at a timing when the XNB-arm ON current detection signal SXNBtion falls, and outputs the value to the limiter circuit 434.

The sample and hold circuit 432 holds a value output from the adder A1 (current balance adjustment amount CXNBkoff+BXNBkoff) at a timing when the XNB-arm OFF current detection signal $S_{XNBtioff}$ falls, and outputs the value to the limiter circuit 434.

In addition, the sample and hold circuit 432 receives the whole stop signal $S_{SP}$, and resets the held value by the whole stop signal $S_{SP}$.

That is, when the whole stop signal $S_{SP}$ is "1", the whole stop signal $S_{SP}$ is a signal which instructs stop.

When the whole stop signal $S_{SP}$ is "1", the sample and hold circuit 432 sets the output value to zero.

The limiter circuit 434 compares the value received from the sample and hold circuit 432 with a predetermined upper limit value $|B|_{+MAX}$ and a predetermined lower limit value $-|B|_{-MAX}$, and outputs a value less than or equal to the upper limit value $|B|_{+MAX}$ and greater than or equal to the lower limit value $-|B|_{-MAX}$.

The outputs BUNAkon, BUNAkoff, BXNBkon, and BXNBkoff of the limiter circuits 434 are output to the adder A1 and the adder A2.

That is, the adder A1, the sample and hold circuit 432, and the limiter circuit 434 constitute the integration circuit.

The standard delay time setting unit 436 outputs a preset standard time delay time Tnm to the adder A2.

The adder A2 adds the output BUNAkon of the limiter circuit 434 and the standard delay time Tnm, and outputs a result as a delay time adjustment element DUNAkon to the UNA-arm gate pulse adjustment circuit G for the R phase of the $k^{th}$ power conversion device 6k.

The adder A2 adds the output BUNAkoff of the limiter circuit 434 and the standard delay time Tnm, and outputs a result as a delay time adjustment element DUNAkoff to the U-arm gate pulse adjustment circuit G for the R phase of the $k^{th}$ power conversion device 6k.

The adder A2 adds the output BXNBkon of the limiter circuit 434 and the standard delay time Tnm, and outputs a result as a delay time adjustment element DXNBkon to the XNB-arm gate pulse adjustment circuit G for the R phase of the $k^{th}$ power conversion device 6k.

The adder A2 adds the output BXNBkoff of the limiter circuit 434 and the standard delay time Tnm, and outputs a result as a delay time adjustment element DXNBkoff to the XNB-arm gate pulse adjustment circuit G for the R phase of the $k^{th}$ power conversion device 6k.

The UNA-arm gate pulse adjustment circuit G receives the delay time adjustment elements DUNAkon and DUNAkoff output from the adder A2, and outputs a gate signal GUNAk of a UNA-arm switching device QUNA by delaying an ON timing of a UNA-arm common ON signal $S_{UNAD}$ by the delay time adjustment element DUNAkon and delaying an OFF timing of the UNA-arm common ON signal $S_{UNAD}$ by the delay time adjustment element DUNAkoff.

The XNB-arm gate pulse adjustment circuit G receives the delay time adjustment elements DXNBkon and DXNBkoff output from the adder A2, and outputs a gate signal GXNBk of a XNB-arm switching device $Q_{XNB}$ by delaying an ON timing of an XNB-arm common ON signal $S_{XNBD}$ by the delay time adjustment element DXNBkon and delaying an OFF timing of the XNB-arm common ON signal $S_{XNBD}$ by the delay time adjustment element DXNBkoff.

As described above, in a case where the switching timing of the switching devices $Q_{UNA}$ and $Q_{XNB}$ of the UNA arm and the XNB arm, when the delay time adjustment elements DUNAkon and DXNBkon are positive, the rise timing of the gate pulse to the switching devices $Q_{UNA}$ and $Q_{XNB}$ of the UNA arm and the XNB arm is delayed by the delay time adjustment element DUNAkon and DXNBkon with respect to the timing delayed from the rising timing of the common ON signal by the standard delay time Tnm.

When the delay time adjustment elements DUNAkon and DXNAkon are negative, the rising timing of the gate pulse to the switching devices $Q_{UNA}$ and $Q_{XNB}$ of the UNA arm and the XNB arm is advanced by the delay time adjustment elements DUNAkon and DXNBkon with respect to the timing delayed from the rising timing of the common ON signal by the standard delay time Tnm.

Similarly, when the delay time adjustment elements DUNAkoff and DXNBkoff are positive, the falling timing of the gate pulse to the switching devices Q of the UNA arm and the XNB arm is delayed by the delay time adjustment elements DUNAkoff and DXNBkoff with respect to the timing delayed from the falling timing of the common ON signal by the standard delay time Tnm.

Similarly, when the delay time adjustment elements DUNAkoff and DXNBkoff are negative, the falling timing of the gate pulse to the switching devices Q of the UNA arm and the XNB arm is advanced by the delay time adjustment elements DUNAkoff and DXNBkoff with respect to the timing delayed from the falling timing of the common ON signal by the standard delay time Tnm.

As described above, in a case where the switching timing of the switching devices Q of the UNA arm and the XNB arm is adjusted, when the output current value $I_{Rk}$ of the $k^{th}$ power conversion device 6k is greater than zero, the output current value $I_{R1}$ of the power conversion device 61 serving as a reference is greater than zero, and the output current value $I_{Rk}$ is greater than the output current value $I_{R1}$ (a difference is greater than a predetermined threshold value $I_{\Delta min}$), the timing of turning on the UNA-arm switching device $Q_{UNA}$ of the $k^{th}$ power conversion device 6k is delayed and adjusted to advance the OFF timing.

In addition, in a case where the output current value $I_{Rk}$ of the $k^{th}$ power conversion device 6k is greater than zero, when the output current value $I_{R1}$ of the power conversion device 61 serving as a reference is greater than zero and the output current value $I_{Rk}$ is less than the output current value $I_{R1}$ (a difference is less than the predetermined threshold value $I_{\Delta min}$), the timing of turning on the UNA-arm switching device $Q_{UNA}$ of the $k^{th}$ power conversion device 6k is advanced and adjusted to delay the OFF timing.

In addition, in a case where the output current value $I_{Rk}$ of the $k^{th}$ power conversion device 6k is less than zero, when the output current value $I_{R1}$ of the power conversion device 61 serving as a reference is less than zero and the absolute value of the output current value $I_{Rk}$ is greater than the absolute value of the output current value $I_{R1}$ (a difference is greater than the predetermined threshold value $I_{\Delta min}$), the timing of turning on the XBX-arm switching device $Q_{XNB}$ of the $k^{th}$ power conversion device 6k is delayed and adjusted to advance the OFF timing.

In addition, when the output current value $I_{Rk}$ of the $k^{th}$ power conversion device 6k is less than zero, the output current value $I_{R1}$ of the power conversion device 61 serving as a reference is less than zero, and the absolute value of the output current value $I_{Rk}$ is less than the absolute value of the output current value $I_{R1}$ (a difference is less than the predetermined threshold value $I_{\Delta min}$), the timing of turning on the XNB-arm switching device $Q_{XNB}$ of the $k^{th}$ power conversion device 6k is advanced and adjusted to delay the OFF timing.

The ON timing and the OFF timing of the switching device $Q_{UNA}$ of the UNB arm and the ON timing and the OFF timing of the switching device $Q_{XNA}$ of the XNA arm can also be adjusted in the same manner as described above.

As described above, when the output currents of the plurality of power conversion devices 61 to 6n are balanced, it is possible to prevent the entire power conversion system from being stopped due to an overcurrent state caused by an increase in the output of the specific power conversion device.

In addition, since the output currents of the plurality of power conversion devices 61 to 6n are adjusted according to the output current of the power conversion apparatus serving as a reference, it is unnecessary to adjust the output currents of the plurality of power conversion devices 61 to 6n according to a low value, and it is possible to efficiently operate the power conversion system.

Further, for both the ON timing and the OFF timing in the switching devices of each phase of the plurality of power conversion devices 61 to 6n, since the output current can be adjusted to be delayed and advanced with respect to the reference timing, it is possible to shorten the time until the output currents of the plurality of power conversion devices 61 to 6n converge to a balanced state.

That is, according to the present embodiment, it is possible to provide a power conversion system capable of stably operating with high utilization efficiency and a current balance adjustment circuit thereof.

Next, a power conversion system of a sixth embodiment will be described below with reference to the drawings.

FIG. 18 is a block diagram schematically illustrating a configuration example of a power conversion system according to a sixth embodiment; and The power conversion system includes a control device including a current balance adjustment circuit, and a plurality of power conversion devices, and AC output terminals of the plurality of power conversion devices are connected in parallel to each other.

The power conversion system of the present embodiment includes a control device and a plurality of power conversion devices 71 to 7n (n is a positive integer).

The control device includes, for example, a whole operation signal generation unit 1, a gate pulse generation circuit 2', and a current balance adjustment circuit 4.

The whole operation signal generation unit 1 generates a whole operation signal $S_{ST}$ for switching between an operation and a stop of the power conversion system, and outputs the whole operation signal $S_{ST}$ to the gate pulse generation circuit 2' and the current balance adjustment circuit 4.

The gate pulse generation circuit 2' receives the whole operation signal $S_{ST}$ from the whole operation signal generation unit 1, generates gate pulses common to the plurality of power conversion devices 71 to 7n (for the R phase, UTA-arm common ON signal $S_{UTAD}$, UTB-arm common ON signal $S_{UTBD}$, XTA-arm common ON signal $S_{XTAD}$, and XTB-arm common ON signal $S_{XTBD}$) based on the whole operation signal $S_{ST}$, and outputs the gate pulses (the ON signals) to the R phases of the plurality of power conversion devices 71 to 7n.

Each of the power conversion devices 71 to 7n is a T-type three-level power conversion device having three phases, that is, an R phase, an S phase, and a T phase.

The T-type three-level power conversion device includes, for example, a T-type three-level conversion circuit in which a first switching device and a fourth switching device having diodes connected in anti-parallel are sequentially connected in series from a positive electrode toward a negative electrode of a DC power source having the positive electrode, the negative electrode, and a neutral electrode, an AC output terminal is taken out from a connection point between the first switching device and the fourth switching device, and a second switching device in a direction from the neutral terminal toward the connection point and a third switching device in a direction from the connection point toward the neutral electrode are connected in series and inserted between the connection point and the neutral terminal of the DC power source.

The upper arm constituting the R phase is a UTA arm, the lower arm constituting the R phase is an XTA arm, and a UTB arm and an XTB arm are connected in series between an intermediate connection point of a DC power supply voltage and the UTA arm and the XTA arm.

For example, in the $k^{th}$ power conversion device 7k, the UTA arm includes a switching device $Q_{UTAk}$, the XTA arm includes a switching device $Q_{XTAk}$, the XTB arm includes a switching device $Q_{XTBk}$, and the UTB arm includes a switching device $Q_{UTBk}$.

The switching device $Q_{XTBk}$ performs switching exclusively with the switching device $Q_{UTAk}$ to control the output current of a negative direction to flow into the intermediate connection point of the DC power supply voltage.

The switching device $Q_{UTBk}$ performs switching exclusively with the switching device $Q_{XTAk}$ to control the output current of a positive direction to flow into the intermediate connection point of the DC power supply voltage.

The current balance adjustment circuit 4 outputs adjustment time signals (delay time adjustment elements) of a plurality of gate pulses (common ON signals) of each phase arm of each of the plurality of power conversion devices 71 to 7n, based on the whole operation signal $S_{ST}$ from the whole operation signal generation unit 1, gate pulses from the gate pulse generation circuit 2 (for example, for the R phase, UTA-arm common ON signal $S_{UTAD}$, UTB-arm common ON signal $S_{UTBD}$, XTA-arm common ON signal $S_{XTAD}$, and XTB-arm common ON signal $S_{XTBD}$), and the output current of each phase of each of the plurality of power conversion devices 71 to 7n.

It is noted that only the R phases of the plurality of power conversion devices 71 to 7n are described in FIG. 1, and the description of the S phases and the T phases is omitted. The same configurations as those of the R phases are applied to the S phases and the T phases of the plurality of power conversion devices 71 to 7n.

FIG. 19 is a timing chart for describing an example of the operation of the gate pulse generation circuit and the current balance adjustment circuit illustrated in FIG. 18.

In an operation of the T-type three-level inverter, a positive-side voltage waveform of an R-phase output phase voltage $V_{R0}$ is realized by PWM control which exclusively switches between the switching device $Q_{UTAk}$ and the switching device $Q_{XTBk}$ when the switching device $Q_{UTBk}$ is in an ON state.

A negative-side voltage waveform of the R-phase output phase voltage $V_{R0}$ is realized by PWM control which exclusively switches between the switching device $Q_{UTBk}$ and the switching device $Q_{XTAk}$ when the switching device $Q_{XTBk}$ is in an ON state.

Since the phases of the R-phase output phase voltage $V_{R0}$ and the output current value $I_R$ do not coincide with each other, the switching device which causes the output current value $I_R$ to flow while the output current value $I_R$ is in a positive direction is the switching device $Q_{UTAk}$ in a positive-side voltage generation period, and is the switching device $Q_{UTBk}$ in a negative-side voltage generation period.

Therefore, the ON/OFF timing for current balance control is performed with respect to the switching of the switching device $Q_{UTAk}$ and the switching device $Q_{UTBk}$ in each period.

Since the switching device $Q_{UTAk}$ and the switching device $Q_{UTBk}$ are not switched while being in the OFF or ON state in periods other than the corresponding period, the same effects are obtained even if the ON/OFF timing adjustment is performed in the entire period.

Similarly, the switching device which causes the output current value $I_R$ to flow while the output current value $I_R$ is in a negative direction is the switching device $Q_{XTBk}$ and the switching device $Q_{XTAk}$, and the ON/OFF timing for current balance control is adjusted with respect to the switching of the switching device $Q_{XTBk}$ in a positive-side voltage generation period and the switching device $Q_{XTAk}$ in a negative-side voltage generation period.

As described above, in the power conversion system of the present embodiment, the same effects can be obtained by performing the same control as in the fifth embodiment with respect to the UTA arm, the XTA arm, the UTB arm, and the XTB arm, which respectively corresponding to the UNA arm, the XNA arm, the UNB arm, and the XNB arm of the power conversion system of the fifth embodiment.

That is, according to the present embodiment, it is possible to provide a power conversion system capable of stably operating with high utilization efficiency and a current balance adjustment circuit thereof.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A current balance adjustment circuit comprising:
an output current difference calculation circuit configured to, for each of a plurality of values of output currents which are output from a plurality of power conversion devices connected in parallel to one another and driven based on a plurality of common ON signals applied to the power conversion devices, output a difference between the output current value and a reference value when a polarity of the output current value is positive, and output a difference between an absolute value of the output current value and an absolute value of the reference value when the polarity of the output current value is negative;
an adjustment time calculation circuit configured to output adjustment time signals each of which indicates an amount of a delay time of a rising timing or a falling timing of the ON signal, according to an output value of the output current difference calculation circuit; and
a current detection timing generation circuit configured to generate a first current detection signal by delaying a rise timing of the ON signal by a predetermined period and generate a second current detection signal by delaying a rise timing of the inverted signal of the ON signal by a predetermined period,
wherein the output current difference calculation circuit comprises a first current sample and hold circuit to detect a value of the output current at a timing when the first current detection signal rises and a second current sample and hold circuit to detect a value of the output current at a timing when the second current detection signal rises.

2. A power conversion system comprising:
a control device including a current balance adjustment circuit comprising:
an output current difference calculation circuit configured to, for each of a plurality of values of output currents which are output from a plurality of power conversion devices connected in parallel to one another and driven based on a plurality of common ON signals applied to the power conversion devices, output a difference between the output current value and a reference value when a polarity of the output current value is positive, and output a difference between an absolute value of the output current value and an absolute value of the reference value when the polarity of the output current value is negative; and
an adjustment time calculation circuit configured to output adjustment time signals each of which indicates an amount of a delay time of a rising timing or a falling timing of the ON signal, according to an output value of the output current difference calculation circuit; and
the plurality of power conversion devices,
wherein the control device is configured to provide the ON signals and the adjustment time signals to the plurality of power conversion devices,
AC output terminals of the plurality of power conversion devices are connected in parallel to one another,
each of the power conversion devices comprises:
a two-level conversion circuit including an upper arm and a lower arm in which the switching devices having diodes connected in anti-parallel between a positive electrode and a negative electrode of a DC power source are connected in series;
a current detection circuit configured to detect an AC output current of the power conversion device; and
a delay circuit configured to receive the adjustment time signals and the ON signals each of which instructs ON and OFF to each of the switching devices of the plurality of power conversion devices, and delay each of an ON timing and an OFF timing of each of the ON signals based on the adjustment time signals,
the control device is configured to receive, from the current detection circuit, an AC output current value after the switching devices of the plurality of power conversion devices are turned on and an AC output current value after the switching devices are turned off,
when a polarity of a detected current value at the time of ON is positive and the detected current value at the time of ON is greater than the reference value at the time of ON, the control device is configured to generate a signal which increases a delay time of a next ON timing of the switching device of the upper arm of the power conversion device,
when the polarity of the detected current value at the time of ON is positive and the detected current value at the time of ON is less than the reference value at the time of ON, the control device is configured to generate a signal which decreases a delay time of a next ON timing of the switching device of the upper arm of the power conversion device,
when a polarity of a detected current value at the time of OFF is positive and the detected current value at the time of OFF is greater than the reference value at the time of OFF, the control device is configured to generate a signal which decreases a delay time of a next OFF timing of the switching device of the upper arm of the power conversion device, when the polarity of the detected current value at the time of OFF is positive and the detected current value at the time of OFF is less than the reference value at the time of OFF, the control device is configured to generate a signal which increases a delay time of a next OFF timing of the switching device of the upper arm of the power conversion device, when the polarity of the detected current value at the time of ON is negative and an absolute value of the detected current value at the time of ON is greater than an absolute value of the reference value at the time of ON, the control device is configured to generate a signal which increases a delay time of a next ON timing of the switching device of the lower arm of the power conversion device, when the polarity of the detected current value at the time of ON is negative and the absolute value of the detected current value at the time of ON is less than the absolute value of the reference value at the time of ON, the control device is configured to generate a signal which decreases a delay time of a next ON timing of the switching device of the lower arm of the power conversion device, when the polarity of the detected current value at the time of OFF is negative and an absolute value of the detected current value at the time of OFF is greater than an absolute value of the reference value at the time of OFF, the control device is configured to generate a signal which decreases a delay time of a next OFF timing of the switching device of the lower arm of the power conversion device, and when the polarity of the detected current value at the time of OFF is negative and the absolute value of the detected current value at the time of OFF is less than the absolute value of the reference value at the time of OFF, the control device is configured to generate a signal which increases a delay time of a next OFF timing of the switching device of the lower arm of the power conversion device.

3. A power conversion system comprising:

a control device including a current balance adjustment circuit comprising:

an output current difference calculation circuit configured to, for each of a plurality of values of output currents which are output from a plurality of power conversion devices connected in parallel to one another and driven based on a plurality of common ON signals applied to the power conversion devices, output a difference between the output current value and a reference value when a polarity of the output current value is positive, and output a difference between an absolute value of the output current value and an absolute value of the reference value when the polarity of the output current value is negative; and an adjustment time calculation circuit configured to output adjustment time signals each of which indicates an amount of a delay time of a rising timing or a falling timing of the ON signal, according to an output value of the output current difference calculation circuit; and the plurality of power conversion devices, wherein the control device is configured to provide the ON signals and the adjustment time signals to the plurality of power conversion devices, AC output terminals of the plurality of power conversion devices are connected in parallel to one another, each of the power conversion devices comprises:

a two-level conversion circuit including an upper arm and a lower arm in which the switching devices having diodes connected in anti-parallel between a positive electrode and a negative electrode of a DC power source are connected in series;

a current detection circuit configured to detect an AC output current of the power conversion device; and a delay circuit configured to receive the adjustment time signals and the ON signals each of which instructs ON and OFF to each of the switching devices of the plurality of power conversion devices, and delay each of an ON timing and an OFF timing of each of the ON signals based on the adjustment time signals, the control device is configured to receive, from the current detection circuit, an AC output current value after the switching device of the power conversion device is turned off, when a polarity of a detected current value is positive and the detected current value is greater than the reference value at the time of OFF, the control device is configured to generate a signal which decreases a delay time of a next OFF timing of the switching device of the upper arm of the power conversion device, when the polarity of the detected current value is positive and the detected current value is less than the reference value at the time of OFF, the control device is configured to generate a signal which increases a delay time of a next OFF timing of the switching device of the upper arm of the power conversion device, when the polarity of the detected current value is negative and an absolute value of the detected current value is greater than an absolute value of the reference value at the time of OFF, the control device is configured to generate a signal which decreases a delay time of a next OFF timing of the switching device of the lower arm of the power conversion device, and when the polarity of the detected current value is negative and the absolute value of the detected current value is less than the absolute value of the reference value at the time of OFF, the control device is configured to generate a signal which increases a delay time of a next OFF timing of the switching device of the lower arm of the power conversion device.

4. A power conversion system comprising:

a control device including a current balance adjustment circuit comprising:

an output current difference calculation circuit configured to, for each of a plurality of values of output currents which are output from a plurality of power conversion devices connected in parallel to one another and driven based on a plurality of common ON signals applied to the power conversion devices, output a difference between the output current value and a reference value when a polarity of the output current value is positive, and output a difference between an absolute value of the output current value and an absolute value of the reference value when the polarity of the output current value is negative; and an adjustment time calculation circuit configured to output adjustment time signals each of which indicates an amount of a delay time of a rising timing or a falling timing of the ON signal, according to an output value of the output current difference calculation circuit; and the plurality of power conversion devices, wherein the control device is configured to provide the ON signals and the adjustment time signals to the plurality of power conversion devices, AC output terminals of the plurality of power conversion devices are connected in parallel to one another, each of the power conversion devices comprises:

a three-level conversion circuit in which first to fourth switching devices having diodes connected in anti-parallel are sequentially connected in series from a positive electrode toward a negative electrode of a DC power source having the positive electrode, the negative electrode, and a neutral electrode, an AC output terminal is taken out from a connection point between the second switching device and the third switching device, and diodes are respectively inserted from a connection point between the third switching device and the fourth switching device toward the neutral electrode and from the neutral electrode toward a connection point between the first switching device and the second switching device;

a current detection circuit configured to detect AC output currents of the power conversion devices; and a delay circuit configured to receive the adjustment time signals and the ON signals each of which instructs ON and OFF of each of the first to fourth switching devices of each of the plurality of power conversion devices, and delay each of an ON timing and an OFF timing of each of the ON signals based on the adjustment time signals, the control device is configured to generate the ON signals each of which controls an AC output current by PWM control to perform exclusive switching between the first switching device and the third switching device or between the second switching device and the fourth switching device, in a period during which the PWM control is performed between the first switching device and the third switching device, the control device is configured to receive an AC output current value after the first switching device and the third switching device of the plurality of power conversion devices are turned on and an AC output current value after turned off, when a polarity of a detected current value at the time of ON is positive and the detected current value at the time of ON is greater than the reference value at the time of ON, the control device is configured to generate a signal which increases a delay time of a next ON timing of the first switching device of the power conversion device, when the polarity of the detected current value at the time of ON is positive and the detected current value at the time of ON is less than the reference value at the time of ON, the control device is configured to generate a signal which decreases a delay time of a next ON timing of the first switching device of the power conversion device, when a polarity of a detected current value at the time of OFF is positive and the detected current value at the time of OFF is greater than the reference value at the time of OFF, the control device is configured to generate a signal which decreases a delay time of a next OFF timing of the first switching device of the power conversion device, when the polarity of the detected current value at the time of OFF is positive and the detected current value at the time of OFF is less than the reference value at the time of OFF, the control device is configured to generate a signal which increases a delay time of a next OFF timing of the first switching device of the power conversion device, when the polarity of the detected current value at the time of ON is negative and an absolute value of the detected current value at the time of ON is greater than an absolute value of the reference value at the time of ON, the control device is configured to generate a signal which increases a delay time of a next ON timing of the third switching device of the power conversion device, when the polarity of the detected current value at the time of ON is negative and the absolute value of the detected current value at the time of ON is less than the absolute value of the reference value at the time of ON, the control device is configured to generate a signal which decreases a delay time of a next ON timing of the third switching device of the power conversion device, when the polarity of the detected current value at the time of OFF is negative and an absolute value of the detected current value at the time of OFF is greater than an absolute value of the reference value at the time of OFF, the control device is configured to generate a signal which decreases a delay time of a next OFF timing of the third switching device of the power conversion device, when the polarity of the detected current value at the time of OFF is negative and the absolute value of the detected current value at the time of OFF is less than the absolute value of the reference value at the time of OFF, the control device is configured to generate a signal which increases a delay time of a next OFF timing of the third switching device of the power conversion device, in a period during which the PWM control is performed between the second switching device and the fourth switching device, the control device is configured to receive an AC output current value after the second switching device and the fourth switching device of the plurality of power conversion devices are turned on and an AC output current value after turned off, when a polarity of a detected current value at the time of ON is positive and the detected current value at the time of ON is greater than the reference value at the time of ON, the control device is configured to generate a signal which increases a delay time of a next ON timing of the second switching device of the power conversion device, when the polarity of the detected current value at the time of ON is positive and the detected current value at the time of ON is less than the reference value at the time of ON, the control device is configured to generate a signal which decreases a delay time of a next ON timing of the second switching device of the power conversion device, when a polarity of a detected current value at the time of OFF is positive and the detected current value at the time of OFF is greater than the reference value at the time of OFF, the control device is configured to generate a signal which decreases a delay time of a next OFF timing of the second switching device of the power conversion device, when the polarity of the detected current value at the time of OFF is positive and the detected current value at the time of OFF is less than the reference value at the time of OFF, the control device is configured to generate a signal which increases a delay time of a next OFF timing of the second switching device of the power conversion device, when the polarity of the detected current value at the time of ON is negative and an absolute value of the detected current value at the time of ON is greater than an absolute value of the reference value at the time of ON, the control device is configured to generate a signal which increases a delay time of a next ON timing of the fourth switching device of the power conversion device, when the polarity of the detected current value at the time of ON is negative and the absolute value of the detected current value at the time of ON is less than the absolute value of the reference value at the time of ON, the control device is configured to generate a signal which decreases a delay time of a next ON timing of the fourth switching device of the power conversion device, when the polarity of the detected current value at the time of OFF is negative and an absolute value of the detected current value at the time of OFF is greater than an absolute value of the reference value at the time of OFF, the control device is configured to generate a signal which decreases a delay time of a next OFF timing of the fourth switching device of the power conversion device, and when the polarity of the detected current value at the time of OFF is negative and the absolute value of the detected current value at the time of OFF is less than the absolute value of the reference value at the time of OFF, the control device is configured to generate a signal which increases a delay time of a next OFF timing of the fourth switching device of the power conversion device.

5. A power conversion system comprising:
a control device including a current balance adjustment circuit comprising:
an output current difference calculation circuit configured to, for each of a plurality of values of output currents which are output from a plurality of power conversion devices connected in parallel to one another and driven based on a plurality of common ON signals applied to the power conversion devices, output a difference between the output current value and a reference value when a polarity of the output current value is positive, and output a difference between an absolute value of the output current value and an absolute value of the reference value when the polarity of the output current value is negative; and
an adjustment time calculation circuit configured to output adjustment time signals each of which indicates an amount of a delay time of a rising timing or a falling timing of the ON signal, according to an output value of the output current difference calculation circuit; and
the plurality of power conversion devices,
wherein the control device is configured to provide the ON signals and the adjustment time signals to the plurality of power conversion devices,
AC output terminals of the plurality of power conversion devices are connected in parallel to one another,
each of the power conversion devices comprises:
a three-level conversion circuit in which a first switching device and a fourth switching device having diodes connected in anti-parallel are sequentially connected in series from a positive electrode toward a negative electrode of a DC power source having the positive electrode, the negative electrode, and a neutral electrode, an AC output terminal is taken out from a connection point between the first switching device and the fourth switching device, and a second switching device in a direction from the neutral electrode toward the connection point and a third switching device in a direction from the connection point toward the neutral electrode are connected in series and inserted between the connection point and the neutral electrode of the DC power source;

a current detection circuit configured to detect AC output currents of the power conversion devices; and a delay circuit configured to receive the adjustment time signals and the ON signals each of which instructs ON and OFF of each of the first to fourth switching devices of the plurality of power conversion devices, and delay each of an ON timing and an OFF timing of each of the ON signals based on the adjustment time signals, the control device is configured to generate the ON signals each of which controls an AC output current by PWM control to perform exclusive switching between the first switching device and the third switching device or between the second switching device and the fourth switching device, in a period during which the PWM control is performed between the first switching device and the third switching device, the control device is configured to receive an AC output current value after the first switching device and the third switching device of the plurality of power conversion devices are turned on and an AC output current value after turned off, when a polarity of a detected current value at the time of ON is positive and the detected current value at the time of ON is greater than the reference value at the time of ON, the control device is configured to generate a signal which increases a delay time of a next ON timing of the first switching device of the power conversion device, when the polarity of the detected current value at the time of ON is positive and the detected current value at the time of ON is less than the reference value at the time of ON, the control device is configured to generate a signal which decreases a delay time of a next ON timing of the first switching device of the power conversion device, when a polarity of a detected current value at the time of OFF is positive and the detected current value at the time of OFF is greater than the reference value at the time of OFF, the control device is configured to generate a signal which decreases a delay time of a next OFF timing of the first switching device of the power conversion device, when the polarity of the detected current value at the time of OFF is positive and the detected current value at the time of OFF is less than the reference value at the time of OFF, the control device is configured to generate a signal which increases a delay time of a next OFF timing of the first switching device of the power conversion device, when the polarity of the detected current value at the time of ON is negative and an absolute value of the detected current value at the time of ON is greater than an absolute value of the reference value at the time of ON, the control device is configured to generate a signal which increases a delay time of a next ON timing of the third switching device of the power conversion device, when the polarity of the detected current value at the time of ON is negative and the absolute value of the detected current value at the time of ON is less than the absolute value of the reference value at the time of ON, the control device is configured to generate a signal which decreases a delay time of a next ON timing of the third switching device of the power conversion device, when the polarity of the detected current value at the time of OFF is negative and an absolute value of the detected current value at the time of OFF is greater than an absolute value of the reference value at the time of OFF, the control device is configured to generate a signal which decreases a delay time of a next OFF timing of the third switching device of the power conversion device, when the polarity of the detected current value at the time of OFF is negative and the absolute value of the detected current value at the time of OFF is less than the absolute value of the reference value at the time of OFF, the control device is configured to generate a signal which increases a delay time of a next OFF timing of the third switching device of the power conversion device, in a period during which the PWM control is performed between the second switching device and the fourth switching device, the control device is configured to receive an AC output current value after the second switching device and the fourth switching device of the plurality of power conversion devices are turned on and an AC output current value after turned off, when the polarity of the detected current value at the time of ON is positive and the detected current value at the time of ON is greater than the reference value at the time of ON, the control device is configured to generate a signal which increases a delay time of a next ON timing of the second switching device of the power conversion device, when the polarity of the detected current value at the time of ON is positive and the detected current value at the time of ON is less than the reference value at the time of ON, the control device is configured to generate a signal which decreases a delay time of a next ON timing of the second switching device of the power conversion device, when the polarity of the detected current value at the time of OFF is positive and the detected current value at the time of OFF is greater than the reference value at the time of OFF, the control device is configured to generate a signal which decreases a delay time of a next OFF timing of the second switching device of the power conversion device, when the polarity of the detected current value at the time of OFF is positive and the detected current value at the time of OFF is less than the reference value at the time of OFF, the control device is configured to generate a signal which increases a delay time of a next OFF timing of the second switching device of the power conversion device, when the polarity of the detected current value at the time of ON is negative and an absolute value of the detected current value at the time of ON is greater than an absolute value of the reference value at the time of ON, the control device is configured to generate a signal which increases a delay time of a next ON timing of the fourth switching device of the power conversion device, when the polarity of the detected current value at the time of ON is negative and the absolute value of the detected current value at the time of ON is less than the absolute value of the reference value at the time of ON, the control device is configured to generate a signal which decreases a delay time of a next ON timing of the fourth switching device of the power conversion device, when the polarity of the detected current value at the time of OFF is negative and an absolute value of the detected current value at the time of OFF is greater than an absolute value of the reference value at the time of OFF, the control device is configured to generate a signal which decreases a delay time of a next OFF timing of the fourth switching device of the power conversion device, and when the polarity of the detected current value at the time of OFF is negative and the absolute value of the detected current value at the time of OFF is less than the absolute value of the reference value at the time of OFF, the control device is configured to generate a signal which increases a delay time of a next OFF timing of the fourth switching device of the power conversion device.

6. The current balance adjustment circuit according to claim 1,
wherein the reference value is a value of an AC output current of a predetermined power conversion device selected from the plurality of power conversion devices or an average value of AC output current values of the plurality of power conversion devices.

7. The current balance adjustment circuit according to claim 2,
wherein the reference value is a value of an AC output current of a predetermined power conversion device selected from the plurality of power conversion devices or an average value of AC output current values of the plurality of power conversion devices.

8. The current balance adjustment circuit according to claim 3,
wherein the reference value is a value of an AC output current of a predetermined power conversion device selected from the plurality of power conversion devices or an average value of AC output current values of the plurality of power conversion devices.

9. The power conversion system according to claim 4,
wherein the reference value is a value of an AC output current of a predetermined power conversion device selected from the plurality of power conversion devices or an average value of AC output current values of the plurality of power conversion devices.

10. The power conversion system according to claim 5,
wherein the reference value is a value of an AC output current of a predetermined power conversion device selected from the plurality of power conversion devices or an average value of AC output current values of the plurality of power conversion devices.

11. The current balance adjustment circuit according to claim 1,
wherein an increase amount and a decrease amount of the delay time are a fixed value.

12. The power conversion system according to claim 2, wherein an increase amount and a decrease amount of the delay time are a fixed value, or a value which varies according to the difference.

13. The power conversion system according to claim 2, wherein, when one of the plurality of power conversion devices is stopped, the control device is configured to generate a signal which increases or decreases a delay time of a next ON timing and OFF timing of a switching device of the corresponding power conversion device to a maximum value, so as to lower an AC output current of the corresponding power conversion device, and when the plurality of power conversion devices are operating, an operation of another power conversion device having an AC output terminal connected in parallel to the plurality of power conversion devices is started by using, as an initial setting, a signal which increases or decreases a next ON timing and OFF timing of a switching device of the another power conversion device to a maximum value, so as to lower an AC output current of the another power conversion device.

14. The power conversion system according to claim 3, wherein, when one of the plurality of power conversion devices is stopped, the control device is configured to generate a signal which increases or decreases a delay time of a next ON timing and OFF timing of a switching device of the corresponding power conversion device to a maximum value, so as to lower an AC output current of the corresponding power conversion device, and when the plurality of power conversion devices are operating, an operation of another power conversion device having an AC output terminal connected in parallel to the plurality of power conversion devices is started by using, as an initial setting, a signal which increases or decreases a next ON timing and OFF timing of a switching device of the another power conversion device to a maximum value, so as to lower an AC output current of the another power conversion device.

15. The power conversion system according to claim 4, wherein, when one of the plurality of power conversion devices is stopped, the control device is configured to generate a signal which increases or decreases a delay time of a next ON timing and OFF timing of a switching device of the corresponding power conversion device to a maximum value, so as to lower an AC output current of the corresponding power conversion device, and when the plurality of power conversion devices are operating, an operation of another power conversion device having an AC output terminal connected in parallel to the plurality of power conversion devices is started by using, as an initial setting, a signal which increases or decreases a next ON timing and OFF timing of a switching device of the another power conversion device to a maximum value, so as to lower an AC output current of the another power conversion device.

16. The power conversion system according to claim 5, wherein, when one of the plurality of power conversion devices is stopped, the control device is configured to generate a signal which increases or decreases a delay time of a next ON timing and OFF timing of a switching device of the corresponding power conversion device to a maximum value, so as to lower an AC output current of the corresponding power conversion device, and when the plurality of power conversion devices are operating, an operation of another power conversion device having an AC output terminal connected in parallel to the plurality of power conversion devices is started by using, as an initial setting, a signal which increases or decreases a next ON timing and OFF timing of a switching device of the another power conversion device to a maximum value, so as to lower an AC output current of the another power conversion device.

17. The power conversion system according to claim 3, wherein an increase amount and a decrease amount of the delay time are a fixed value or a value which varies according to the difference.

18. The power conversion system according to claim 4, wherein an increase amount and a decrease amount of the delay time are a fixed value or a value which varies according to the difference.

19. The power conversion system according to claim 5, wherein an increase amount and a decrease amount of the delay time are a fixed value or a value which varies according to the difference.

* * * * *

UNITED STATES PATENT AND TRADEMARK OFFICE
CERTIFICATE OF CORRECTION

PATENT NO. : 10,284,094 B2
APPLICATION NO. : 15/914630
DATED : May 7, 2019
INVENTOR(S) : Suzuo Saito et al.

It is certified that error appears in the above-identified patent and that said Letters Patent is hereby corrected as shown below:

On the Title Page

At item (73) Assignee:
"Toshiba Infrastructure Systems & Solutions Corporation, Tokyo, (JP)"
Should read:
-- Toshiba Infrastructure Systems & Solutions Corporation, Kanagawa, (JP) --

Signed and Sealed this
Twenty-fifth Day of June, 2019

Andrei Iancu
*Director of the United States Patent and Trademark Office*